United States Patent
Herbst et al.

(10) Patent No.: US 10,900,800 B2
(45) Date of Patent: Jan. 26, 2021

(54) MOBILE APPLICATION INTERFACE DEVICE FOR VEHICLE NAVIGATION ASSISTANCE

(71) Applicant: Garmin Switzerland GmbH, Schaffhausen (CH)

(72) Inventors: Caleb J. Herbst, Lenexa, KS (US); Kyle J. T. Hill, Lenexa, KS (US); John W. Roltgen, IV, Olathe, KS (US); Carey J. Spesard, Kansas City, MO (US)

(73) Assignee: Garmin Switzerland GmbH

( * ) Notice: Subject to any disclaimer, the term of this patent is extended or adjusted under 35 U.S.C. 154(b) by 445 days.

(21) Appl. No.: 15/862,391

(22) Filed: Jan. 4, 2018

(65) Prior Publication Data

US 2018/0299288 A1 Oct. 18, 2018

Related U.S. Application Data

(60) Provisional application No. 62/596,990, filed on Dec. 11, 2017, provisional application No. 62/563,962, (Continued)

(51) Int. Cl.
*G01C 21/36* (2006.01)
*G01C 21/26* (2006.01)
(Continued)

(52) U.S. Cl.
CPC .......... *G01C 21/3629* (2013.01); *B60K 35/00* (2013.01); *B60W 50/14* (2013.01);
(Continued)

(58) Field of Classification Search
CPC .......... B60K 2370/148; B60K 2370/21; B60K 2370/566; B60K 2370/573; B60K 35/00;
(Continued)

(56) References Cited

U.S. PATENT DOCUMENTS 6,374,183 B1 4/2002 Oshida et al.
6,741,931 B1 * 5/2004 Kohut ................ G01C 21/3688
340/993

(Continued)

OTHER PUBLICATIONS

International Search Report and Written Opinion from corresponding PCT/US2018/025071, filed Mar. 29, 2018.
U.S. Appl. No. 15/862,385, filed Jan. 4, 2018, Hill.

*Primary Examiner* — Angelina Shudy
(74) *Attorney, Agent, or Firm* — Samuel M. Korte; Max M. Ali

(57) ABSTRACT

An interface device connects to a mobile application running on a mobile device to provide vehicle navigation assistance. The interface device includes a microphone, a location determining component, a display, a plurality of indicator lights, a short-range communications transceiver, and a controller. The controller is configured to: receive a spoken instruction or query from a user via the microphone; send data associated with the spoken instruction or query to the mobile application running on the mobile device via the short-range communications transceiver; receive navigation data based on the spoken instruction or query from the mobile application running on the mobile device via the short-range communications transceiver; determine a current position based on one or more signals received via the location determining component; and provide at least one of a symbolic output or a textual output via the display based on the navigation data and the current position.

15 Claims, 59 Drawing Sheets

Related U.S. Application Data filed on Sep. 27, 2017, provisional application No. 62/486,653, filed on Apr. 18, 2017.

(51) Int. Cl.

| | |
|---|---|
| *H04M 1/725* | (2006.01) |
| *G06F 16/638* | (2019.01) |
| *G08G 1/0962* | (2006.01) |
| *G08G 1/0968* | (2006.01) |
| *H04W 4/024* | (2018.01) |
| *G10L 15/22* | (2006.01) |
| *H04W 4/48* | (2018.01) |
| *B60K 35/00* | (2006.01) |
| *B60W 50/14* | (2020.01) |
| *G08G 1/16* | (2006.01) |
| *G06K 9/00* | (2006.01) |

(52) U.S. Cl.
CPC ......... *G01C 21/265* (2013.01); *G01C 21/362* (2013.01); *G01C 21/3608* (2013.01); *G01C 21/3632* (2013.01); *G01C 21/3658* (2013.01); *G01C 21/3661* (2013.01); *G01C 21/3688* (2013.01); *G06F 16/638* (2019.01); *G08G 1/0962* (2013.01); *G08G 1/096811* (2013.01); *G08G 1/167* (2013.01); *G10L 15/22* (2013.01); *H04M 1/7253* (2013.01); *H04W 4/024* (2018.02); *H04W 4/48* (2018.02); *B60K 2370/148* (2019.05); *B60K 2370/21* (2019.05); *B60K 2370/566* (2019.05); *B60K 2370/573* (2019.05); *B60W 2050/146* (2013.01); *G06K 9/00798* (2013.01); *G06K 9/00805* (2013.01); *H04M 2250/02* (2013.01)

(58) Field of Classification Search
CPC ............ B60W 2050/146; B60W 50/14; G01C 21/265; G01C 21/3608; G01C 21/362; G01C 21/3629; G01C 21/3632; G01C 21/3658; G01C 21/3661; G01C 21/3688; G06F 16/638; G06K 9/00798; G06K 9/00805; G08G 1/0962; G08G 1/096811; G08G 1/167; G10L 15/22; H04M 1/7253; H04M 2250/02; H04W 4/024; H04W 4/48

See application file for complete search history.

(56) References Cited

U.S. PATENT DOCUMENTS

| | | | |
|---|---|---|---|
| 7,034,747 B1* | 4/2006 | Walters | G01S 5/0072 |
| | | | 342/357.59 |
| 9,116,563 B2* | 8/2015 | Kurosawa | G06F 3/1454 |
| 9,229,623 B1* | 1/2016 | Penilla | H01M 10/46 |
| 9,953,471 B2* | 4/2018 | Tieman | G07C 5/008 |
| 9,997,160 B2* | 6/2018 | Schmidt | G10L 15/30 |
| 2004/0204159 A1* | 10/2004 | Van Bosch | H04M 1/6083 |
| | | | 455/569.1 |
| 2006/0017552 A1* | 1/2006 | Andreasen | G01D 7/02 |
| | | | 340/438 |
| 2007/0233370 A1 | 10/2007 | Asada | |
| 2009/0271200 A1* | 10/2009 | Mishra | G01C 21/36 |
| | | | 704/254 |
| 2010/0106406 A1 | 4/2010 | Hille et al. | |
| 2010/0185445 A1* | 7/2010 | Comerford | G10L 15/22 |
| | | | 704/251 |
| 2012/0245945 A1 | 9/2012 | Miyauchi et al. | |
| 2014/0120983 A1* | 5/2014 | Lam | H04M 1/0283 |
| | | | 455/557 |
| 2014/0163877 A1 | 6/2014 | Kiyama et al. | |
| 2014/0316696 A1 | 10/2014 | Chen et al. | |
| 2014/0354881 A1 | 12/2014 | Liao | |
| 2014/0357248 A1* | 12/2014 | Tonshal | H04M 1/72577 |
| | | | 455/418 |
| 2014/0379338 A1* | 12/2014 | Fry | G10L 15/19 |
| | | | 704/246 |
| 2015/0006182 A1* | 1/2015 | Schmidt | G10L 15/30 |
| | | | 704/275 |
| 2015/0187147 A1* | 7/2015 | Tieman | G07C 5/008 |
| | | | 701/33.2 |
| 2015/0193093 A1* | 7/2015 | Grover | G06F 3/04817 |
| | | | 715/739 |
| 2015/0302738 A1* | 10/2015 | Geerlings | G07C 9/00571 |
| | | | 340/5.25 |
| 2015/0331081 A1 | 11/2015 | Wharton et al. | |
| 2016/0039358 A1 | 2/2016 | Okuda et al. | |
| 2016/0061613 A1 | 3/2016 | Jung et al. | |
| 2016/0355132 A1 | 12/2016 | Zieglmeier et al. | |
| 2017/0067750 A1* | 3/2017 | Day | B60G 17/015 |
| 2017/0101056 A1 | 4/2017 | Park | |
| 2017/0308689 A1* | 10/2017 | Boesen | G06F 3/167 |
| 2017/0361468 A1* | 12/2017 | Cheuvront | G06F 16/00 |
| 2018/0013211 A1* | 1/2018 | Ricci | G01C 21/3697 |
| 2018/0112986 A1 | 4/2018 | Putnam et al. | |
| 2018/0352583 A1* | 12/2018 | Smith | H04W 76/34 |
| 2019/0082149 A1* | 3/2019 | Correnti | H04N 7/188 |
| 2019/0082378 A1* | 3/2019 | Dziurda | H04W 48/04 |
| 2019/0176862 A1* | 6/2019 | Kumar | G06K 9/00651 |

* cited by examiner

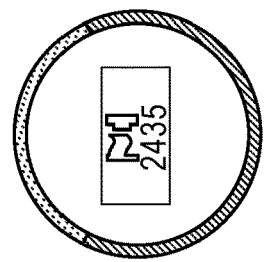
FIG. 5H End of Route with House Number
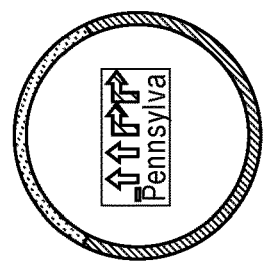
FIG. 5G Lane Assist 5+ Arrows with Street Name
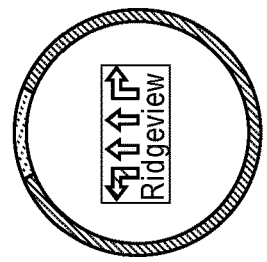
FIG. 5F Lane Assist 2-4 Arrows with Street Name
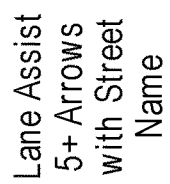
FIG. 5E End of route
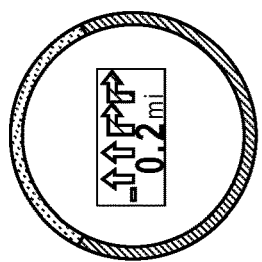
FIG. 5D Lane Assist 5+ Arrows
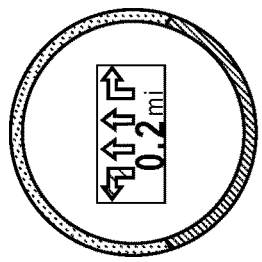
FIG. 5C Lane Assist 2-4 Arrows
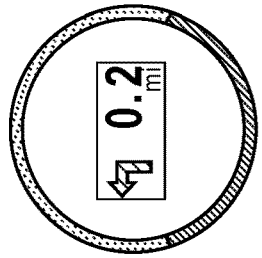
FIG. 5B Simple Turn Arrow
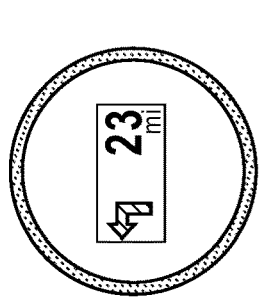
FIG. 5A Pre-Turn Prep

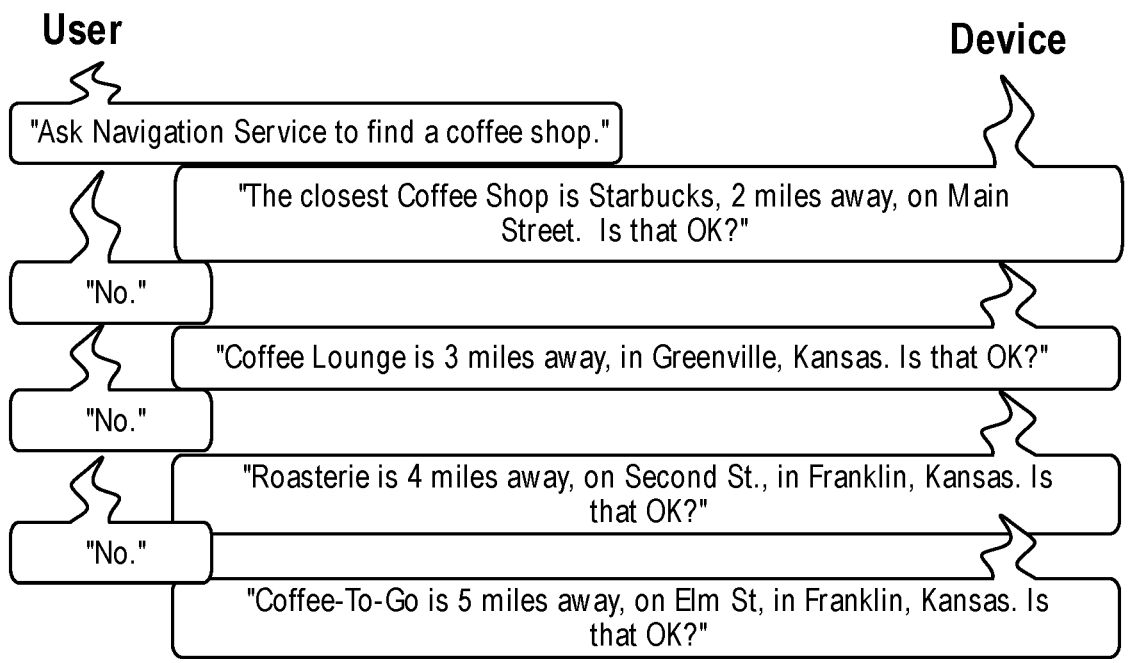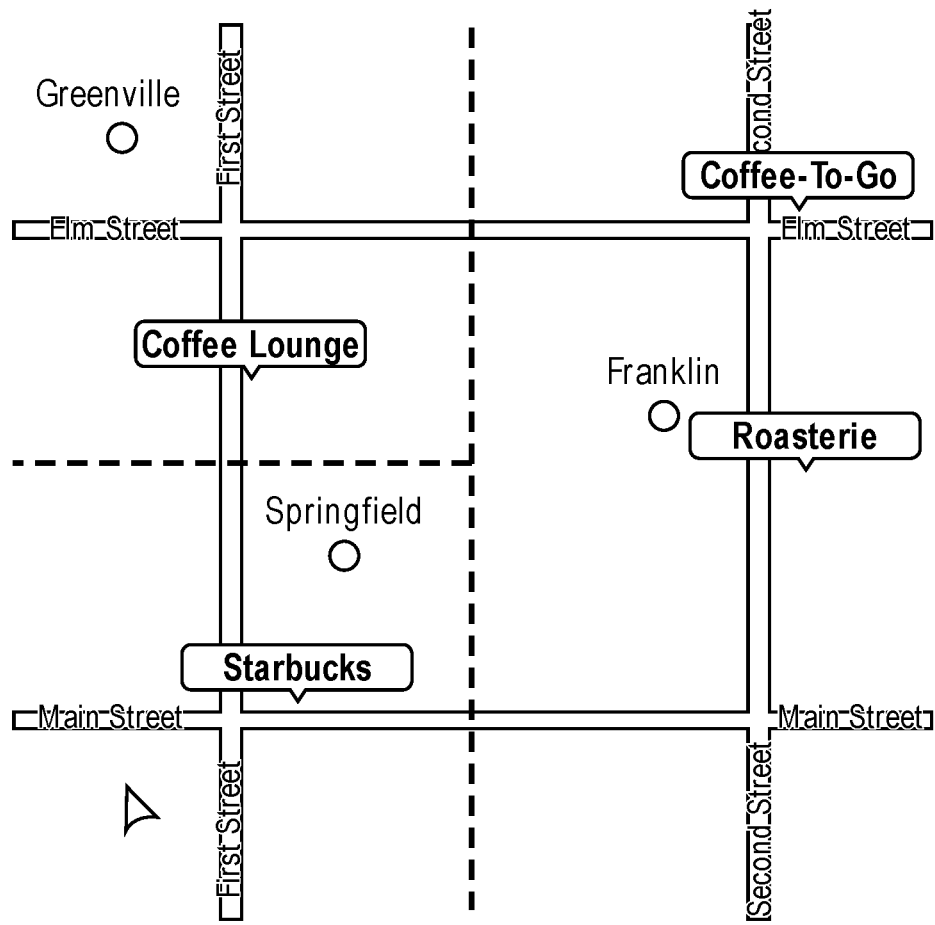
FIG. 17A

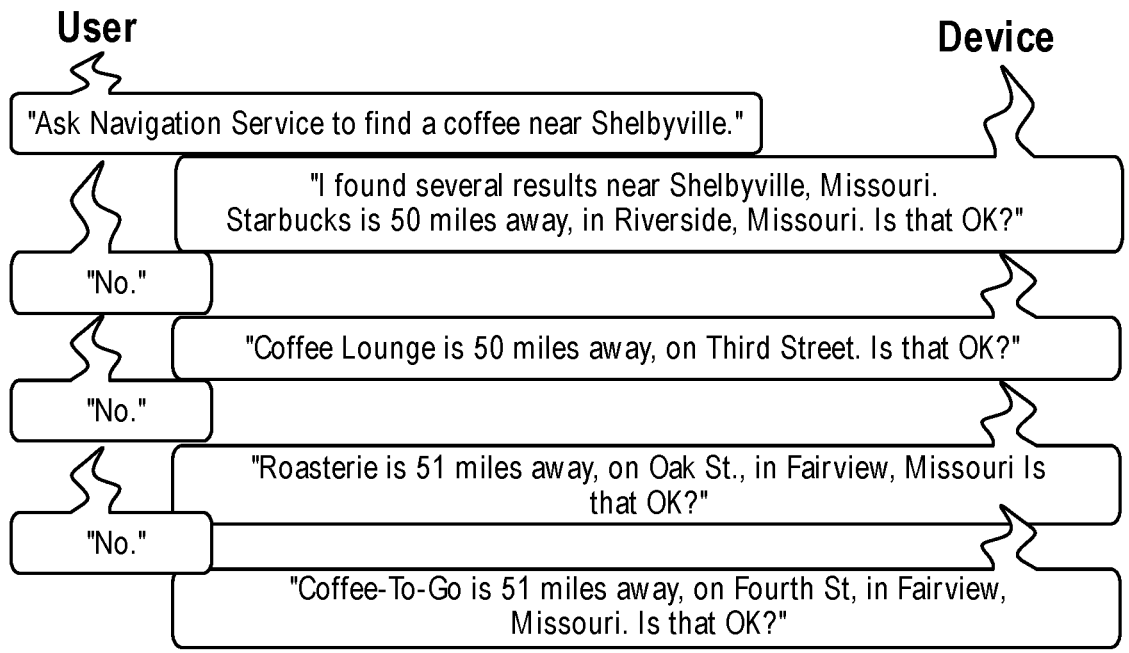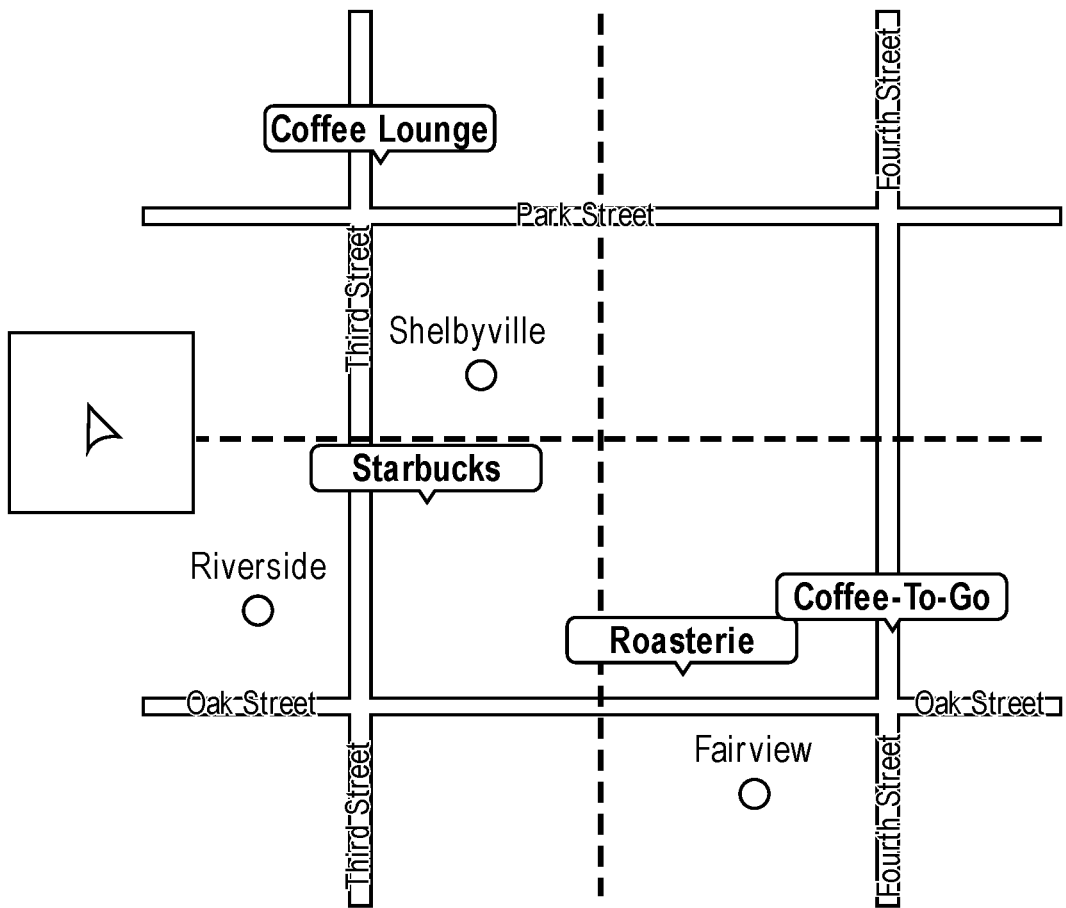
FIG. 17B

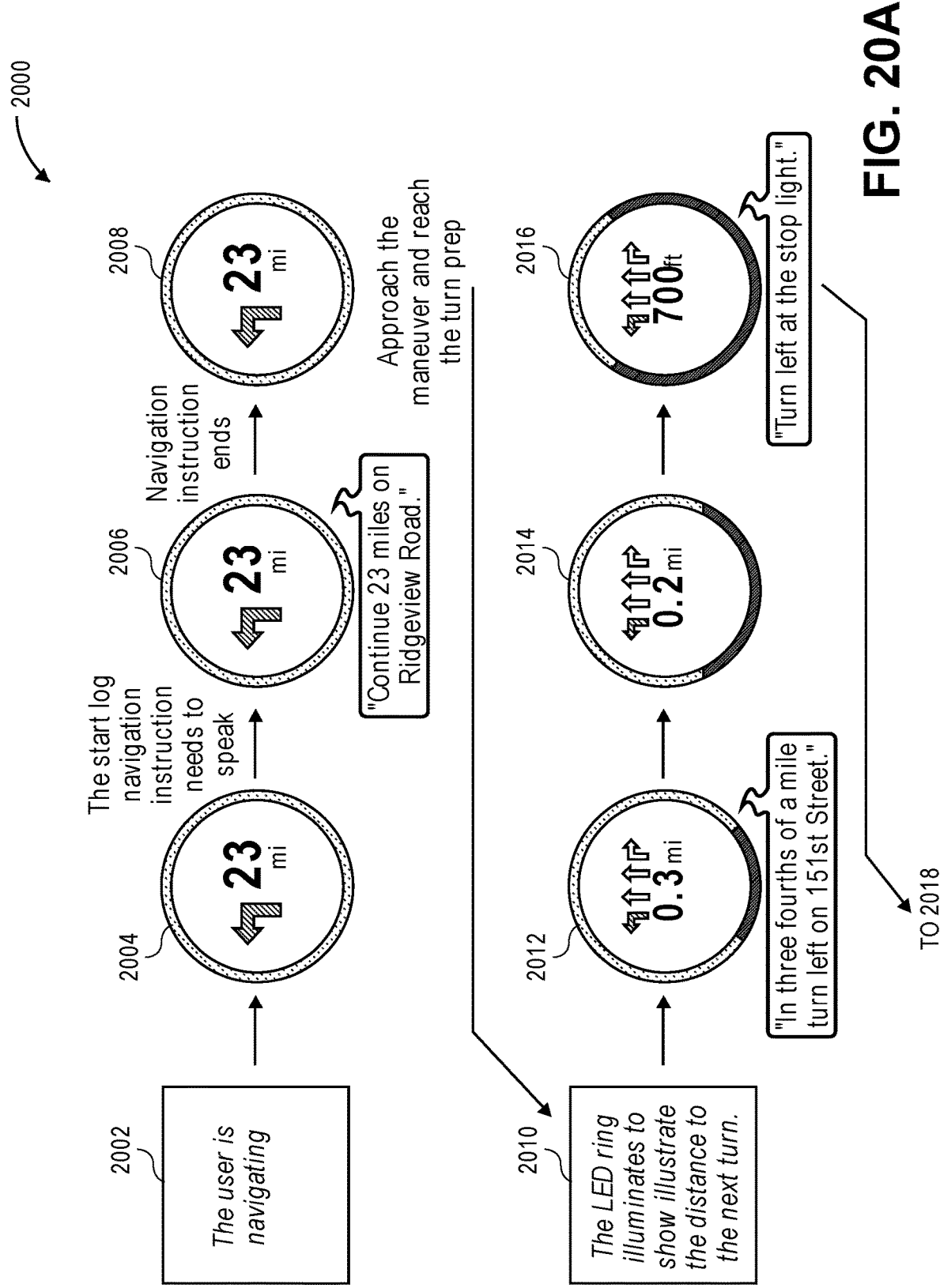

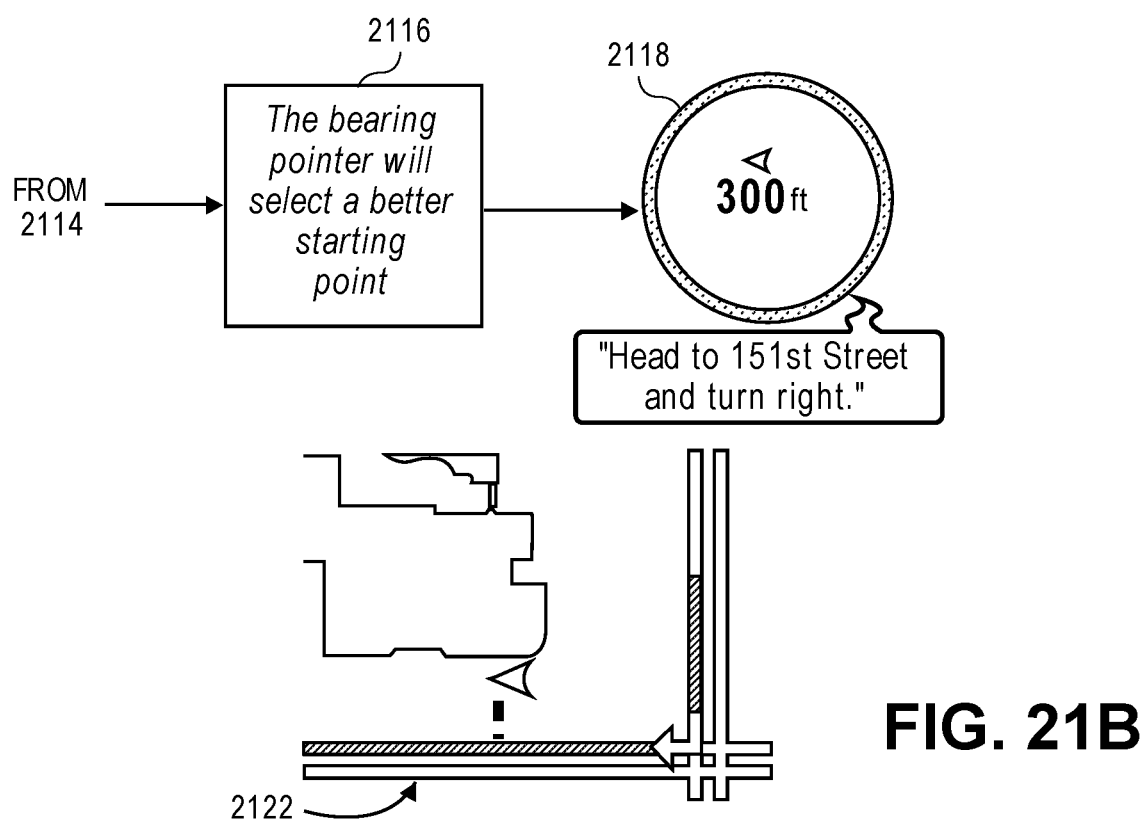

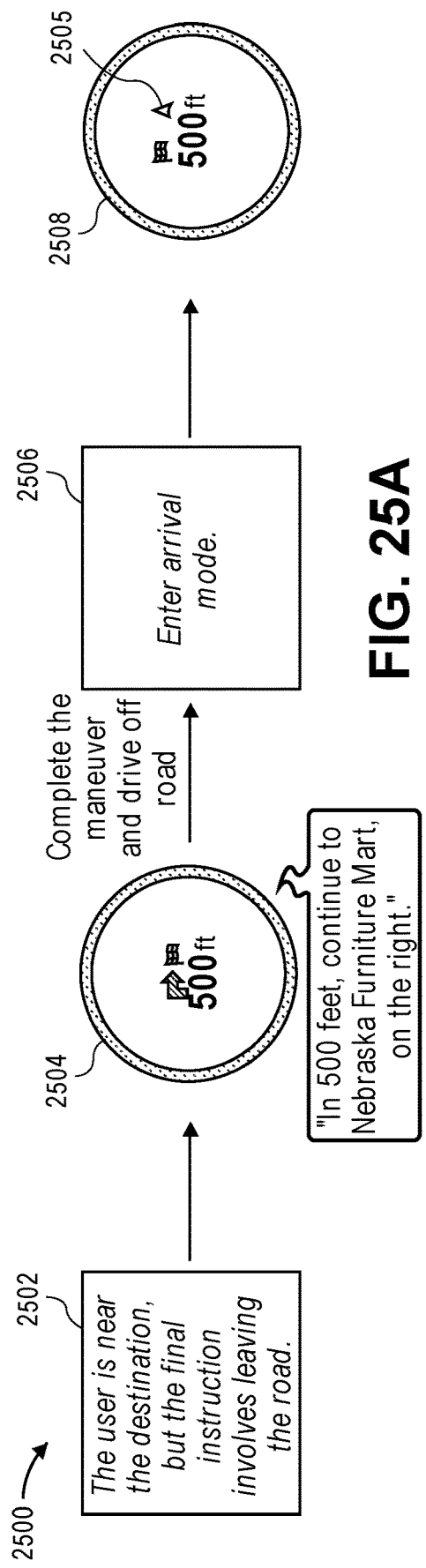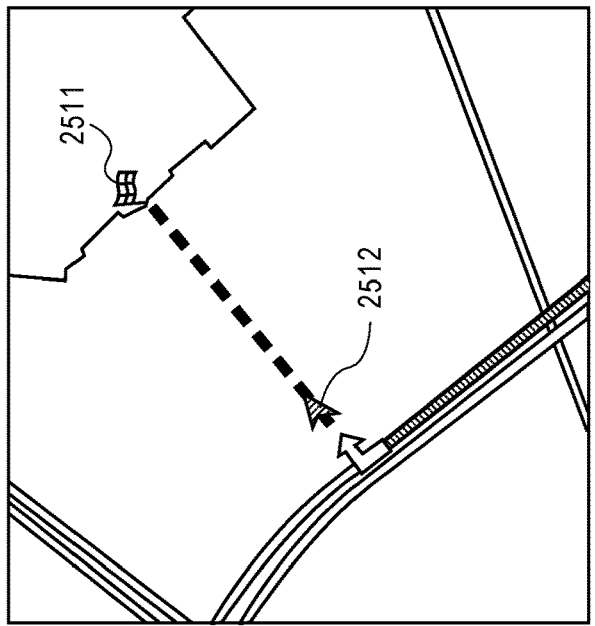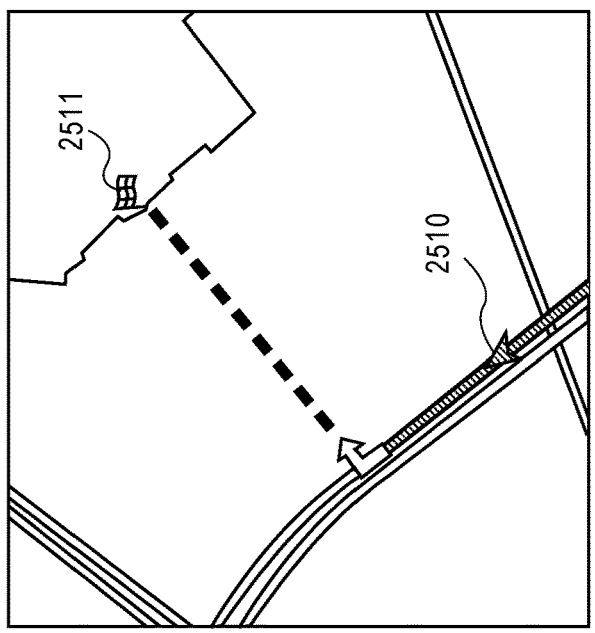

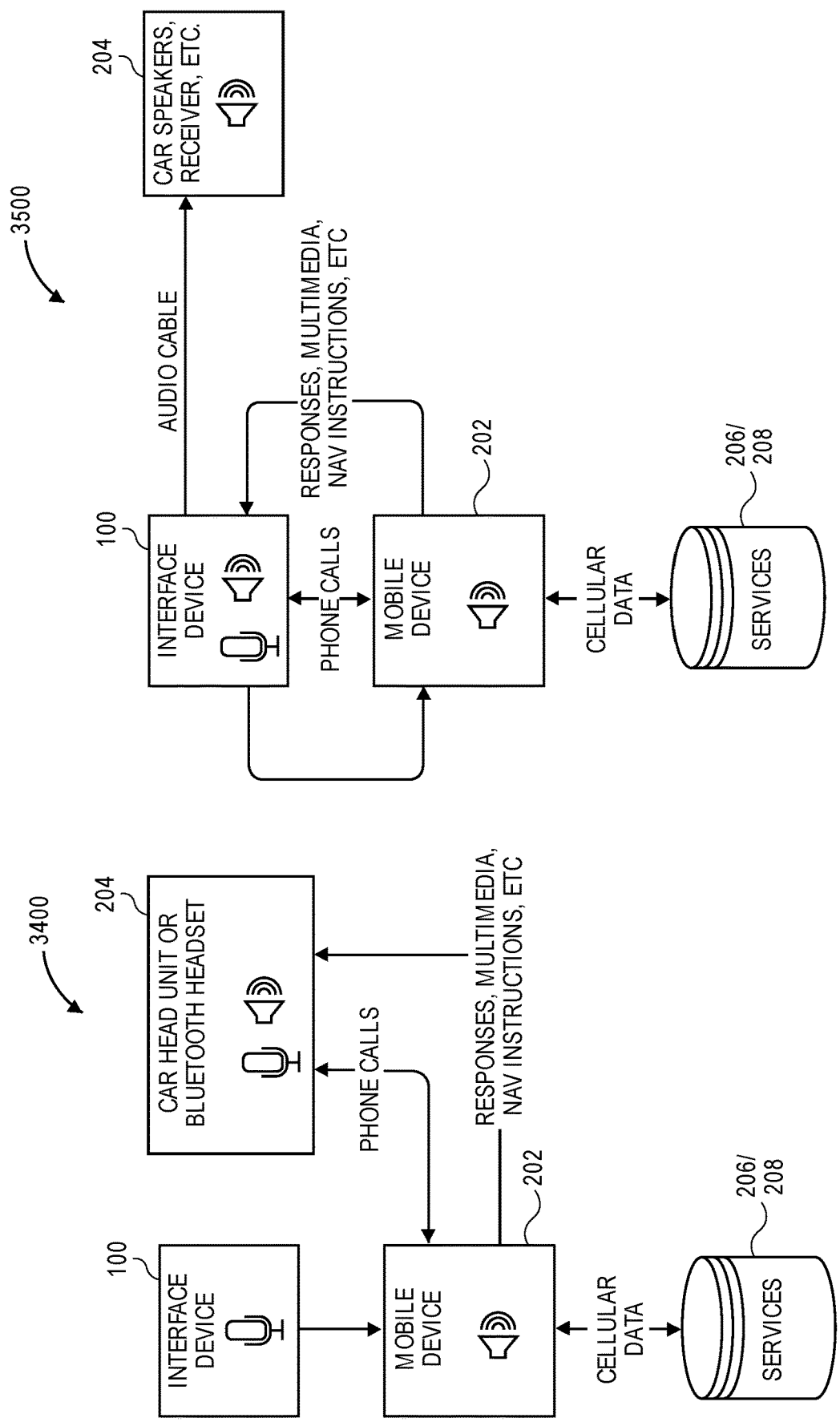

MOBILE APPLICATION INTERFACE DEVICE FOR VEHICLE NAVIGATION ASSISTANCE

RELATED APPLICATIONS

The present application claims the benefit under 35 U.S.C. § 119(e) of U.S. Provisional Application Ser. No. 62/486,653, entitled "Vehicle Assistant Interface," filed on Apr. 18, 2017, Provisional Application Ser. No. 62/563,962, entitled "Vehicle Assistant Interface," filed on September 27, and Provisional Application Ser. No. 62/596,990, entitled "Vehicle Assistant Interface," filed on Dec. 11, 2017. The above-referenced Provisional Applications are herein incorporated by reference in their entirety.

BACKGROUND

Drivers rely on various technologies to assist with vehicle navigation and media control. For example, many vehicles come equipped with an infotainment console that includes a navigation system and/or media control interface. Drivers may additionally or alternatively rely on their mobile devices (e.g., smartphones) to access navigation or media applications, which may be streamed through a vehicle infotainment and/or audio system, or presented directly via the mobile device display and/or speakers.

Using a driver's mobile device for navigation or media applications can be cumbersome and possibly dangerous when a vehicle does not include an infotainment console or when the infotainment console cannot be linked to the driver's mobile device. For example, the mobile device may receive calls while navigating, thereby interrupting route guidance and/or creating a distraction for the driver. Also, at times the driver's mobile device may be located in a difficult to view area within the vehicle (e.g., within a cup holder). These are some examples of the difficulties that can be encountered when a driver uses his/her mobile device for navigation or media applications while driving.

SUMMARY

A device for interfacing with a mobile application running on a mobile device to provide vehicle navigation assistance is disclosed. In embodiments, the device includes a microphone, a location determining component, a display, a plurality of indicator lights, a short-range communications transceiver, and a controller. The short-range communications transceiver is configured to send and receive communications to and from the mobile device. The controller is communicatively coupled with the microphone, the location determining component, the display, the plurality of indicator lights, and the short-range communications transceiver. The controller is configured to receive a spoken instruction or query from a user via the microphone and configured to send data associated with the spoken instruction or query to the mobile application running on the mobile device via the short-range communications transceiver. The controller is further configured to receive navigation data based on the spoken instruction or query from the mobile application running on the mobile device via the short-range communications transceiver and configured to determine a current position based on one or more signals received via the location determining component. The controller is configured to provide at least one of a symbolic output or a textual output via the display based on the navigation data and the current position. The controller can also be configured to cause the plurality of indicator lights to display an illumination pattern based on the navigation data, current position, and/or the spoken instruction or query received via the microphone from the user.

A method of providing vehicle navigation assistance is also disclosed. In implementations, the method includes: running a mobile application for vehicle navigation assistance on a mobile device; pairing a mobile application interface device with the mobile device, the mobile application interface device having a microphone, a location determining component, a display, a plurality of indicator lights, and a short-range communications transceiver operable to send and receive communications to and from the mobile device; receiving a spoken instruction or query from a user via the microphone of the mobile application interface device; sending data associated with the spoken instruction or query to the mobile application running on the mobile device via the short-range communications transceiver of the mobile application interface device; receiving navigation data based on the spoken instruction or query from the mobile application running on the mobile device via the short-range communications transceiver of the mobile application interface device; determining a current position based on one or more signals received via the location determining component of the mobile application interface device; and providing at least one of a symbolic output or a textual output via the display of the mobile application interface device based on the navigation data and the current position, wherein the at least one of the symbolic output or the textual output is associated with at least one of a next maneuver for the user to follow or a distance to a destination. In some implementations, the method further includes causing the plurality of indicator lights to display an illumination pattern based on the navigation data, current position, and/or the spoken instruction or query received via the microphone from the user.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 5A shows an example output from a mobile application interface device, such as the mobile application interface device of FIGS. 1A through 1C.

FIG. 5B shows an example output from a mobile application interface device, such as the mobile application interface device of FIGS. 1A through 1C.

FIG. 5C shows an example output from a mobile application interface device, such as the mobile application interface device of FIGS. 1A through 1C.

FIG. 5D shows an example output from a mobile application interface device, such as the mobile application interface device of FIGS. 1A through 1C.

FIG. 5E shows an example output from a mobile application interface device, such as the mobile application interface device of FIGS. 1A through 1C.

FIG. 5F shows an example output from a mobile application interface device, such as the mobile application interface device of FIGS. 1A through 1C.

FIG. 5G shows an example output from a mobile application interface device, such as the mobile application interface device of FIGS. 1A through 1C.

FIG. 5H shows an example output from a mobile application interface device, such as the mobile application interface device of FIGS. 1A through 1C.

FIG. 17A shows an example output from a mobile application interface device, such as the mobile application interface device of FIGS. 1A through 1C.

FIG. 17B shows an example output from a mobile application interface device, such as the mobile application interface device of FIGS. 1A through 1C.

FIG. 20A is a flow diagram showing an example process that employs a mobile application interface device, such as the mobile application interface device of FIGS. 1A through 1C.

FIG. 21B is a flow diagram showing an example process that employs a mobile application interface device, such as the mobile application interface device of FIGS. 1A through 1C.

FIG. 25A is a flow diagram showing an example process that employs a mobile application interface device, such as the mobile application interface device of FIGS. 1A through 1C.

FIG. 25B is a map view showing a user approaching a destination while employing a mobile application interface device, such as the mobile application interface device of FIGS. 1A through 1C.

FIG. 25C is a map view showing a user approaching a destination while employing a mobile application interface device, such as the mobile application interface device of FIGS. 1A through 1C.

FIG. 34 is a block diagram illustrating a system configuration for a mobile application interface device, such as the mobile application interface device of FIGS. 1A through 1C, in accordance with an example embodiment of the present disclosure.

FIG. 35 is a block diagram illustrating a system configuration for a mobile application interface device, such as the mobile application interface device of FIGS. 1A through 1C, in accordance with an example embodiment of the present disclosure.

DETAILED DESCRIPTION

Figure 1B:
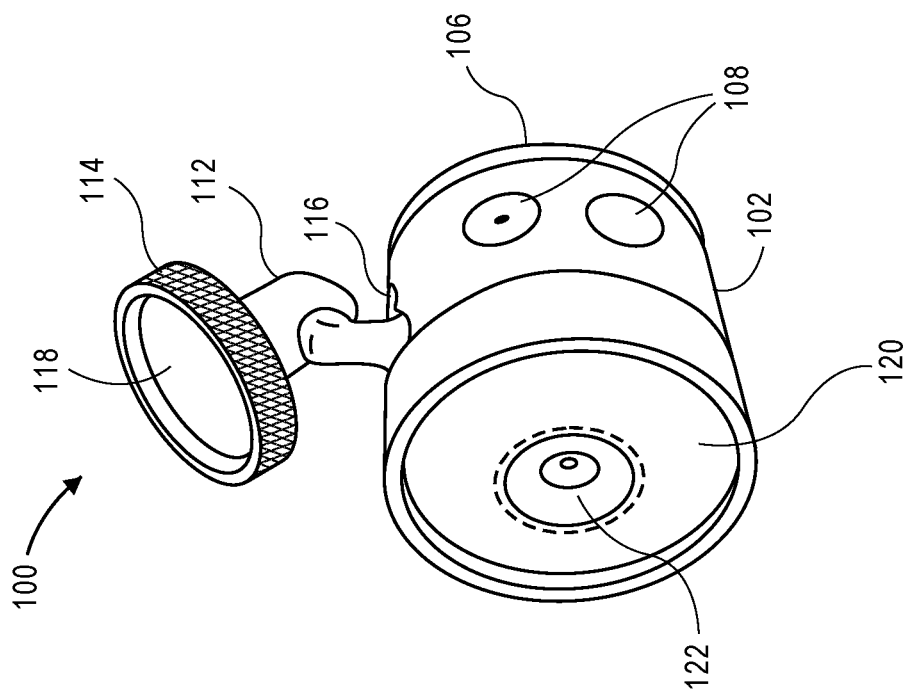
FIG. 1B is a perspective rear view of a mobile application interface device for vehicle navigation assistance, in accordance with an example embodiment of the present disclosure.

Drivers may rely on their mobile devices (e.g., smartphones, tablets, media players, or the like) to access navigation or media applications that can be streamed through a vehicle infotainment and/or audio system, or presented directly via the mobile device display and/or speakers. For example, a driver may connect a mobile device to a vehicle audio system to take advantage of mobile assistant applications (e.g., artificial intelligence applications and/or voice services), such as GOOGLE ASSISTANT, SIRI, CORTANA, ALEXA, and the like. However, using a driver's mobile device for navigation or media applications can be cumbersome and possibly dangerous when a vehicle does not include an infotainment console or when the infotainment console cannot be linked to the driver's mobile device. For example, the mobile device may receive calls while navigating, thereby interrupting route guidance and/or creating a distraction for the driver. Also, at times the driver's mobile device may be located in a difficult to view area within the vehicle (e.g., within a cup holder). These are some examples of the difficulties that can be encountered when a driver uses a mobile device for navigation or media applications while driving.

A mobile application interface device is described herein that moves intelligent assistant systems, like SIRI, GOOGLE VOICE, AMAZON VOICE SERVICES (AVS or ALEXA), and so forth, from home implementations to a vehicle environment, thereby providing drivers with an intelligent digital assistant while on the road. The mobile application interface device (sometimes referred to herein as the "device") can provide the connected functionality many users desire without requiring users to directly interact with their mobile devices (e.g., without requiring a user to take a mobile phone out of the user's pocket). In embodiments, the device may include a housing, a controller, a short-range communications transceiver (e.g., Bluetooth or NFC transceiver) for communicating with a mobile device and possibly with a vehicle audio system, an audio output device (e.g., speaker or audio output interface), a display, a location determining component (e.g., GPS receiver or the like), and a mount (e.g., a windshield or dash mount) for securing the device within a vehicle (e.g., to the vehicle's windshield, dashboard, or any other location that can be easily viewed by a driver). In embodiments, the device may be configured to determine its geographical position using the location determining component. In other embodiments, the device may utilize positioning information provided by the mobile device and/or the user's vehicle. Similarly, in various embodiments, the device may lack speakers, buttons, displays, and other system elements and instead rely on complimentary elements provided by the mobile device and/or vehicle audio system.

The device can be configured to provide various functionalities, including, but not limited to, streaming entertainment (e.g., music, podcasts, internet radio, travel games, audio books, news, etc.), navigation and searching functionalities (e.g., GARMIN search functionality (standard point of interest (POI), address, and/or category searching), AMAZON search functionality, YELP, audio and/or visual navigation instructions (e.g., turn-by-turn, lane guidance, natural guidance, traffic reports, advanced driver awareness and safety (ADAS) alerts/warnings, etc.), dash cam capability/control (e.g., picture and video recording, time-lapse recording, etc.), mobile device notifications (e.g., calendar notifications, reminders/alarms, messaging, emails, etc.), handsfree calling, digital assistance (e.g., reminders, lists, notes, calendar updates, message transmission or retrieval), smart home automation or security control, assistance ordering goods or services, making reservations, location based queries (e.g., "Where am I", weather, traffic, speed limit updates for current location/destination), and so forth.

Figure 1A:
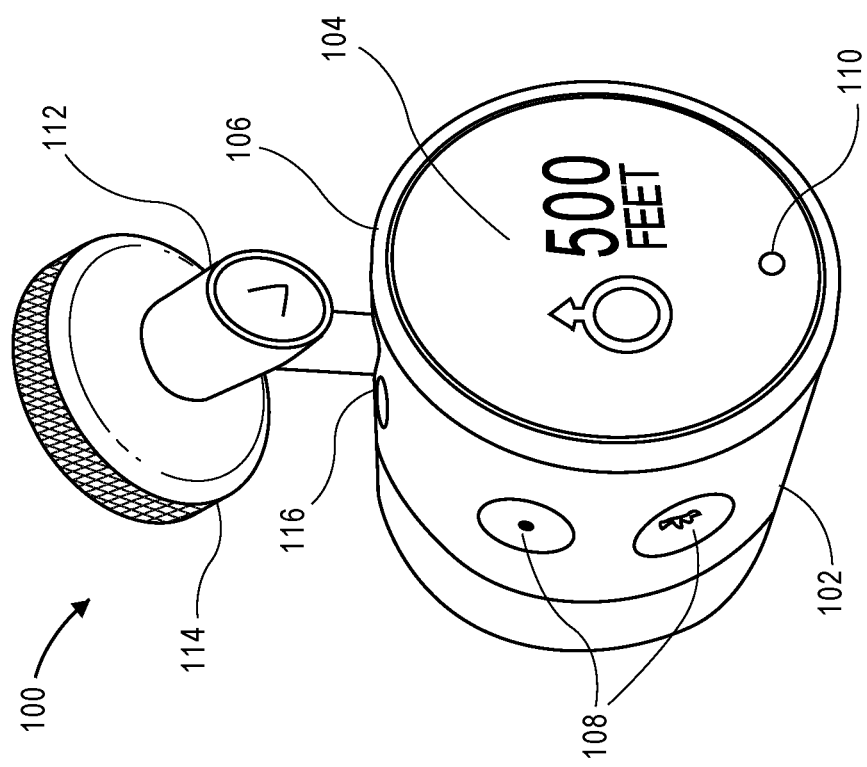
FIG. 1A is a perspective front view of a mobile application interface device for vehicle navigation assistance, in accordance with an example embodiment of the present disclosure.
Figure 1C:
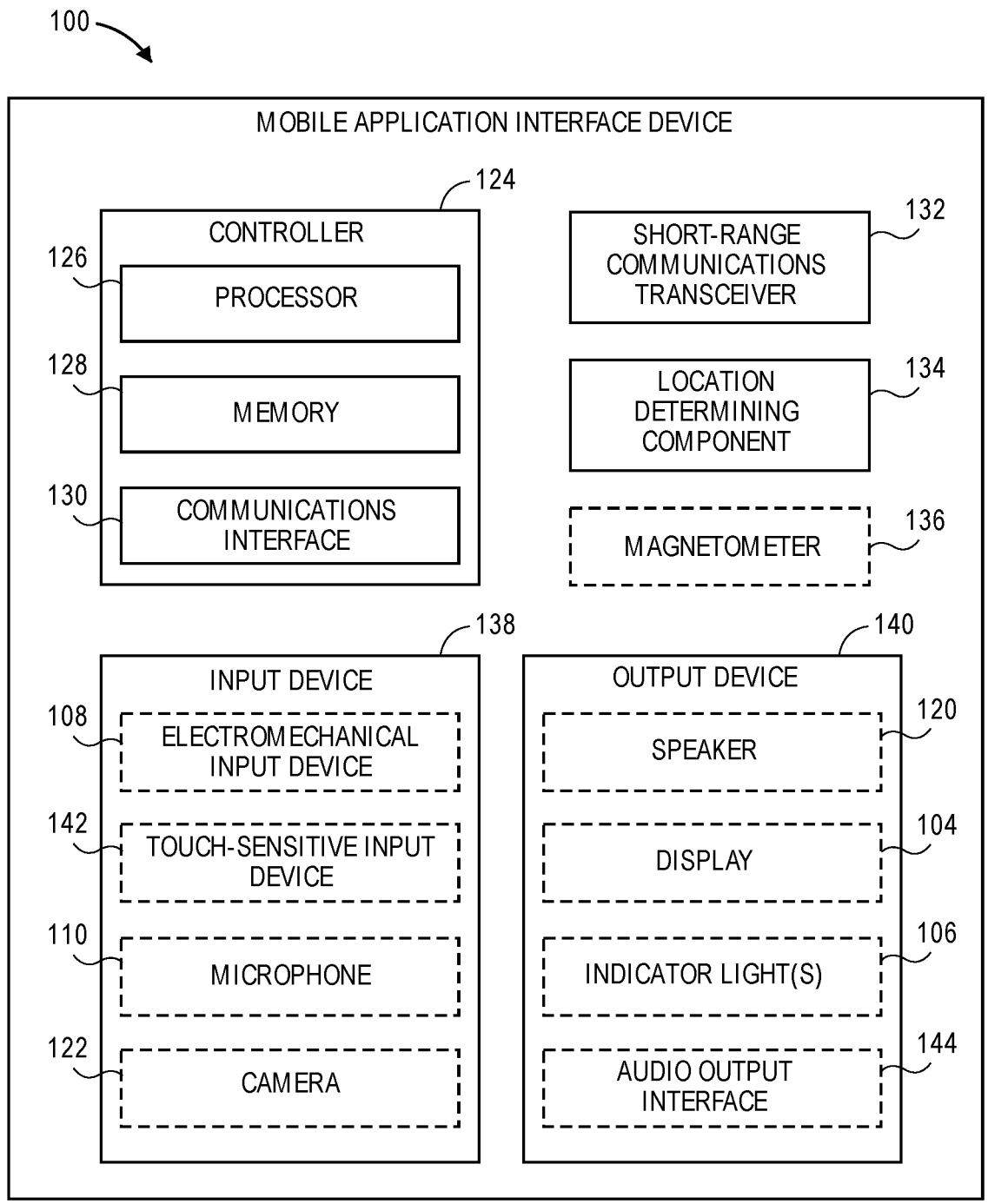
FIG. 1C is a block diagram illustrating various components of a mobile application interface device, such as the mobile application interface device of FIGS. 1A and 1B, in accordance with an example embodiment of the present disclosure.
Figure 2A:
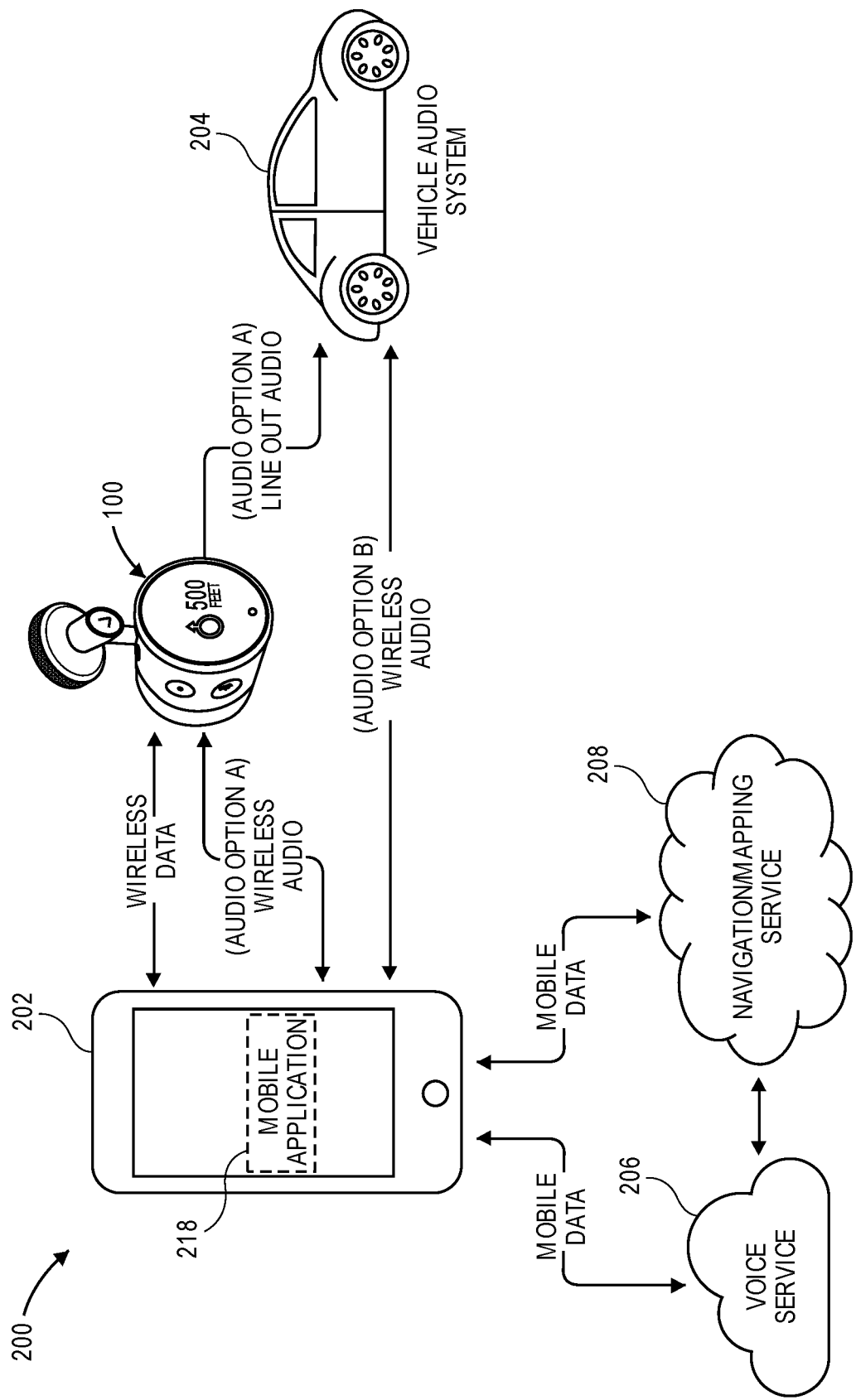
FIG. 2A is a block diagram illustrating a system that can employ a mobile application interface device, such as the mobile application interface device of FIGS. 1A through 1C, in accordance with an example embodiment of the present disclosure.

FIGS. 1A through 1C illustrate embodiments of a device 100 for interfacing with a mobile application running on a mobile device (e.g., as illustrated in FIG. 2A—mobile application 218 running on mobile device 202). As shown in FIG. 1C, the device 100 includes a controller 124 communicatively coupled to one or more input devices 138 and one or more output devices 140. In embodiments, an input device 138 can include, but is not limited to, a microphone 110, a camera 122, an electromechanical input device 108 (e.g., one or more buttons, switches, or toggles), and/or a touch-sensitive input device 142 (e.g., a touch pad, touch panel, or the like). In embodiments, an output device 140 can include, but is not limited to, a speaker 120, a display 104, one or more indicator lights 106, and/or an audio output interface 144 (e.g., a line out audio port or connector). The device 100 can further include a short-range communications transceiver 132 (e.g., a Bluetooth transceiver, near field communications (NFC) transceiver, WiFi transceiver, or the like). For example, as further described herein, the device 100 can be configured to send and receive communications to and from a mobile device (e.g., mobile device 202). In embodiments, the device 100 further includes a location determining component 134, such as, but not limited to, a Global Navigation Satellite System (GNSS) receiver (e.g., GPS receiver, GLONASS receiver, Galileo receiver, Beidou receiver, multi-protocol receiver, software defined GNSS receiver, or a combination thereof, or the like. In some embodiments, the device 100 may further include a magnetometer 136 for sensing a direction, heading, or bearing of the device 100 (or vehicle in which the device 100 is deployed). The device 100 may also include additional sensors (e.g., barometer, thermometer, speed sensor, proximity sensor, inertial sensor (e.g., accelerometer or gyroscope), any combination thereof, and so forth).

As shown in FIGS. 1A and 1B, the device 100 has a housing 102 that contains or otherwise provides supportive structure for other components making up the device. In some embodiments, the housing 102 is cylindrical, for example, as shown in FIGS. 1A and 1B. The housing may be constructed as a rectangular prism or any other shape; however, the cylindrical design can help reduce the windshield area blocked or obstructed by the housing while still allowing visual and audio interaction with the device. The overall size of the device 100 and/or its housing 102 may be determined by the internal components of the device 100. In some embodiments, the housing 102 is as small as possible while still containing or providing support for all other components of the device 100. In embodiments, the housing 102 is coupled to a mount 112 for securing the device 100 to a portion (e.g., windshield or dashboard) of a vehicle. The mount 112 can include a first end 116 configured to pivotally couple the mount 112 to the housing 102 (e.g., in a ball and socket configuration, a hinged configuration, or the like). The mount 112 can also include a second end 114 that defines a base with a suction, adhesive, or high friction surface 118 configured to secure the second end 114 to a portion (e.g., windshield or dashboard) of the vehicle, where the driver is then enabled to view the device 100 comfortably while operating the vehicle.

In an embodiment, the display 104 is disposed at one end or facet (e.g., front-facing surface) of the device 100 defined by the housing 102. The display 104 may be a light-emitting diode (LED) display, organic light-emitting diode (OLED) display, liquid crystal display (LCD), or the like. For example, in an embodiment, the display 104 is 0.84" OLED mono display. The device 100 may further include a plurality of indicator lights 106 (e.g., LEDs) proximate to the display 104. For example, the indicator lights 106 may be disposed about at least a portion of the display 104. In an embodiment, the indicator lights 106 form segments of a lighted ring (or portion of a ring) that completely or partially surrounds the display 104. As further described herein, the indictor lights 106 can be used in conjunction with or instead of the display 104 to provide visual prompts (e.g., connection information, speed warnings, distance/proximity indications, traffic alerts, forward collision warnings, lane departure warnings, direction indications, combinations thereof, and so forth). In embodiments, the display 104 may have a discrete appearance and may blend in with the front of the device 100 until information is provided via the display 104. For example, the display 104 and its surrounding features may appear black until the display 104 is active.

In some embodiments, the indicator lights 106 (e.g., LED segments forming a light ring ring) are configured to present maneuver and bearing information. For example, the indicator lights can form a light ring around the perimeter of a surface of the housing (e.g., around the display 104) that may be used for providing navigation information and instructions to the user. The controller 124 can be configured to present a light pattern via the indicator lights 106 to point the user towards the first road in a navigation route if they are in a parking lot and point the user back towards their route if they leave the navigation route (e.g., if the device cannot match the user's position to the active route or is recalculating the route). In some embodiments, the indicator lights 106 form a light ring that can dynamically fill up (e.g., from the bottom of the ring towards the top of the ring, left side to right side, or vice versa) as the user nears a turn maneuver to indicate and communicate a distance from a current geographic location to said turn maneuver. In some embodiments, the controller 124 can also be configured to provide a similar dynamic light pattern (e.g., gradually filling in portions of the light ring) to indicate proximity to a destination (e.g., the light ring can fill in from the bottom of the ring towards the top of the ring, left side to right side, or vice versa, as the user nears the destination).

In FIG. 1A, the device 100 is shown to include at least one microphone 110 positioned to receive spoken instructions or queries from a driver. For example, the microphone 110 is disposed proximate to the display 104. As shown in FIG. 1B, the speaker 120 may be disposed at an end or facet of the device 100 that is opposite the display 104 (e.g., at a rear-facing surface of the device 100). In some embodiments, the speaker 120 is configured to output audible audio signals; however, the device 100 may alternatively or additionally rely on a vehicle audio system and/or mobile device 200 for audio output capabilities.

In FIG. 1B, the device 100 is further shown to include a camera 122 (e.g., a dash cam) disposed proximate to the speaker 120. In some embodiments, the device 100 may include an accelerometer within the housing 102 that enables the device 100 to determine if the camera 122 is orientated such that it points straight ahead. The controller 124 may be configured to inform the driver (e.g., via the display or an audio output) to re-orient (re-aim) the camera 122 so features relying on data (images) received from the camera 122, such as lane departure warning and forward collision warning, can work properly. In some embodiments, the device 100 does not include a camera 122, and instead the speaker 120 may occupy an entirety of the rear-facing surface of the device 100.

In the embodiments illustrated in FIGS. 1A and 1B, the device also includes one or more buttons 108 (e.g., a mic mute button and an action button). The foregoing are examples of input devices 138 and output devices 140 that the device can include in some embodiments, but the device 100 can include other combinations of input devices 138 and output devices 140, such as those shown in FIG. 1C or any combination thereof.

The controller 124 is communicatively coupled with some or all of the components of the device 100. For example, the controller 124 can be communicatively coupled with the input device(s) 138, the output device(s) 140, short-range communications transceiver 132, location determining component 134, and any additional sensors or other components of the device 100. The controller 124 has a processor 126 included with or in the controller 124 to control the components and functions of the device 100 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the device 100. As shown in FIG. 1C, the controller 124 can include a processor 126, a memory 128, and a communications interface 130.

The processor 126 provides processing functionality for at least the controller 124 and can include any number of processors, micro-controllers, circuitry, field programmable gate array (FPGA) or other processing systems, and resident or external memory for storing data, executable code, and other information accessed or generated by the controller 124. The processor 126 can execute one or more software programs embodied in a non-transitory computer readable medium that implement techniques described herein. The processor 126 is not limited by the materials from which it is formed or the processing mechanisms employed therein and, as such, can be implemented via semiconductor(s) and/or transistors (e.g., using electronic integrated circuit (IC) components), and so forth.

The memory 128 can be a tangible, computer-readable storage medium that provides storage functionality to store various data and or program code associated with operation of the controller 124, such as software programs and/or code segments, or other data to instruct the processor 126, and possibly other components of the device 100/controller 124, to perform the functionality described herein. The memory 128 can store data, such as a program of instructions for operating the device 100 (including its components), and so forth. It should be noted that while a single memory 128 is described, a wide variety of types and combinations of memory (e.g., tangible, non-transitory memory) can be employed. The memory 128 can be integral with the processor 126, can comprise stand-alone memory, or can be a combination of both. Some examples of the memory 128 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the device 100 and/or the memory 128 can include removable integrated circuit card (ICC) memory, such as memory provided by a subscriber identity module (SIM) card, a universal subscriber identity module (USIM) card, a universal integrated circuit card (UICC), and so on.

The communications interface 130 can be operatively configured to communicate with components of the device 100. For example, the communications interface 130 can be configured to transmit data for storage in the device 100, retrieve data from storage in the device 100, and so forth. The communications interface 130 can also be communicatively coupled with the processor 126 to facilitate data transfer between components of the device 100 and the processor 126 (e.g., for communicating inputs to the processor 126 received from a device communicatively coupled with the controller 124, including, but not limited to, data received from the location determining component 134, any input device 138, and/or any other component of the device 100). It should be noted that while the communications interface 130 is described as a component of controller 124, one or more components of the communications interface 130 can be implemented as components of the device 100 or components communicatively coupled to the device 100 via a wired and/or wireless connection. For example, the device 100 and/or the controller 124 includes the short-range communications transceiver 132 (or in some embodiments, a transmitter and a receiver) for sending and receiving communications to and from a mobile device and/or vehicle audio system.

FIG. 2A illustrates an embodiment of a system 200 for vehicle navigation assistance that employs the device 100. The system 200 includes the device 100 and a mobile device 202 running a mobile application 218 for vehicle navigation assistance, where the device 100 is configured to send and receive data to and from the mobile application 218 running on the mobile device 202. The mobile application 218 is configured to facilitate communications between the device 100 and a first server 206 for voice service processing (e.g., AMAZON Voice Services, or the like) and a second server 208 for navigation/mapping service (e.g., GARMIN Navigation Services, or the like). For example, the mobile application 218 can send and receive mobile data communications to and from the servers 206 and 208 via a cellular transceiver 222 of the mobile device 202. In embodiments, the servers 206 and 208 can also be configured to communicate with one another. In other embodiments, the mobile application 218 includes or is connected to a navigation skill/client on the mobile device 202 that facilitates communications between the first server 206 and the second server 208. For example, the mobile application 218 can be configured to send data to the first server 206 for voice service processing based on spoken instructions/queries received via the device 100, and in turn, the first server 206 can either communicate an instruction (e.g., navigation command data) to the second server 208 in a format acceptable to the second server 208, or the first server 206 can send the instruction to the mobile application 218 that then communicates the instruction to the second server 208. In response, the second server 208 can send navigation data (e.g., route guidance/information, point of interest information, etc.) to the mobile application 218 and/or to the first server 206.

The device 100 and/or the mobile device 202 may also be communicatively coupled with a vehicle audio system 204 according to one or more configurations. For example, in one configuration, the mobile device 202 is configured to transmit audio outputs to the vehicle audio system 204 (e.g., via a Bluetooth connection (e.g., A2DP connection), NFC connection, Wi-Fi connection, or the like). In another configuration, the mobile device 202 is configured to transmit audio outputs to the device 100 that then transmits the audio outputs to the vehicle audio system 204 (e.g., via the audio output interface 144 or the short-range communications transceiver 132 of the device 100). In another configuration (e.g., in vehicles that have hands-free calling but lack A2DP capability), the mobile device 202 is configured to handle calls over a Bluetooth connection with the vehicle audio system 204 and is configured to transmit other audio outputs (e.g., guidance/information) to the device 100 that can then transmit the audio outputs to the vehicle audio system 204 via the audio output interface 144 of the device 100 (e.g., through an auxiliary input of the vehicle audio system 204 or the like). In other configurations, audio may be rendered through the device 100 and/or mobile device 202 speakers.

Figure 2B:
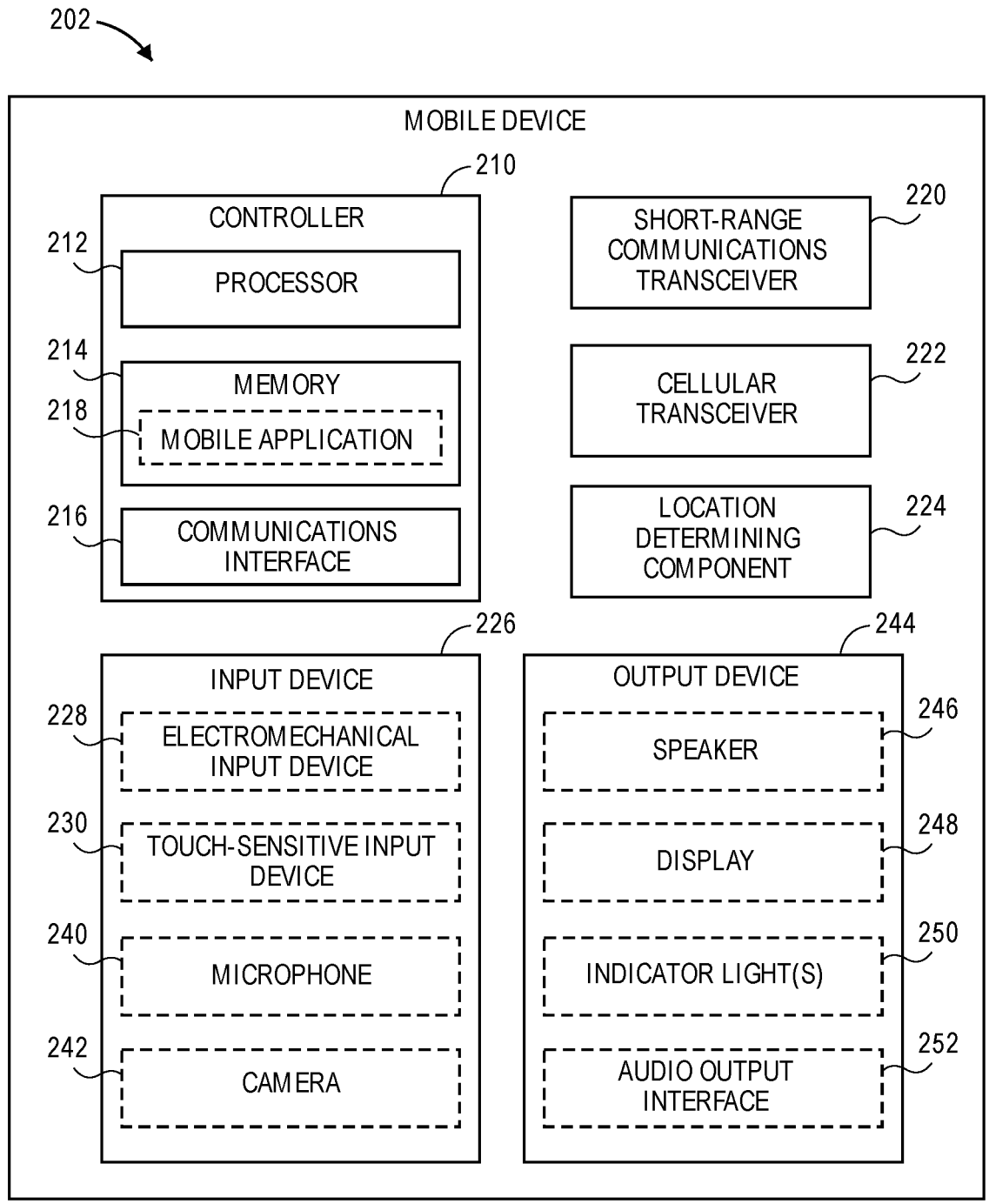
FIG. 2B is a block diagram illustrating a mobile device that can be configured to communicate with a mobile application interface device, such as the mobile application interface device of FIGS. 1A through 1C, in accordance with an example embodiment of the present disclosure.

An embodiment of the mobile device 202 is shown in FIG. 2B. The mobile device 202 may be a smartphone, media player, tablet, smartwatch, or the like. In embodiments, the mobile device 202 includes a controller 210 communicatively coupled to one or more input devices 226 and one or more output devices 244. In embodiments, an input device 226 can include, but is not limited to, an electromechanical input device 228 (e.g., one or more buttons, keypad, switches, or toggles), a touch-sensitive input device 230 (e.g., a touch pad, touch panel, or the like), a microphone 240, and/or a camera 242. In embodiments, an output device 244 can include, but is not limited to, a speaker 246, a display 248, one or more indicator lights 250, and/or an audio output interface 252 (e.g., a line out audio port or connector). The mobile device 202 can include a short-range communications transceiver 220 (e.g., a Bluetooth transceiver, near field communications (NFC) transceiver, WiFi transceiver, or the like). For example, as described herein, the mobile device 202 can be configured to communicate with the device 100 and/or the vehicle audio system 204 via the short-range communications transceiver 220. The mobile device 202 can also include a cellular transceiver 222 (e.g., 2G, 3G, 4G, and/or LTE transceiver or the like) for sending and receiving mobile data and handling calls. For example, the mobile device 202 can be configured to communicate with the servers 206 and 208 for voice and navigation services via the cellular transceiver 222. In embodiments, the mobile device 202 further includes a location determining component 224, such as, but not limited to, a Global Navigation Satellite System (GNSS) receiver (e.g., GPS receiver, GLONASS receiver, Galileo receiver, Beidou receiver, multi-protocol receiver, software defined GNSS receiver, or a combination thereof, or the like. For example, the mobile device 202 can be used instead of or in addition to the device 100 to determine a current location (e.g., vehicle position) for route guidance and/or information (e.g. point of interest searching, mapping, traffic updates, etc.).

The controller 210 is communicatively coupled with some or all of the components of the mobile device 202. For example, the controller 210 can be communicatively coupled with the input device(s) 226, the output device(s) 244, short-range communications transceiver 220, cellular transceiver 222, and any sensors or other components (e.g., location determining component 224) of the mobile device 202. The controller 210 has a processor 212 included with or in the controller 210 to control the components and functions of the mobile device 202 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the mobile device 202. As shown in FIG. 1C, the controller 210 can include a processor 212, a memory 214, and a communications interface 216.

The processor 212 provides processing functionality for at least the controller 210 and can include any number of processors, micro-controllers, circuitry, field programmable gate array (FPGA) or other processing systems, and resident or external memory for storing data, executable code, and other information accessed or generated by the controller 210. The processor 212 can execute one or more software programs (e.g., mobile application 218) embodied in a non-transitory computer readable medium (e.g., memory 214) that implement techniques described herein. The processor 212 is not limited by the materials from which it is formed or the processing mechanisms employed therein and, as such, can be implemented via semiconductor(s) and/or transistors (e.g., using electronic integrated circuit (IC) components), and so forth.

The memory 214 can be a tangible, computer-readable storage medium that provides storage functionality to store various data and or program code associated with operation of the controller 210, such as software programs (e.g., mobile application 218 or "App") and/or code segments, or other data to instruct the processor 212, and possibly other components of the mobile device 202/controller 210, to perform the functionality described herein. The memory 214 can store data, such as a program of instructions for operating the mobile device 202 (including its components), and so forth. It should be noted that while a single memory 214 is described, a wide variety of types and combinations of memory (e.g., tangible, non-transitory memory) can be employed. The memory 214 can be integral with the processor 212, can comprise stand-alone memory, or can be a combination of both. Some examples of the memory 214 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the mobile device 202 and/or the memory 214 can include removable integrated circuit card (ICC) memory, such as memory provided by a subscriber identity module (SIM) card, a universal subscriber identity module (USIM) card, a universal integrated circuit card (UICC), and so on.

The communications interface 216 can be operatively configured to communicate with components of the mobile device 202. For example, the communications interface 216 can be configured to transmit data for storage in the mobile device 202, retrieve data from storage in the mobile device 202, and so forth. The communications interface 216 can also be communicatively coupled with the processor 212 to facilitate data transfer between components of the mobile device 202 and the processor 212 (e.g., for communicating inputs to the processor 212 received from a device communicatively coupled with the controller 210, including, but not limited to, data received from the location determining component 224, any input device 226, and/or any other component of the mobile device 202). It should be noted that while the communications interface 216 is described as a component of controller 210, one or more components of the communications interface 216 can be implemented as components of the mobile device 202 or components communicatively coupled to the mobile device 202 via a wired and/or wireless connection. For example, the mobile device 202 and/or the controller 210 includes the short-range communications transceiver 220 (or in some embodiments, a transmitter and a receiver) for sending and receiving communications to and from the device 100 and/or vehicle audio system 204. The mobile device 202 and/or the controller 210 also includes the cellular transceiver 222 for making phone calls and for sending and receiving communications to and from the voice service and navigation/mapping servers 206 and 208.

Figure 2C:
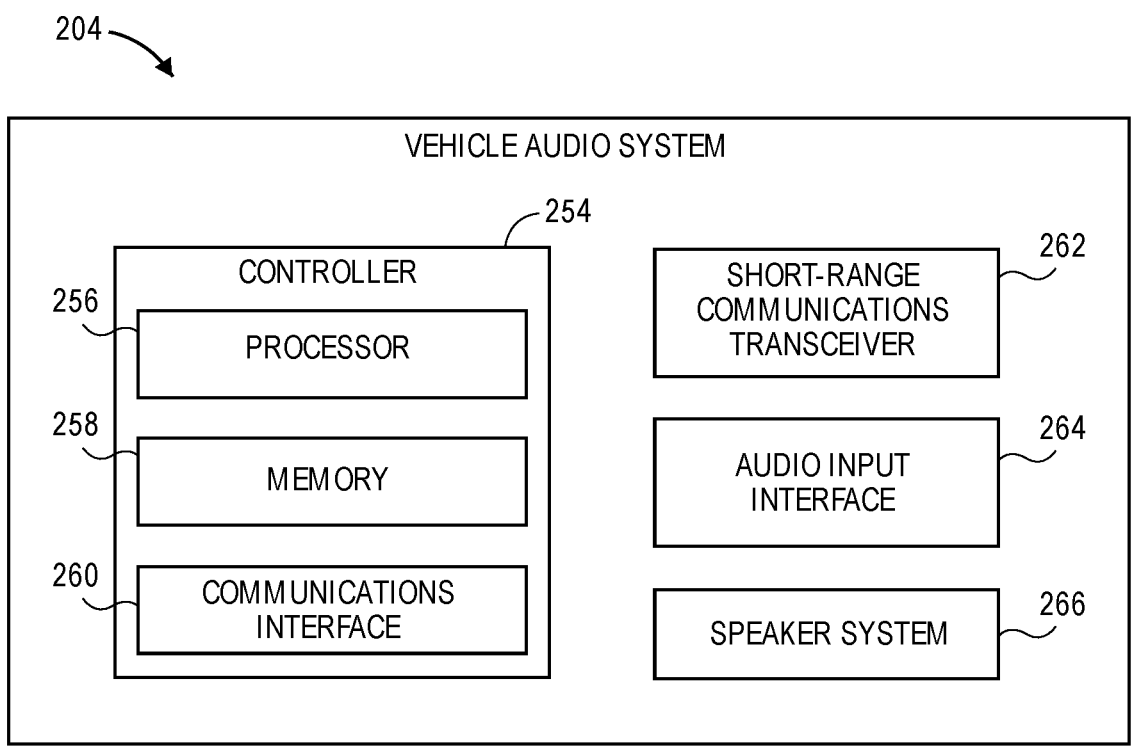
FIG. 2C is a block diagram illustrating a vehicle audio system that can be configured to communicate with a mobile application interface device, such as the mobile application interface device of FIGS. 1A through 1C, and/or a mobile device, such as the mobile device of FIG. 2B, in accordance with an example embodiment of the present disclosure.

As shown in FIG. 2C, the vehicle audio system 204 may also include a controller 254 having a processor 256, memory 258, and communications interface 260. The controller 254 can be configured to manage connectivity with the device 100 and/or mobile device 202 for audio streaming and/or hands-free calling as described herein. For example, the controller 254 can be configured to receive audio outputs from the device 100 and/or mobile device 202 via a short-range communications transceiver 262 (e.g., Bluetooth, NFC, and/or WiFi transceiver) of the vehicle audio system 204 and can be further configured to render the audio outputs via a speaker system 266. In some embodiments, the vehicle audio system 204 is configured to receive the audio outputs from the device 100 and/or mobile device 202 via an audio input interface 264 (e.g., auxiliary input, USB input, or other audio connector/receiver). For example, the vehicle audio system 204 can be configured to receive audio from the device 100 and/or audio system 204 for streaming through the speaker system 266 via the audio input interface 264 instead of via a short-range communications transceiver 262. In another example, the vehicle audio system 204 has both wired and wireless capabilities, where the vehicle audio system 204 is configured for wired (e.g., via the audio input interface 264) and wireless (e.g., via the short-range communications transceiver 262) connectivity based on user preference. As previously noted herein, there are a variety of configurations that can be implemented based on user preference and/or capabilities of the vehicle audio system 204 and/or mobile device 202 used in conjunction with the device 100 to implement the system 200.

The device 100 and/or system 200 can be configured with various arrangements of components, programming, and so forth. In some embodiments, the device 100 and/or system 200 is/are configured by disabling Bluetooth service delivery platform (SDP) advertised services from a client. The system 200 can include Bluetooth connections between the device 100, mobile application 218 (e.g., via mobile device 202), and the vehicle audio system 204. In embodiments, depending on the user's configuration settings in the mobile application 218, the device 100 might not inform the mobile application 218 of all of its capabilities so that the mobile application 218 may share processing responsibilities between the controller 124 of the device 100 and the controller 210 of the mobile device 202 and/or the controller 254 of the vehicle audio system 254. The mobile application 218 may be configured to cause the mobile device 202 to output a signal instructing the device 100 to not advertise these services.

In some embodiments, the device 100 is configured to search for a point of interest (POI) an intersection. For example, the device 100 may be configured to search for a POI near an intersection identified by the user (e.g., "Find a Starbucks near 151st Street and Blackbob road"). The device 100 can be configured to receive voice inputs (e.g., spoken instructions and queries), sometimes without any other input methods, by continuously listening for a wake word (e.g., "Alexa," "Siri," "Cortana," "Ok Google," or the like). For example, the device 100 can be configured to provide location-based services and features (e.g., services relying on a position determined by the location determining component 134 (e.g., GPS)) that are controlled by voice. The device 100 may include buttons 108 (e.g., action and/or mic mute buttons, and so forth) or other input devices, but these other input devices may not need to interact with the location determining functionality. All control and operation of location-based services and features may be enabled by voice inputs from the user. In embodiments where the device 100 is limited to receiving voice inputs, the controller 124 or navigation/mapping service 208 may be configured to implement a technique to make search results usable by refining the query and selection process. For example, the user may ask the device 100 for assistance with navigating to a destination and the controller 124 or navigation/mapping service 208 can be configured to provide the user with search results one at a time—allowing the user to accept the result, proceed to the next result, move back to the previous result, or stop the search without picking a result.

The device 100 may feature full compatibility with an intelligent voice service (e.g., via communication with server 206). For example, the device 100 may be compatible with the AMAZON ALEXA platform or any other voice service that facilitates voice recognition accuracy to provide useful digital assistant and multimedia features. Integrating voice services enables the controller 124 of the device 100 (e.g., via the mobile device's 202 connectivity) to access to a full suite of features, such as a virtual assistant, music, podcasts, smart home integration, and custom skills. The device 100 builds on existing voice service platforms by adding search, navigation, dash cam, and driver awareness features.

The device 100 can be configured to receive spoken instructions or queries from a user to search for locations by using automatic speech recognition (ASR) via the voice services server 206. In embodiments, the device 100 is configured to receive a spoken instruction or query from a user via the microphone 110 and then send data associated with the spoken instruction or query to the mobile application 218 running on the mobile device 202 via the short-range communications transceiver 132. The mobile application 218 may then causes the mobile device 202 to transmit an audio output based on the spoken instruction or query via the short-range communications transceiver 220 to the vehicle audio system 204 or to the device 100 (e.g., for output via an audio output device (e.g., speaker 120 or audio output interface 144)). In some embodiments, the mobile application 218 is configured to cause the mobile device 202 to transmit the data associated with the spoken instruction or query to server 206 via the cellular transceiver 222 for voice service processing and is further configured to receive navigation command data from server 206 based on the spoken instruction or query. The mobile application 218 can be further configured to transmit the navigation command data and data associated with the current position of the device 100 (e.g., based on signals received via location determining component 134 or location determining component 224) to server 208 via the cellular transceiver for navigation service processing. The mobile application 218 may be configured to receive information for the audio output (which can be provided via the device 100, vehicle audio system 204, and/or mobile device 202) and/or a display output (e.g., information which may be provided via the display 104 of the device 100) from server 208 in response to the navigation command data and the data associated with the current position of the device 100. In other embodiments, the mobile application 218 can send both the data associated with the spoken instruction or query and the data associated with the current position of the device 100 to server 206 which may perform a search based on the spoken instruction or query and the current position of the device 100 and may then provide navigation command data in a format acceptable to server 208 directly or indirectly (e.g., via the mobile application 218) to server 208 which then returns navigation data for the device 100 (e.g., to generate one or more audio outputs and/or display (e.g., symbolic and/or text) outputs). By speaking, the user may be able to quickly perform complex searches that would otherwise require several steps on a navigation device using a touch interface. For example, a user may ask, "Where can I get barbecue in Kansas City?" instead of having to select the appropriate menu options to select the area (city) of interest and category for a POI search.

Figure 3:
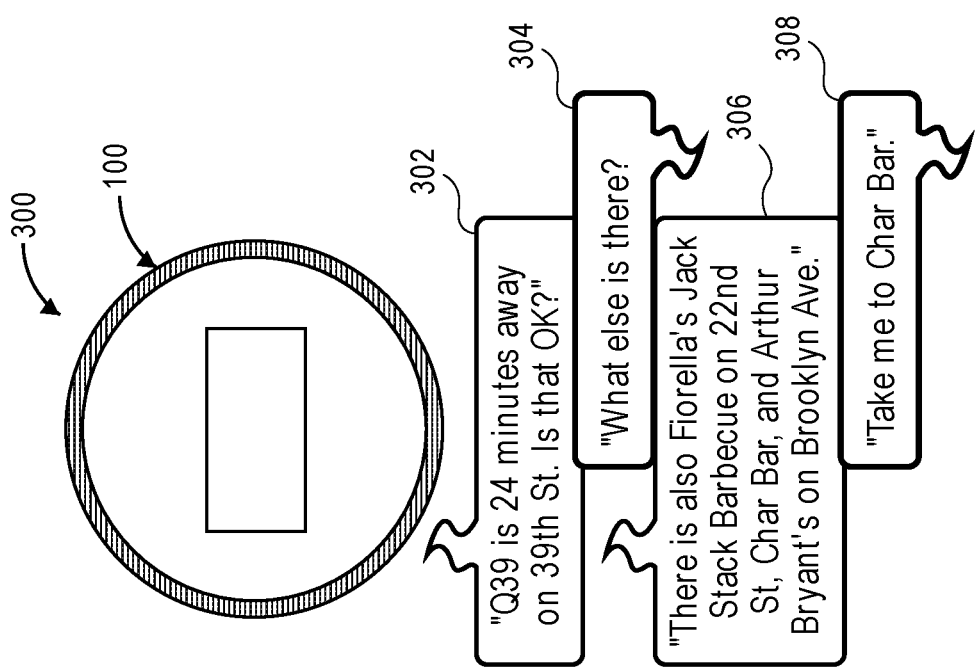
FIG. 3 shows an example output from a mobile application interface device, such as the mobile application interface device of FIGS. 1A through 1C.

FIG. 3 shows an example dialogue 300 between the user and the device 100. For example, the user may ask "Where can I get barbecue in Kansas City?" and the device 100 may respond to the user query with a first suggestion 302 based on the current location of the device 100. As shown, the user may provide a second query 304 for alternative suggestions, and the device 100 can provide additional suggestions 306 (e.g., places that are the next closest options or prioritized based on past behavior, favorites, etc.). The device 100 can begin route navigation when the user provides an instruction 308 based on a selected destination or acceptance of a suggestion provided by the device 100. In some embodiments, server 206 processes the voice inputs (e.g., the user's instructions/queries) and server 208 provides route guidance information and other location services. There can be overlap in functionalities. For example, server 206 may be configured to process voice inputs and also perform search functions. Furthermore, some voice inputs can be directly transferred to server 208 for navigation/mapping services (e.g., when the user speaks a query that is known to the mobile application 218, e.g., "Where am I?").

In implementations, the device 100 allows a user to find a POI based on name or category. For example, the user can say "Navigate to Starbucks", "Navigate to Bobo Chinese", or "Find the nearest gas station". In implementations, the device 100 allows a user to find a POI based on rating. For example, the user may able to say "Find the best barbecue restaurant nearby" and server 206 may be configured to identify and return highly-rated results stored in a memory (e.g., ratings from Foursquare or TripAdvisor). The server 206 can be further configured to select and implement techniques to enable the user to complete a name, category, or rating POI searches, by specifying one or more of the following search locations: POIs Near a City—the user may be able to say "Navigate to Starbucks near Seattle" or "Find barbecue near Kansas City"; POIs Near an intersection—the user may be able to say "Find the Chipotle near 95th and Metcalf" or "Find a pharmacy near 151st Street and Antioch"; POIs Along Route—the user may be able to say "Find a gas station ahead" or "Navigate to the next Starbucks up ahead"; Addresses—the user may be able to say "Navigate to 1200 East 151st St" or "1313 Harbor Blvd, Anaheim, Calif."; City Search—the user may be able to say "Navigate to Los Angeles"; and Saved Places—the user may be able to say "Navigate home" and may also be able to store in a memory a variety of other pre-defined locations such as "work" and "school."

Figure 4:
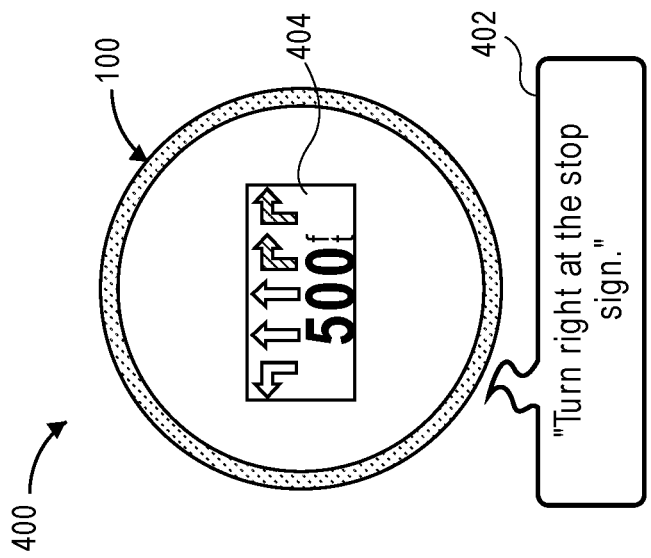
FIG. 4 shows an example output from a mobile application interface device, such as the mobile application interface device of FIGS. 1A through 1C.

The device 100 can improve real directions and direct access features to provide spoken turn-by-turn instructions that do not require a display device or any interaction with such a touchscreen. For example, FIG. 4 shows an example device output 400 that includes a display (e.g., symbolic and/or text) output 404 in addition to an audio output 402. One or more of the controllers (e.g., controller 124 and/or controller 210) may determine a display output 404 that includes a distance and an icon for the next maneuver to reach a destination. The device controller 124 can be configured to output audible voice instructions 402 and present the determined distance and icon 404 on the display 104 to assist the user with traveling to the destination.

In embodiments, the display 104 may be small. The controller 124 can be configured to provide icons and text associated with a next maneuver instead of providing full guidance information due to the limited information that may be presented on a small display. Example display outputs are illustrated in FIGS. 5A through 5H. For example, FIG. 5A illustrates pre-turn preparation; FIG. 5B illustrates a simple turn arrow; FIGS. 5C and 5D illustrate lane assist guidance; FIG. 5E illustrates end of route guidance; FIGS. 5F and 5G illustrate lane assist guidance with identification of a street name; and FIG. 5H illustrates end of route guidance with a house number.

Figure 6:
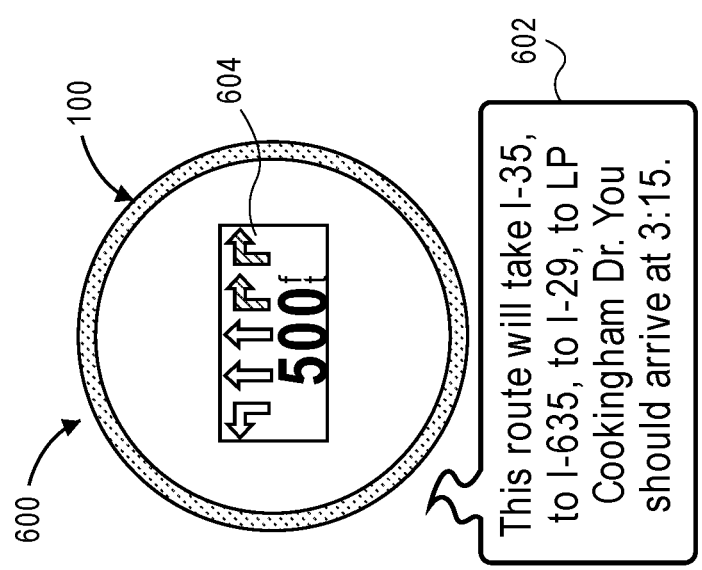
FIG. 6 shows an example output from a mobile application interface device, such as the mobile application interface device of FIGS. 1A through 1C.

At the start of a route, the device 100 can be configured to present information to help clarify a major road that may be taken, to help the user understand which way the route is going. For example, FIG. 6 shows an example device output 600 that includes a display (e.g., symbolic and/or text) output 604 in addition to an audio output 602. One or more of the controllers (e.g., controller 124 and/or controller 210) may determine a display output 604 that includes a distance and an icon for the next maneuver to reach a destination. The device controller 124 can be configured to output audible voice instructions 602 including information regarding the route (e.g., major roads), destination, estimated time of arrival (ETA), and/or other route information for the user when the route guidance begins or is about to begin.

Figure 7:
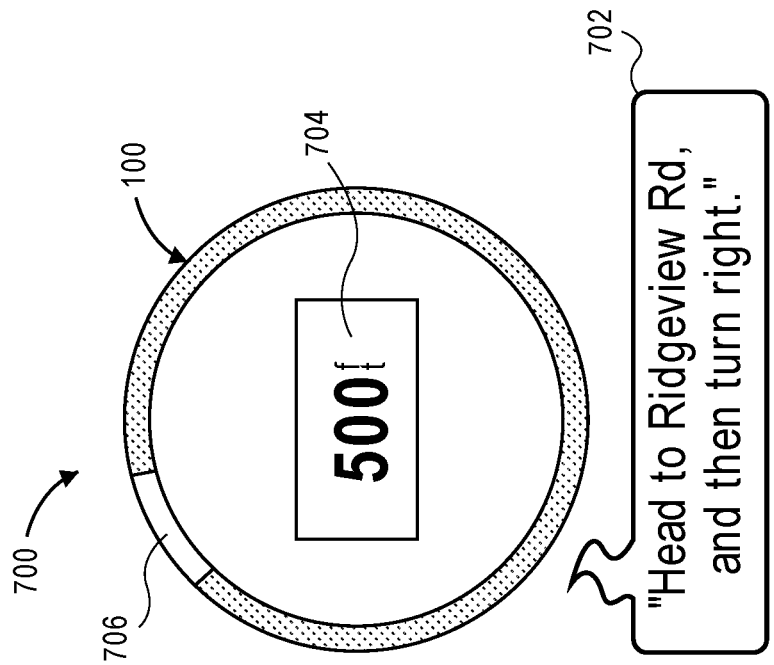
FIG. 7 shows an example output from a mobile application interface device, such as the mobile application interface device of FIGS. 1A through 1C.

When the user starts a route to a destination in a parking lot or other off-road or unmarked location, the controller 124 may be configured to output audible instructions providing detailed instructions supplementing the information presented on the display 104 to assist the user with starting the determined route. For example, FIG. 7 shows an example device output 700 that includes a display (e.g., symbolic and/or text) output 704 in addition to an audio output 702. One or more of the controllers (e.g., controller 124 and/or controller 210) may determine a display output 704 that includes a distance to a road at which the route guidance begins. The device controller 124 can also be configured to output audible voice instructions 702 that instruct the user to head to the road at which the route guidance begins. The display output 704 may also include an arrow pointing towards the road to assist the user. In some embodiments, the controller 124 is configured to present an illumination pattern 706 via the indicator lights 106 to point towards the road (e.g., in addition to or instead of a pointer on the display 104).

Figure 8A:
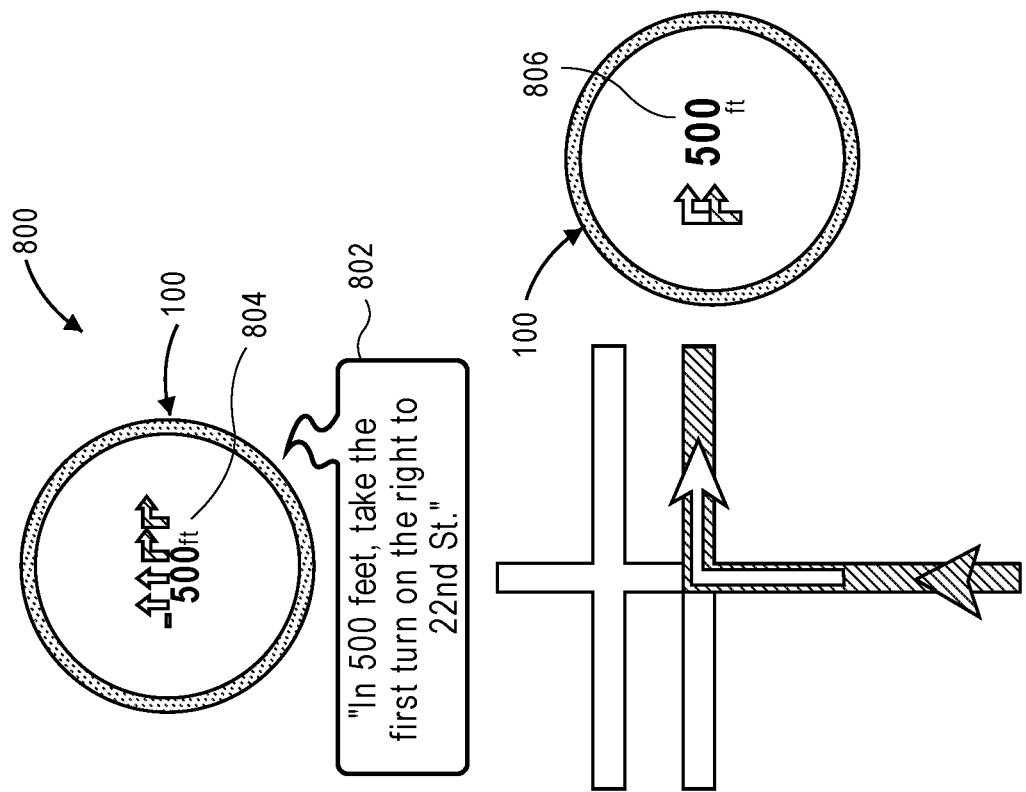
FIG. 8A shows an example output from a mobile application interface device, such as the mobile application interface device of FIGS. 1A through 1C.
Figure 8B:
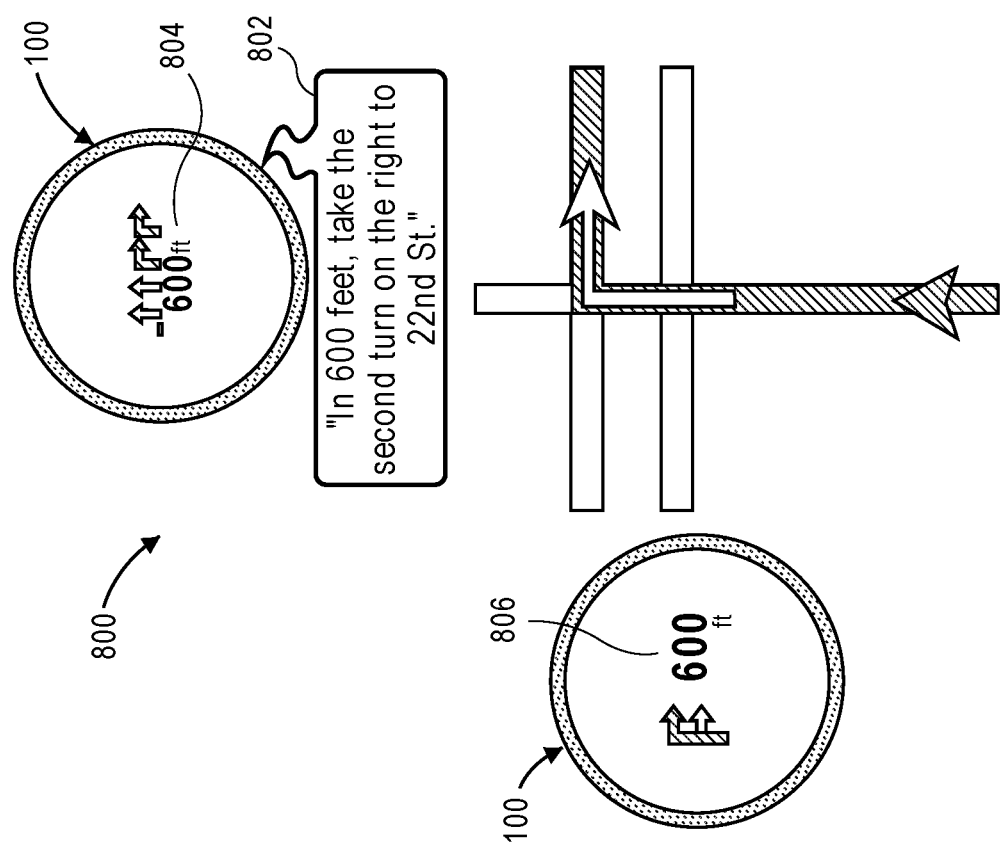
FIG. 8B shows an example output from a mobile application interface device, such as the mobile application interface device of FIGS. 1A through 1C.

In densely-populated cities (having many roads in a geographic area), it can be challenging to guide a user through a route on roads that are very close to other roads. The controller 124 can be configured to control the display 104 and the indicator lights 106 to illustrate when to take a turn or remain on the current road. For example, FIGS. 8A and 8B show examples of a device output 800 that includes a display (e.g., symbolic and/or text) output 804 in addition to an audio output 802. One or more of the controllers (e.g., controller 124 and/or controller 210) may determine a display output 804 that includes a distance to a turn. The device controller 124 can also be configured to output audible voice instructions 802 that instruct the user to turn with a distance to turn and detailed information (e.g., "the second turn on the right"). As the user nears the turn, the controller 124 can be configured to generate an output 806 that provides a detailed and/or zoomed in view of which turn the user should be making. Additionally, the controller 124 can be configured to present a dynamic illumination pattern via the indicator lights (e.g., by filling in the ring with light or a particular color) to indicate proximity of the vehicle to the turn. This can help ensure that the user does not make a turn too early or too late (e.g., onto a wrong street).

Figure 9C:
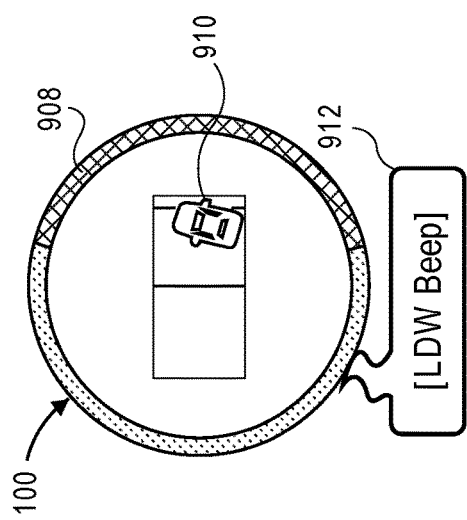
FIG. 9C shows an example output from a mobile application interface device, such as the mobile application interface device of FIGS. 1A through 1C.

It is common for a user to go off-route when driving to a destination, for example, when traveling around a parking lot near the end of a route. In these situations, the controller 124 can be configured to display a distance to the destination and provide an illumination pattern via the indicator lights 106 to guide the user to the destination. For example, FIG. 9A shows an example of a device output towards the end of the route. In embodiments, the controller 124 is configured to initiate an arrival mode when the current position is less than a threshold distance from the destination or the current position corresponds to an unmarked location. As shown in FIG. 9A, when in the arrival mode, the controller 124 can control the indicator lights 106 to present an illumination pattern 900 that acts as a bearing pointer to help point the user to the destination. The controller 124 can also be configured to cause the display 104 to display a distance to the destination and/or an arrow that points the user to the destination. In some embodiments, the controller 124 is configured to cause the display 104 to present an arrow that points the user to the destination instead of presenting an illumination pattern via the indicator lights 106.

In some embodiments, the device 100 includes a camera 122 that may face in front of the vehicle when the device 100 is oriented accordingly. The controller 124 can be configured to utilize data (e.g., images and/or video footage) from the camera 122 to provide a number of features. For example, the device 100 can be configured to record video footage or images of the area in front of the vehicle continuously, periodically, or on demand. In embodiments, the controller 124 is configured to save the images or video footage in a memory (e.g., memory 128 of the device 100, memory 214 of the mobile device 202, or in a remote server (e.g., server 206, 208, or a data storage server). In some embodiments, the controller 124 is configured to save the images or video footage to the memory when an incident is detected (e.g., a collision, abrupt stop, etc.) or after receiving a voice input from the user instructing the device 100 to save the images or video footage. In some embodiments, the device 100 is further configured to save a "time-lapse" entry including stored footage, location, and/or time information. The device 100 can be configured to store the time-lapse entries to a server to enable sharing of a user's journey with friends or on social media.

The device 100 may control the display 104, indicator lights 106, and/or speaker 120 (or audio output interface 144) to notify the user when the user is too close to a car in front of the user's vehicle, when the user is driving too close to another lane, when the user is not moving with traffic, and so forth.

Figure 9B:
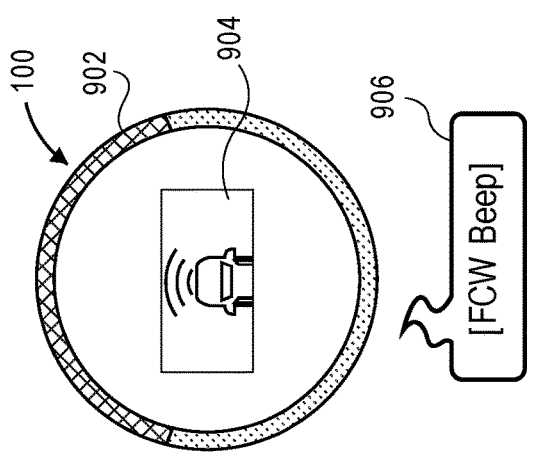
FIG. 9B shows an example output from a mobile application interface device, such as the mobile application interface device of FIGS. 1A through 1C.
Figure 12A:
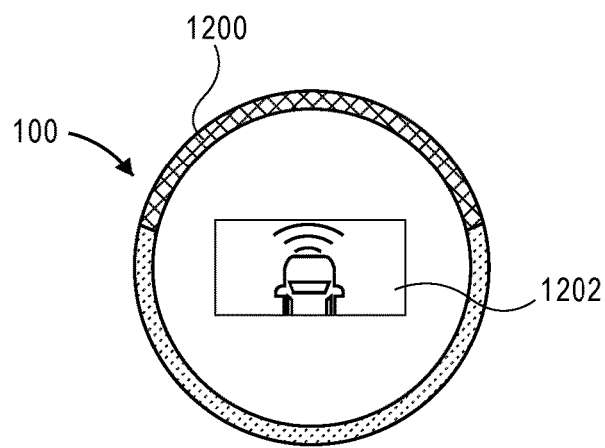
FIG. 12A shows an example output from a mobile application interface device, such as the mobile application interface device of FIGS. 1A through 1C.

FIG. 9B illustrates an example embodiment where the controller 124 is configured to detect when there is less than a threshold proximity (e.g., less than a threshold distance) to an object in a field of view of the camera 122 based on the image(s) and/or video recorded by the camera 122 while the device 100 is in motion, and the controller 124 further configured to cause the plurality of indicator lights 106 to display a forward collision warning illumination pattern 902 (e.g., lighting up or flashing the light ring or a portion (e.g., front portion) of the light ring) in response to detecting less than a threshold proximity to an object in the field of view of the camera 122. The controller 124 can also be configured to provide a forward collision warning display output 904 and/or audio output 906 to alert the user. Another example is shown in FIG. 12A, where the front portion 1200 of the light ring defined by the indicator lights 106 is illuminated and a forward collision warning display icon 1202 is presented via the display 104.

Figure 12B:
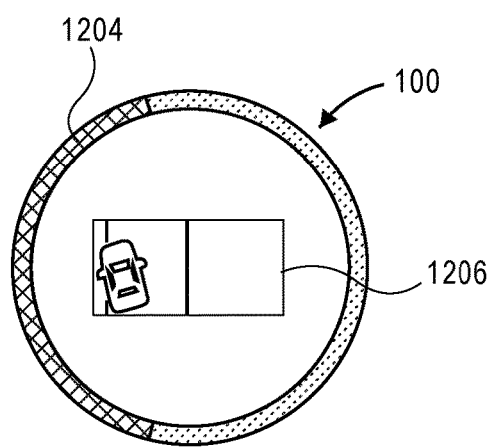
FIG. 12B shows an example output from a mobile application interface device, such as the mobile application interface device of FIGS. 1A through 1C.

FIG. 9C illustrates another example embodiment where the controller 124 is configured to detect when there at least a threshold deviation from a reference alignment between lanes in a field of view of the camera 122 based on the image(s) and/or video recorded by the camera 122 while the device 100 is in motion, and the controller 124 further configured to cause the plurality of indicator lights 106 to display a lane departure warning illumination pattern 908 (e.g., lighting up or flashing the right or left side of the light ring) in response to detecting at least a threshold deviation from a reference alignment between lanes in a field of view of the camera 122. The controller 124 can also be configured to provide a lane departure warning display output 910 and/or audio output 912 to alert the user. Another example is shown in FIG. 12B, where the left portion 1204 of the light ring defined by the indicator lights 106 is illuminated to indicate a left-side lane departure and a left-side lane departure warning display icon 1206 is presented via the display 104.

Figure 9E:
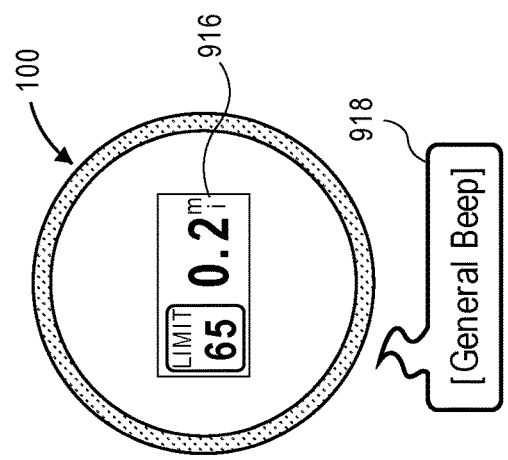
FIG. 9E shows an example output from a mobile application interface device, such as the mobile application interface device of FIGS. 1A through 1C.
Figure 9A:
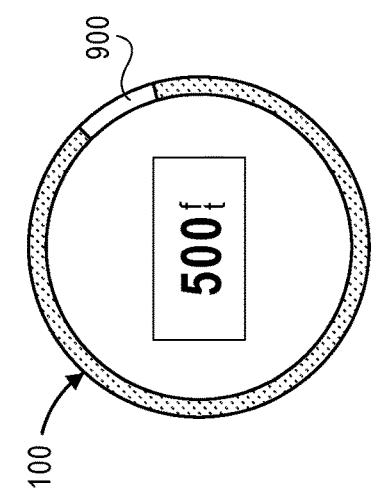
FIG. 9A shows an example output from a mobile application interface device, such as the mobile application interface device of FIGS. 1A through 1C.
Figure 9D:
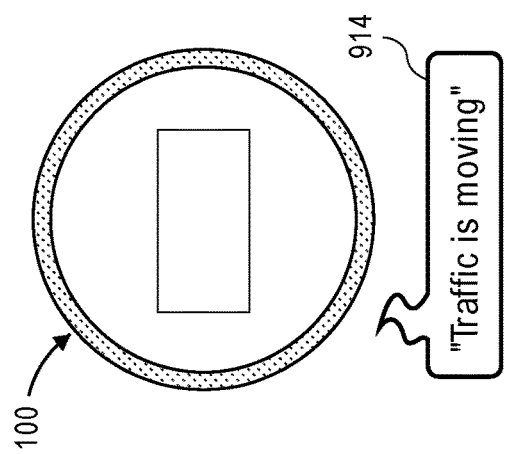
FIG. 9D shows an example output from a mobile application interface device, such as the mobile application interface device of FIGS. 1A through 1C.

As shown in FIG. 9D, the controller 124 can also be configured to provide an audio output 914 and/or display output to alert the user that traffic has begun moving. For example, the controller 124 can be configured to determine that objects (e.g., other vehicles) in the field of view of the camera 122 have are no longer in view or are at least a threshold distance from the camera 122, and the controller 124 can be configured to provide the audio output 914 and/or display output to alert the user that traffic has begun moving in response to determining that the objects are no longer in view or are at least a threshold distance from the camera 122. Oftentimes, a user may be distracted while sitting at a traffic light and not realize that a car ahead of the user's vehicle has started moving. Accordingly, providing an audio alert 914 for the user can help refocus the user's attention.

In embodiments, the device 100 can be configured to receive speed limit information associated with a current location of the device 100 (e.g., a speed limit on a current road traversed by the user's vehicle) and determine when the speed limit reduces on the current road ahead. For example, the device 100 can be configured to receive this information from server 208. The controller 100 may be configured to present a speed reduction warning (e.g., flashing yellow light, or the like) via the indicator lights 106 to alert the user that the current road has a reduced speed limit ahead. As shown in FIG. 9E, the controller 124 can also be configured to provide a display output 916 and/or audio output 918 to alert the user of an upcoming speed reduction. In some embodiments, the memory 128 of the device 100 itself may include maps or map data with speed limit information to provide this warning during navigation or at any other time. When the device 100 is determined to be in a vehicle traveling at a speed in excess of (e.g., over) the speed limit, the controller 124 may control the display 104 and/or the indicator lights 106 to alert the driver, such as with a subtle indicator (e.g., flashing display output and/or change in color of the indicator lights 106). In embodiments, the controller 124 can also be configured to provide an audible warning via the speaker 120 and/or audio output interface 144. The speed of the vehicle may be determined based on change in position (e.g., based on signals received via the location determining component 134), based on camera 122 footage, based on information received from the vehicle, or based on a speed detected by a speed sensor in the device 100.

The device 100 may support a variety of features commonly used in everyday drives. For example, the device 100 may be configured to provide access to music, podcast, audio book services, news, and other media stored remoted on remote servers (e.g., server 206), such as AMAZON servers, GOOGLE servers, YAHOO servers, and the like. The device 100 may also access media services, such as, but not limited to, PANDORA, SPOTIFY, SOUNDCLOUD, ITUNES, and GOOGLE PLAY.

The device 100 may support various "smart notifications" that may appear with a visual indicator to minimize disruption to a user with audio or a voice prompt. For example, the user may ask the device 100 to read an incoming message and then vocally instruct the device to clear or delete the message, reply, read the next message, access previously stored messages, and so forth. In embodiments, different notifications may be turned on/off via the mobile application 218 on the mobile device 202 based on user preference and/or to prevent distractions while the user is driving (e.g., during route guidance).

The device 100 may connect to a remote server (e.g., server 206, 208, or another server) that provides weather information and service. In embodiments, the controller 124 and/or controller 210 may be configured to transmit the current location of the device 100 (e.g., the current geographic position determined by the location determining component 134) and/or route information (e.g., navigation data) to the remote server to receive weather information from the remote server based upon the current location of the device 100 and/or route information (e.g., weather conditions at the current location or between the current location and the destination).

The device 100 can also be configured to receive traffic updates. For example, the device 100 may be configured to periodically receive or request updated traffic information from a remote server (e.g., server 206, 208, or another server). In embodiments, controller 124 and/or controller 210 may be configured to transmit the current location of the device 100 and/or route information (e.g., navigation data) to the remote server to receive updated traffic information from the remote server based upon the current location of the device 100 and/or route information (e.g., traffic conditions at the current location or between the current location and the destination). In some embodiments, controller 124 and/or controller 210 may be configured to receive traffic information from the remote server automatically if traffic is determined to exist along a current route to a destination. Controller 124 and/or controller 210 may be configured to receive navigation data from the remote server (e.g., server 208) based on the updated traffic information to calculate a route to the destination. For example, the route may be at least partially based on (e.g., optimized for) the current traffic conditions. In some embodiments, the user may able to ask, "How's the traffic ahead". The device 100 may connect to a server associated with a traffic provider other than the voice services server 206, such as the navigation/mapping services server 208, to determine current traffic conditions and control the display 104, indicator lights 106, and speaker 120 to provide the traffic information.

In embodiments, the device 100 is also configured to connect with a remote server (e.g., server 206 and/or 208) to determine answers to questions such as, "Where am I", to obtain the name of the road being driven on, and "What's the speed limit?", to obtain the current speed limit of that road (if stored map data contains that information).

As previously noted herein, the device 100 can include one or more of the following forms of output: an indicator light 106 (e.g., an LED ring), a display 104 (e.g., LED/OLED display), and a speaker 120 or audio output interface 144. The controller 124 is configured to control any of the output devices 140 (e.g., indicator lights 106, display 104, speaker 120 and/or audio output interface 144) to provide the user with information, alerts, responses to queries, message notifications, calendar notifications, and so forth.

Figure 10:
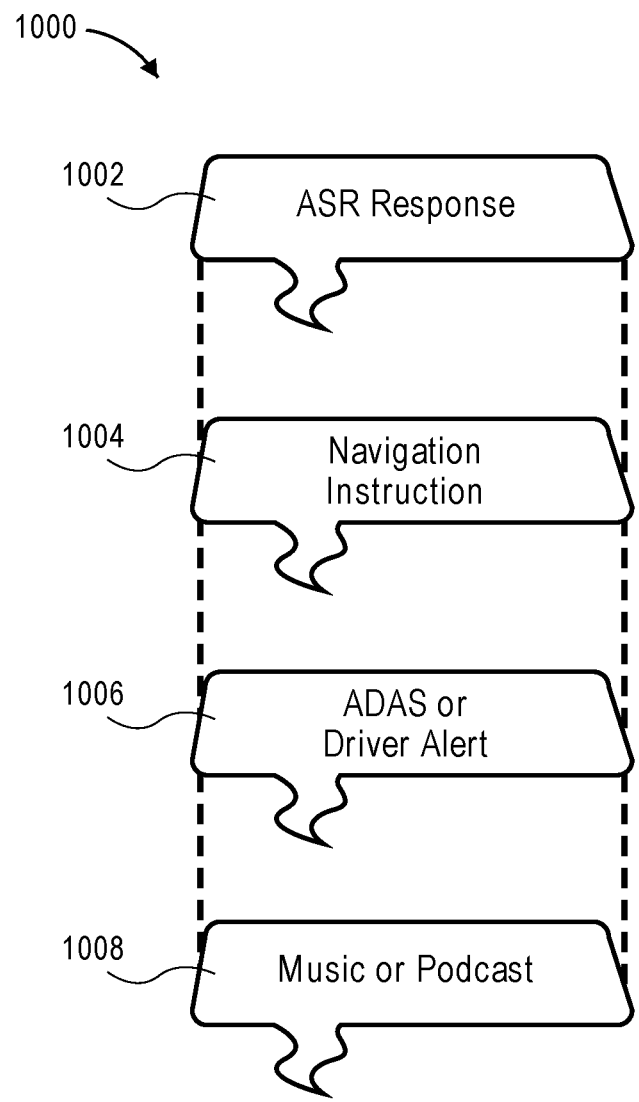
FIG. 10 shows audio output/alert priorities for a mobile application interface device, such as the mobile application interface device of FIGS. 1A through 1C, in accordance with an example embodiment of the present disclosure.

The speaker 120 and/or audio output interface 144 outputs audible information and provides a "voice" for the device 100. The controller 124 is configured to employ the speaker 120 and/or audio output interface 144 to respond to voice queries, providing navigation instructions, driver assistance alerts, and in-car entertainment with music, audio books, or podcasts. The spoken instructions or queries can be sent to server 206 for voice services processing, where the server 206 is configured to return responsive communications to the device 100 and can also be configured to translate the user's natural language instructions/queries into command data formatted for a navigation/mapping server 208 or any other server that server 206 is working with to answer the user's query or fulfill the user's instruction. In some implementations, spoken information may be given in the "ALEXA" voice by querying AMAZON's cloud-based, text-to-speech (TTS) engine, and the command data can include instructions formatted for the navigation/mapping server 208 (e.g., GARMIN's cloud-based navigation/mapping services)). The priority of information output by the speaker 120 and/or audio output interface 144 may be as shown in FIG. 10, for example, the priority chain 1000 can be as follows: (1) ASR responses 1002; (2) navigation instructions 1004; (3) alerts and warnings (e.g., ADAS or other driver alerts) 1006, (4) Music or Podcasts 1008, with 1 being the highest priority and 4 being the lowest.

The controller 124 can be configured to present various illumination patterns via the indicator lights 106 (e.g., an LED light ring) to enhance and visualize information provided in the ASR conversation. Different illumination patterns may be implemented to provide information, such as different states for use when the device 100 is speaking, listening, and thinking. Controller 124 and controller 210 may work closely with the voice processing server 206 to provide a consistent experience between the device 100 and a compatible product (e.g., a smart home assistant, such as AMAZON ECHO, or the like). In embodiments, the indicator lights 106 define an LED light ring that includes a plurality of (e.g., 8, 10, 12, 14, 16, etc.) individually selectable/controllable light segments.

Figure 11:
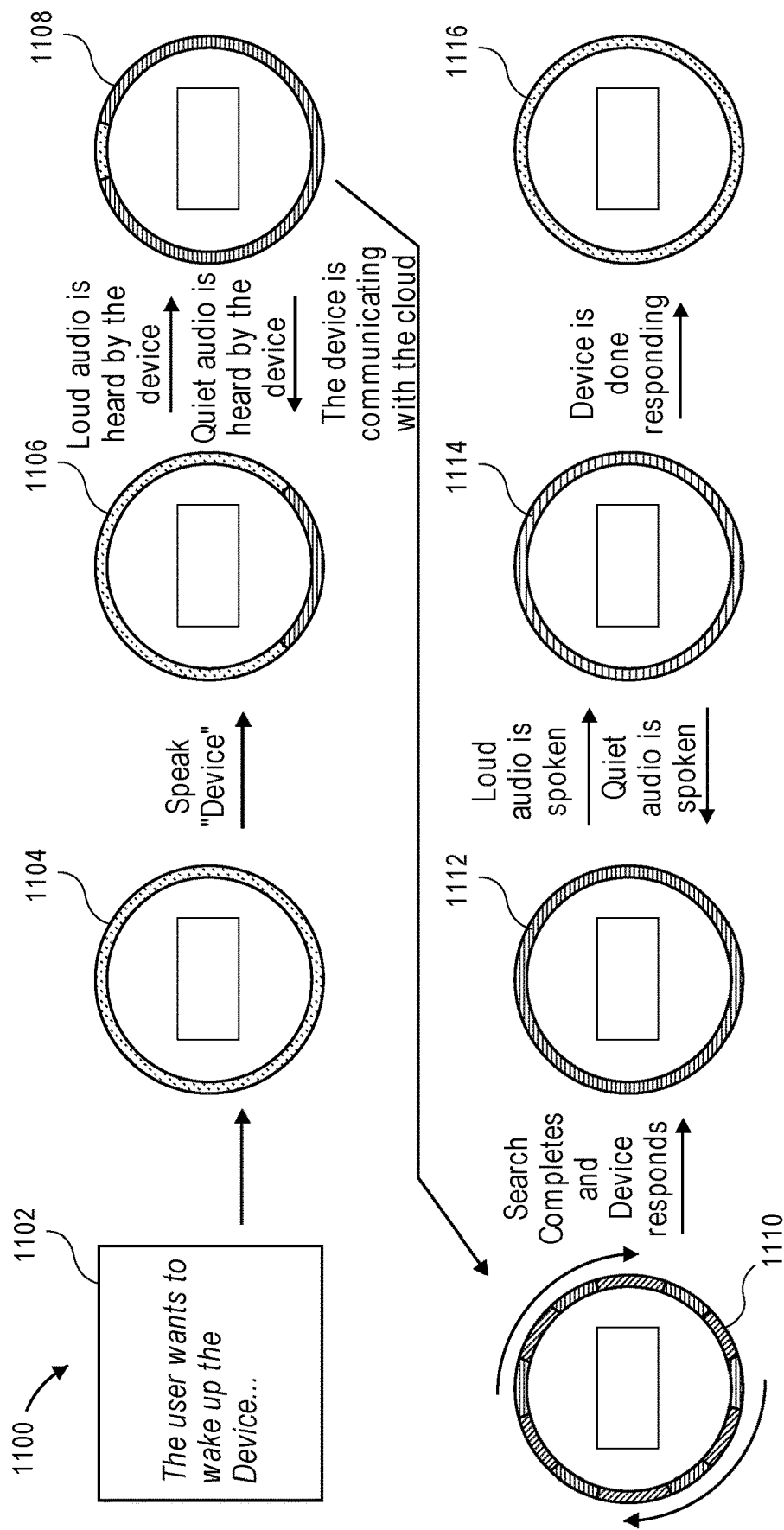
FIG. 11 is a flow diagram showing an example process that employs a mobile application interface device, such as the mobile application interface device of FIGS. 1A through 1C.

FIG. 11 shows an example process 1100 for interacting with the device 100 that employs the indicator lights 106 to indicate device states to the user. The device 100 listens for the user to speak a wakeup word (block 1102). Until the user does so, the indicator lights 106 may be turned off completely or set to a standby/inactive illumination pattern (block 1104). When the user speaks a wake word (e.g., "Device", "Alexa," "Siri," "Cortana," "Ok Google," or the like), the device can present an illumination pattern to indicate that the device is listening (block 1106). If the spoken instruction/query is too quiet, the device 100 can continue to listen (block 1106). If the spoken instruction/query is at least a threshold volume, the device communicates the audio to the voice services server 206 (block 1108). For example, the device 100 can be configured to transmit the spoken instruction/query to the mobile application 218 running on the mobile device 202, where the mobile application 218 causes the mobile device 202 to communicate the spoken instruction/query to the server 206. The device 100 may provide an illumination pattern (e.g., spinning/flashing the light ring) to indicate processing of the spoken instruction/query by the server 206 (block 1110). When the server 206 sends a response, the device 100 can communicate the response to the user while displaying another illumination pattern (e.g., a solid blue light ring) via the indicator lights 106 (block 1112). The device 100 can then listen for any follow up instructions/queries from the user (block 1114). When the device is done communicating with the user (e.g., after a threshold time has passed with no spoken instructions/queries from the user), the device returns to a standby/ inactive state, where the controller 124 turns off the indicator lights 106 or presents a standby/inactive illumination pattern (block 1116).

In addition to indicate device 100 states, the controller 124 can be configured to present illumination patterns via the indicator lights to provide ADAS alerts/warnings (e.g., a forward collision warning as shown in FIG. 12A, a lane departure warning as shown in FIG. 12B, speed limit warnings, traffic warnings, and the like). In embodiments, the controller 124 is configured to present an illumination pattern via the indicator lights 106 to indicate a current bearing, recommended direction along a route to a destination, or a compass (pointing North).

Figure 13:
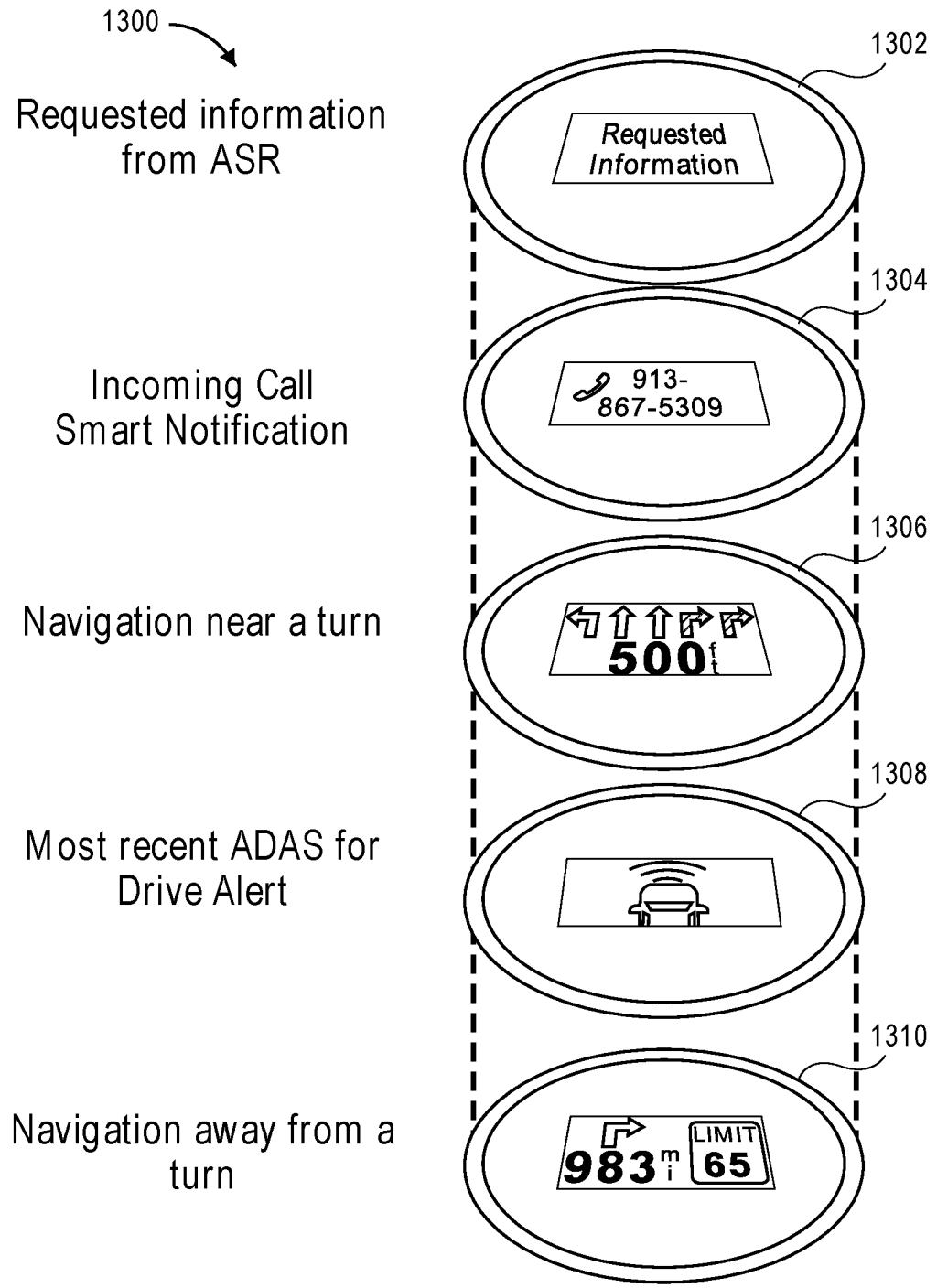
FIG. 13 shows display output/alert priorities for a mobile application interface device, such as the mobile application interface device of FIGS. 1A through 1C, in accordance with an example embodiment of the present disclosure.

The controller 124 is also be configured to provide display outputs (e.g., symbols and/or text) via the display 104 to compliment the audio outputs provided via the speaker 120 and/or audio output interface 144 and/or the illumination patterns presented via the indicator lights 106. For example, the display 104 can be used to provide route guidance information, ADAS alerts, notifications, media information, and so forth. The priority of information presented via the display 104 may be as shown in FIG. 13, for example, the priority chain 1300 can be as follows: (1) ASR responses and/or requested information 1302; (2) smart notifications (e.g., incoming calls, message notifications, etc.) 1304; (3) navigation/guidance data for current or upcoming maneuvers (e.g., navigation near a turn, and so forth) 1306, (4) alerts and warnings (e.g., ADAS or other driver alerts or warnings 1308, (5) navigation/guidance in advance of a maneuver (e.g., information about a turn that is a long distance (e.g., 1 mile or more) from the current position) 1310, with 1 being the highest priority and 5 being the lowest.

FIGS. 14 through 36B show various example processes and use scenarios that illustrate device 100 configurations. Unless otherwise stated, the device can be configured to execute the operational blocks illustrated in FIGS. 14 through 36B in any arbitrary order. Furthermore, operational blocks of different processes can be combined and are provided herein to demonstrate various configurations of the device 100 but are not intended as limitations. Embodiments/implementations described herein can be fully or partially combined to achieve embodiments/implementations other than those that are explicitly provided herein as a single embodiment/implementation and/or illustrated in a single drawing or series of drawings of FIGS. 14 through 30B. The operational blocks can be executed by any combination of hardware, software, or firmware, for example, operations completed by the device 100 actions can be executed at least in part by the controller 124 and in some embodiments, by the mobile device controller 210 and/or a server (e.g., server 206 and/or server 208).

Figure 14:
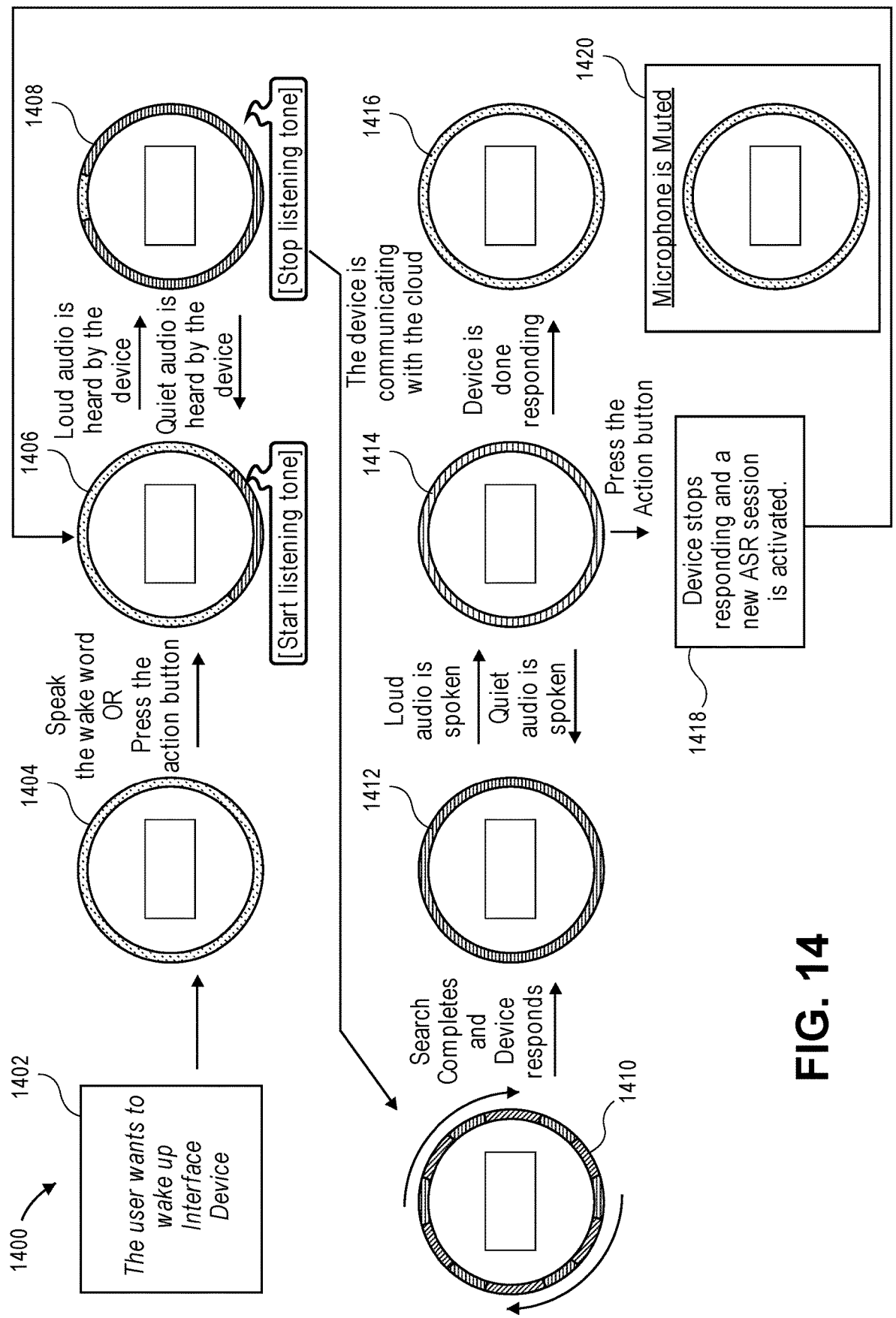
FIG. 14 is a flow diagram showing an example process that employs a mobile application interface device, such as the mobile application interface device of FIGS. 1A through 1C.
Figure 15A:
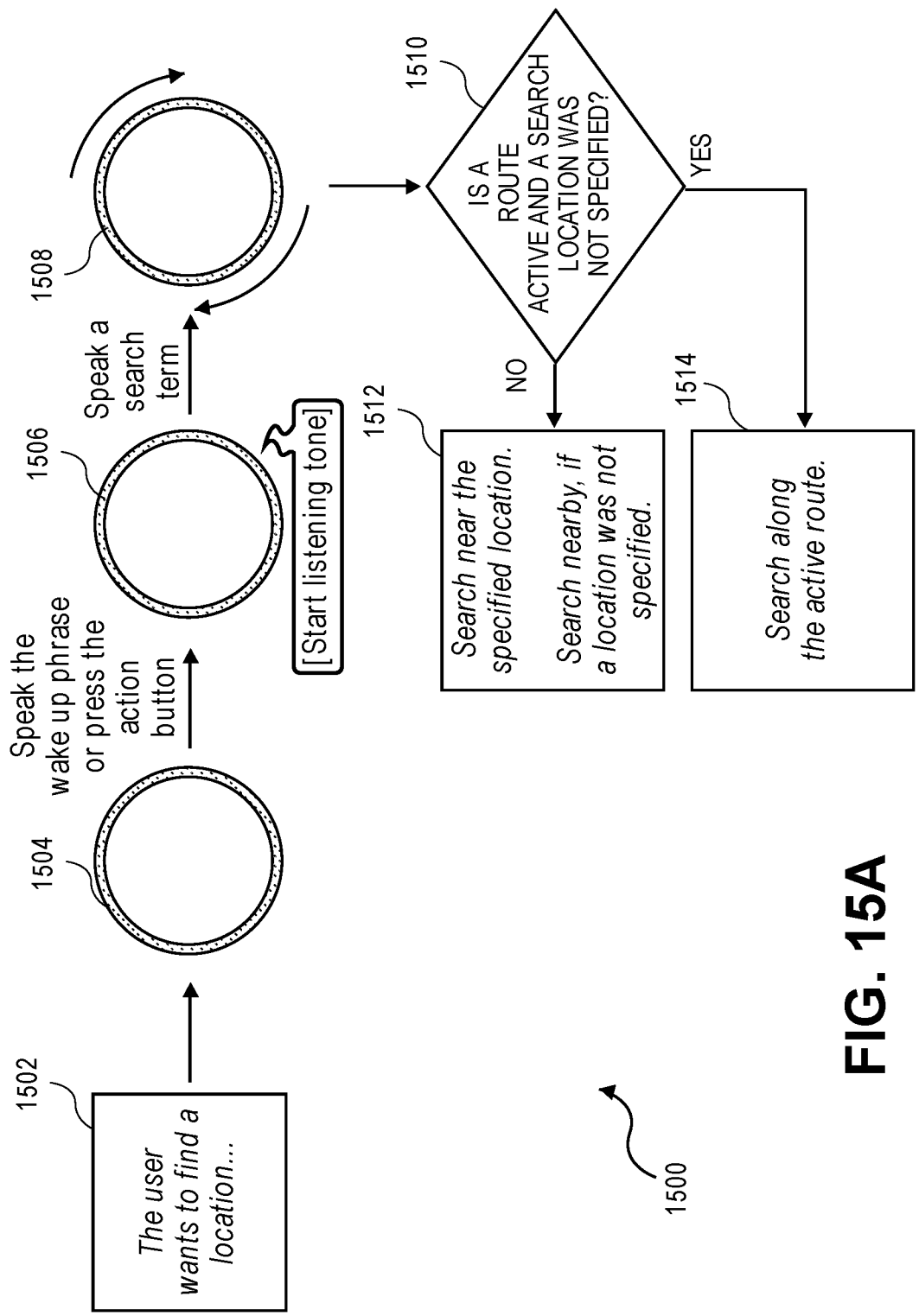
FIG. 15A is a flow diagram showing an example process that employs a mobile application interface device, such as the mobile application interface device of FIGS. 1A through 1C.
Figure 15B:
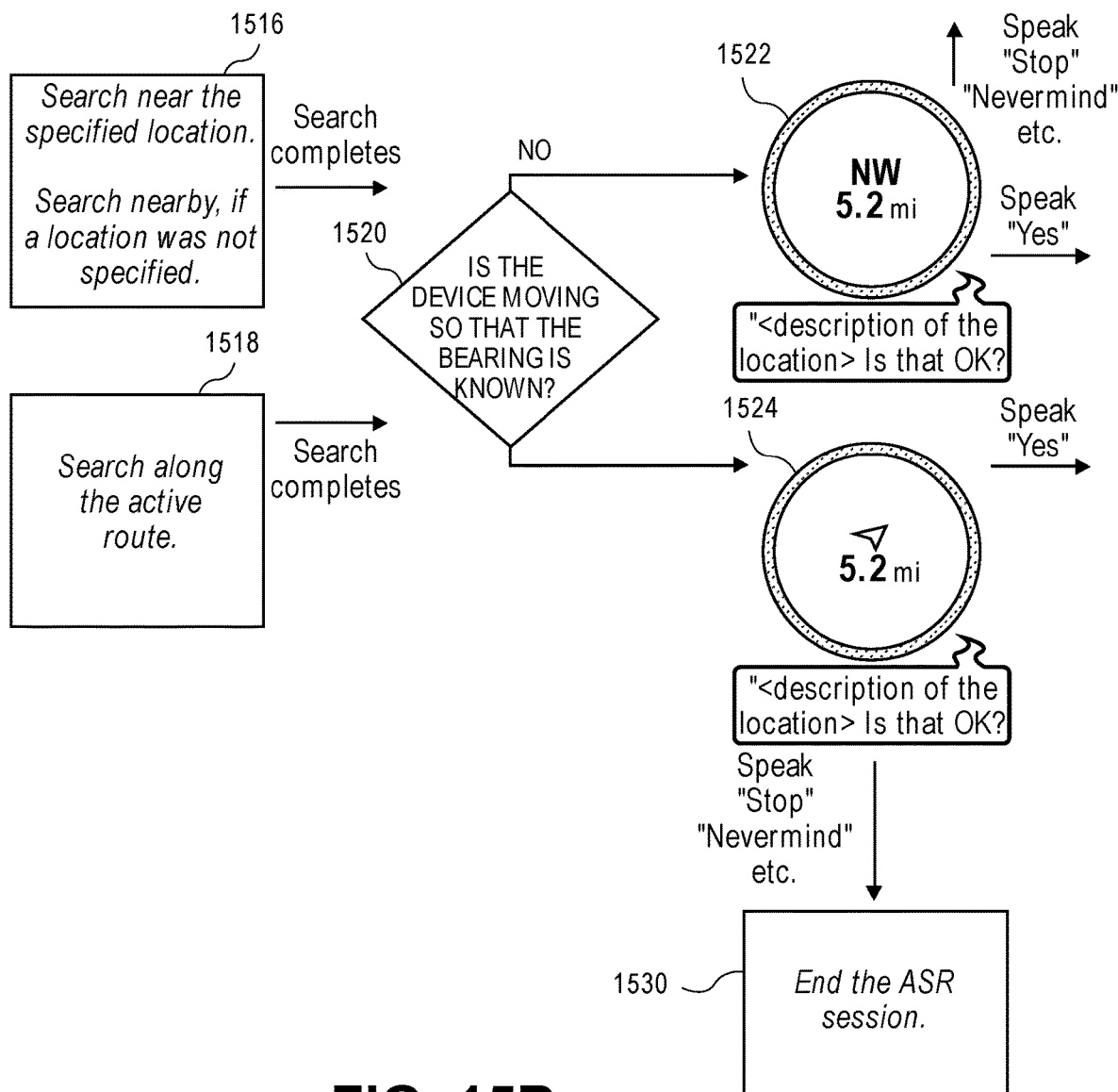
FIG. 15B is a flow diagram showing an example process that employs a mobile application interface device, such as the mobile application interface device of FIGS. 1A through 1C.
Figure 15C:
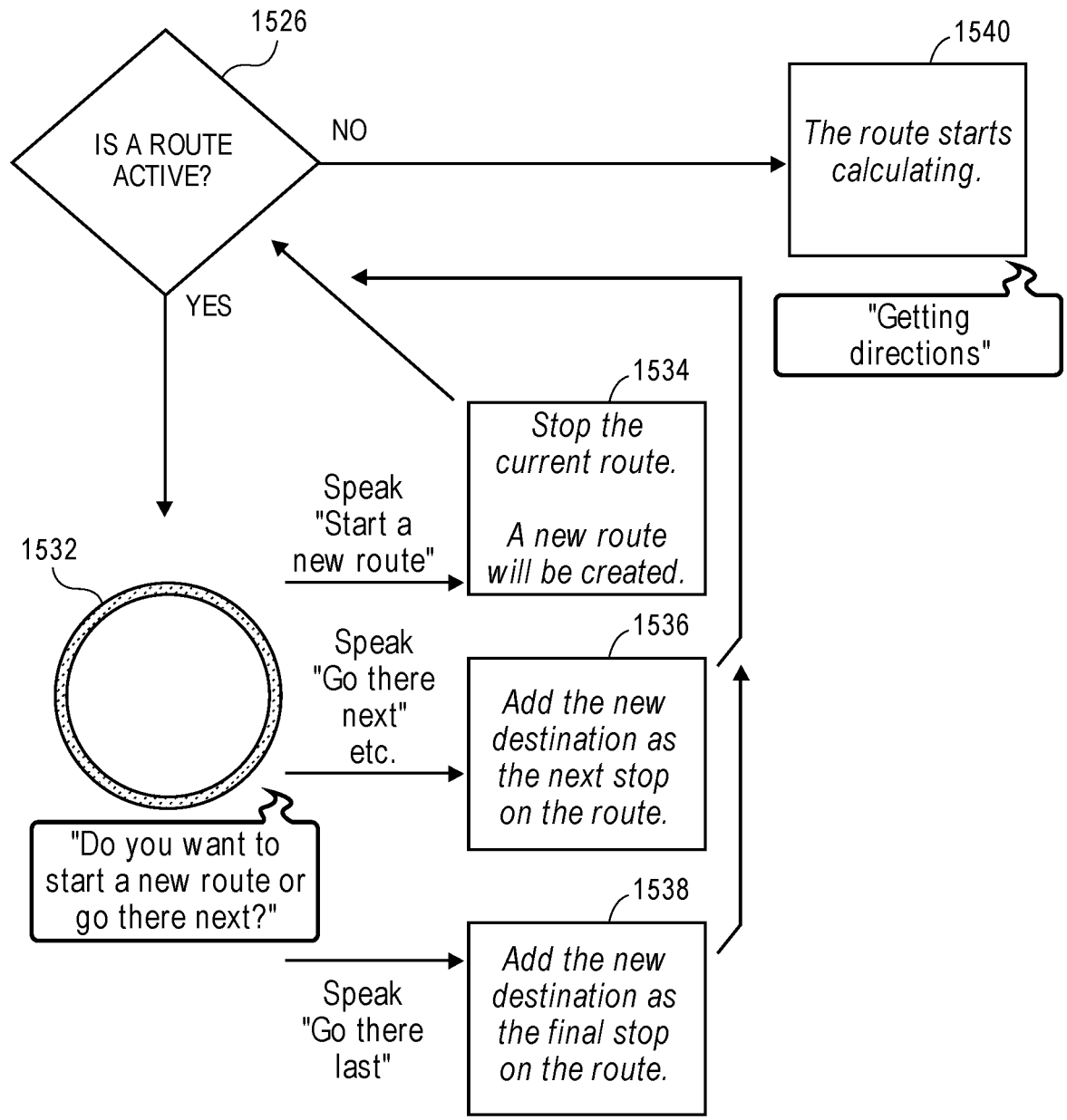
FIG. 15C is a flow diagram showing an example process that employs a mobile application interface device, such as the mobile application interface device of FIGS. 1A through 1C.
Figure 15D:
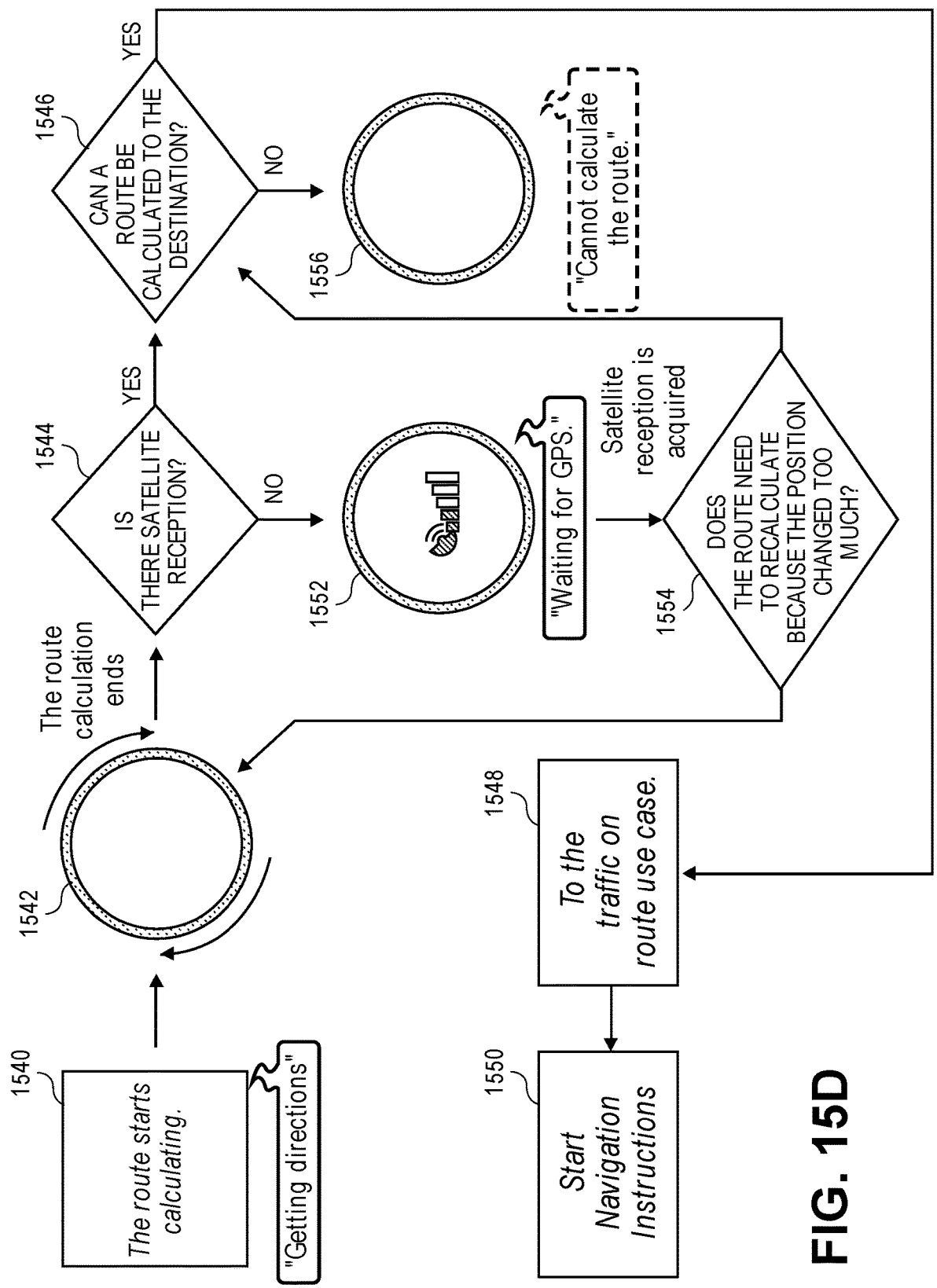
FIG. 15D is a flow diagram showing an example process that employs a mobile application interface device, such as the mobile application interface device of FIGS. 1A through 1C.

FIG. 14 shows an example process 1400 for interacting with the device 100. The device 100 listens for the user to speak a wakeup word or press the action button 108 (block 1402). Until the user does so, the indicator lights 106 may be turned off completely or set to a standby/inactive illumination pattern (block 1404). When the user speaks a wake word (e.g., "Device", "Alexa," "Siri," "Cortana," "Ok Google," or the like) or presses the action button 108, the device can present an illumination pattern to indicate that the device is listening and may also output a listening tone via the speaker 120 (block 1406). If the spoken instruction/query is too quiet, the device 100 can continue to listen (block 1406). If the spoken instruction/query is at least a threshold volume, the device communicates the audio to the voice services server 206 (block 1408). For example, the device 100 can be configured to transmit the spoken instruction/query to the mobile application 218 running on the mobile device 202, where the mobile application 218 causes the mobile device 202 to communicate the spoken instruction/query to the server 206. The device 100 may provide an illumination pattern (e.g., spinning/flashing the light ring) to indicate processing of the spoken instruction/query by the server 206 (block 1410). When the server 206 sends a response, the device 100 can communicate the response to the user while displaying another illumination pattern (e.g., a solid blue light ring) via the indicator lights 106 (block 1412). The device 100 can then listen for any follow up instructions/queries from the user (block 1414). If the user presses the action button or speaks the wakeup word again, the device starts a new ASR session (block 1418) and returns to block 1406 to listen for a new instruction/query from the user. When the device is done communicating with the user (e.g., after a threshold time has passed with no spoken instructions/queries from the user), the device returns to a standby/inactive state, where the controller 124 turns off the indicator lights 106 or presents a standby/inactive illumination pattern (block 1416). The microphone 110 may be muted (e.g., the device 100 ignores all spoken instructions/queries) until the wakeup word is spoken or the action button is pressed again (block 1420).

FIGS. 15A through 15D show an example process 1500 for interacting with the device 100 to search for a destination and/or initiate route guidance. The user may employ the device 100 to find a location (block 1502). The device 100 is plugged in, powered on, and waiting for the user to speak the wakeup phrase or press the action button 108 (block 1504). When the user speaks a wake word (e.g., "Device", "Alexa," "Siri," "Cortana," "Ok Google," or the like) or presses the action button 108, the device can present an illumination pattern to indicate that the device is listening and may also output a listening tone via the speaker 120 (block 1506). The device 100 can receive a spoken instruction or query (e.g., search query) from the user and send the spoken instruction or query to the server 206 for voice service processing (block 1508). The controller 124 or mobile application 218 determines whether route guidance is already active (block 1510). When route guidance is not active, the server 206 can locate results based on the current location (e.g., sorted based on nearness to the current location) of the device 100, or based on a specified search location (e.g., in a particular city, near an intersection, zip code, etc.) (block 1512). When route guidance is active, the server 206 can locate results based on the route being followed by the device 100 (e.g., the server 206 can search for places located along the active route) (block 1514).

When the server 206 completes the search (block 1516/1518), the device 100 may determine whether or not the bearing of the device 100 is known (e.g., based on the movement of the device 100) (block 1520). If the bearing is not known, the device 100 can provide a description of the location via an audio and/or display output and can also provide the direction to reach the location (block 1522). If the bearing is known, the device 100 can provide a description of the location via an audio and/or display output and can also provide the direction to reach the location relative to the current direction of travel (e.g., by displaying an arrow or illumination pattern that points towards the location relative to the bearing of the device 100) (block 1524). If the user provides a voice input to stop or discontinue the search, the device 100 can end the ASR session and resume operation (e.g., by returning to a standby/inactive state or resuming active route guidance) (block 1530). If the user provides a voice input that accepts the suggested location and/or instructs the device 100 to navigate to the location, the device 100 may determine if route guidance is already active (block 1526). If route guidance is not already active, the device 100 may send navigation command data (e.g., data received from server 206 based on the user's voice inputs) to server 208 for navigation service processing and can receive navigation data (e.g., route guidance information) from server 208 in response (block 1540). If route guidance is already active, the device 100 may ask the user whether to start a new route or add the search location to the current route (block 1532). The user may instruct the device 100 to start a new route, where the device 100 then stops the current route and starts a new route based on the search location (block 1534). The user may instruct the device 100 to navigation to the search location next, where the device 100 then adds the search location as the next stop and updates the current route accordingly (block 1536). The user may instruct the device 100 to navigation to the search location last, where the device 100 then adds the search location as the last stop and updates the current route accordingly (block 1538). After receiving user instructions and updating the current route or starting a new route, the device 100 may send navigation command data (e.g., data received from server 206 based on the user's voice inputs) to server 208 for navigation service processing and can receive navigation data (e.g., route guidance information) from server 208 in response (block 1540).

The device 100 may provide an audio and/or display output to let the user know that the device 100 is getting directions from the server 208 (block 1540), and in some implementations, the device 100 provides an illumination pattern (e.g., spinning blue ring) via the indicator lights 106 while the route calculation is in progress (block 1542). The device 100 may assess whether or not there is satellite reception (e.g., GPS reception) (block 1544). If there is no reception, the device 100 may notify the user that it is waiting for improved reception before route guidance can begin (block 1552). In some instance, the device 100 position may change (e.g., because the user continues driving) while the device 100 is waiting for reception. The device 100 may need to recalculate the route if the position changes too much (block 1554). When the device 100 has sufficient satellite reception, the device 100 determines whether or not the route can be calculated to the destination based on the navigation data (e.g., route guidance instructions) received from the server 208 (block 1546). If there is an error (e.g., if the device 100 cannot calculate the route), the device 100 may be configured to provide a display and/or audio output notifying the user that the route cannot be calculated (block 1556). When the route is calculated, the device 100 is configured to start navigation instructions (block 1550). The device 100 can also provide traffic updates and/or ADAS alerts in addition to providing the navigation instructions to the user (block 1548).

Figure 16A:
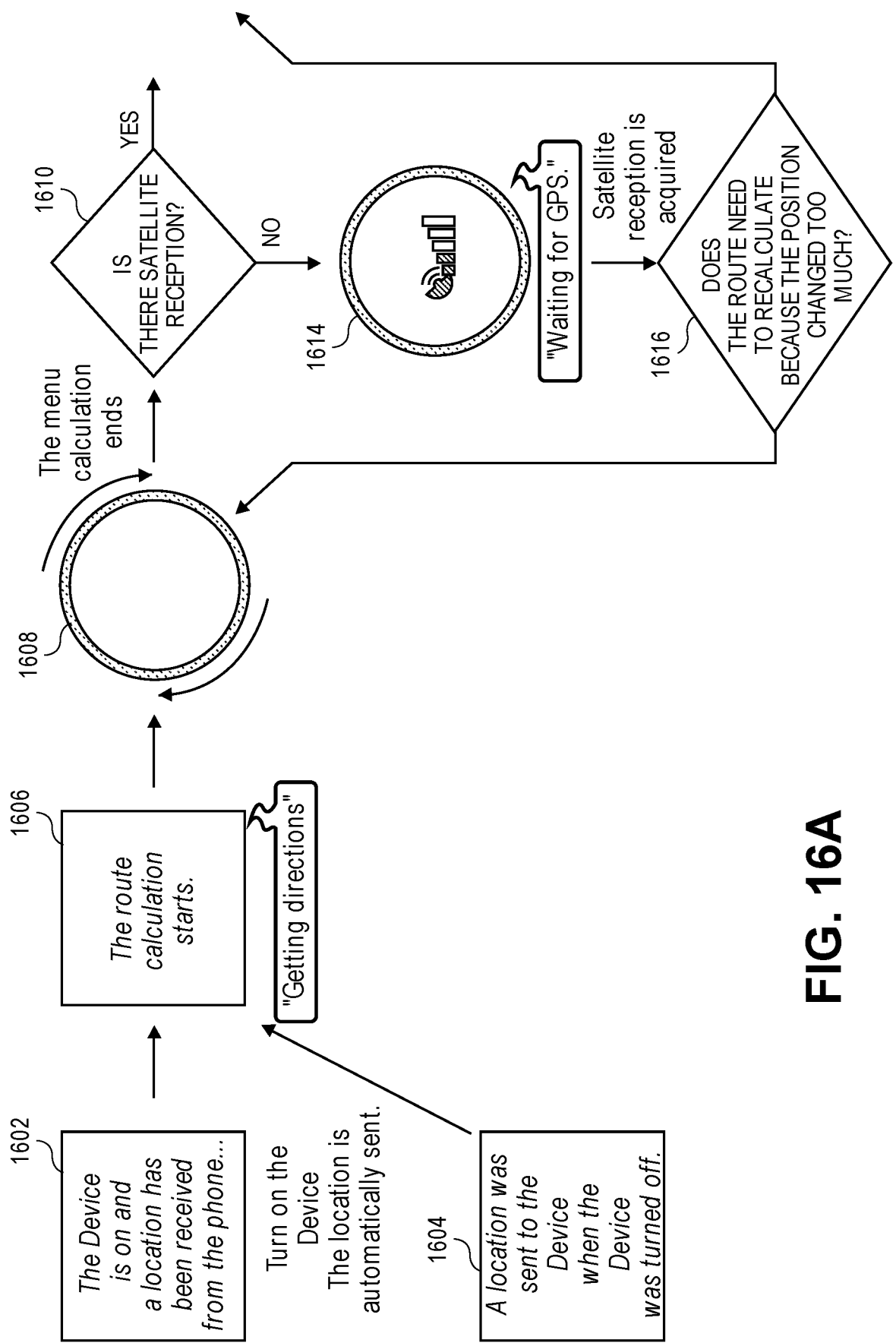
FIG. 16A is a flow diagram showing an example process that employs a mobile application interface device, such as the mobile application interface device of FIGS. 1A through 1C.
Figure 16B:
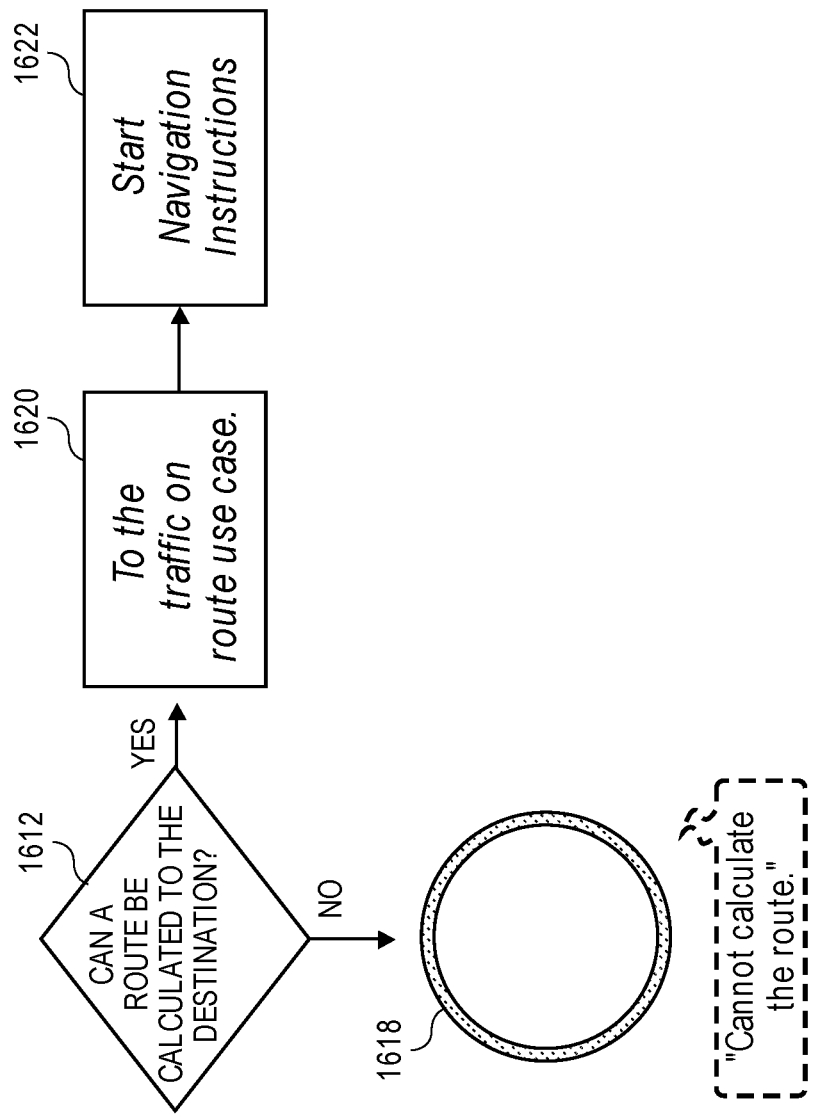
FIG. 16B is a flow diagram showing an example process that employs a mobile application interface device, such as the mobile application interface device of FIGS. 1A through 1C.

FIGS. 16A and 16B show an example process 1600 for interacting with the device 100 to search for a destination and/or initiate route guidance via the mobile device 202 (e.g., via mobile application 218). The can send a location (e.g., manually entered destination or search location) from the mobile device 202 (e.g., via mobile application 218 and/or another linked mobile application) to the device 100 while the device is on (block 1602) or while the device 100 is off for transfer to the device 1604 when the device 100 is turned on and connected to the mobile device 202 (block 1604). The device 100 may provide an audio and/or display output to let the user know that the device 100 is getting directions from the server 208 (block 1606), and in some implementations, the device 100 provides an illumination pattern (e.g., spinning blue ring) via the indicator lights 106 while the route calculation is in progress (block 1608). The device 100 may assess whether or not there is satellite reception (e.g., GPS reception) (block 1610). If there is no reception, the device 100 may notify the user that it is waiting for improved reception before route guidance can begin (block 1614). In some instance, the device 100 position may change (e.g., because the user continues driving) while the device 100 is waiting for reception. The device 100 may need to recalculate the route if the position changes too much (block 1616). When the device 100 has sufficient satellite reception, the device 100 determines whether or not the route can be calculated to the destination based on the navigation data (e.g., route guidance instructions) received from the server 208 (block 1612). If there is an error (e.g., if the device 100 cannot calculate the route), the device 100 may be configured to provide a display and/or audio output notifying the user that the route cannot be calculated (block 1618). When the route is calculated, the device 100 is configured to start navigation instructions (block 1622). The device 100 can also provide traffic updates and/or ADAS alerts in addition to providing the navigation instructions to the user (block 1620).

FIGS. 17A and 17B show an example of voice inputs that can be handled by server 206 for location searching. For example, the user can request that the voice service (e.g., service 206) ask the navigation service (e.g., server 208) to find an address, POI, name of a place, etc. In an example shown in FIG. 17A, the user asks the device 100 to find a coffee shop. The device 100 can transmit the spoken instruction/query received from the user to server 206 for voice service processing, and server 206 can communicate with server 208 for navigation/mapping service processing to locate nearby coffee shops by communicating navigation command data (e.g., instructions based on ASR processing of the user's voice input) directly or indirectly (e.g., by sending the navigation command data back through the mobile application 218 to server 208). The device 100 can then provide search results one at a time for the user via audio and/or display outputs and can listen for user responses (e.g., accepting or rejection the search results, asking for alternatives, etc.). As shown in FIG. 17B, the device 100 can handle more specific requests. For example, the user can ask the device to locate a POI in a city or near a location/landmark. For instance, in the example shown in FIG. 17B, the user asks the device 100 to find a coffee shop near a particular city. FIGS. 17A and 17B are provided to illustrate examples of the user-device interaction. In implementations, the device 100 can accept additional/alternative voice inputs from the user. For example, the user can search for locations by name, address, city, state, neighborhood, landmark, distance, category, and so forth. The device 100 acts as a gateway between the user and servers 206 and 208 for ASR services and navigation/mapping services.

Figure 18A:
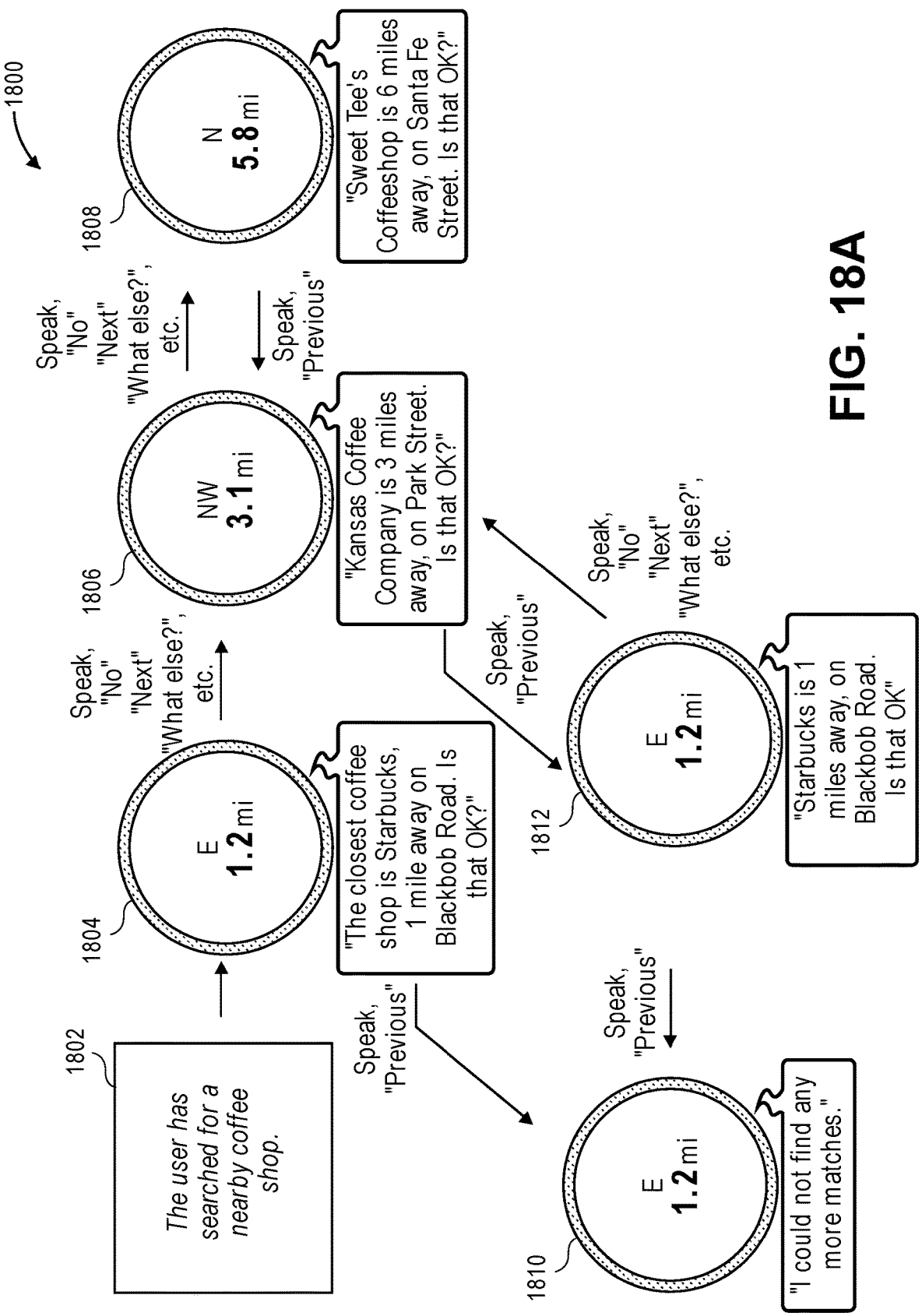
FIG. 18A is a flow diagram showing an example process that employs a mobile application interface device, such as the mobile application interface device of FIGS. 1A through 1C.
Figure 18B:
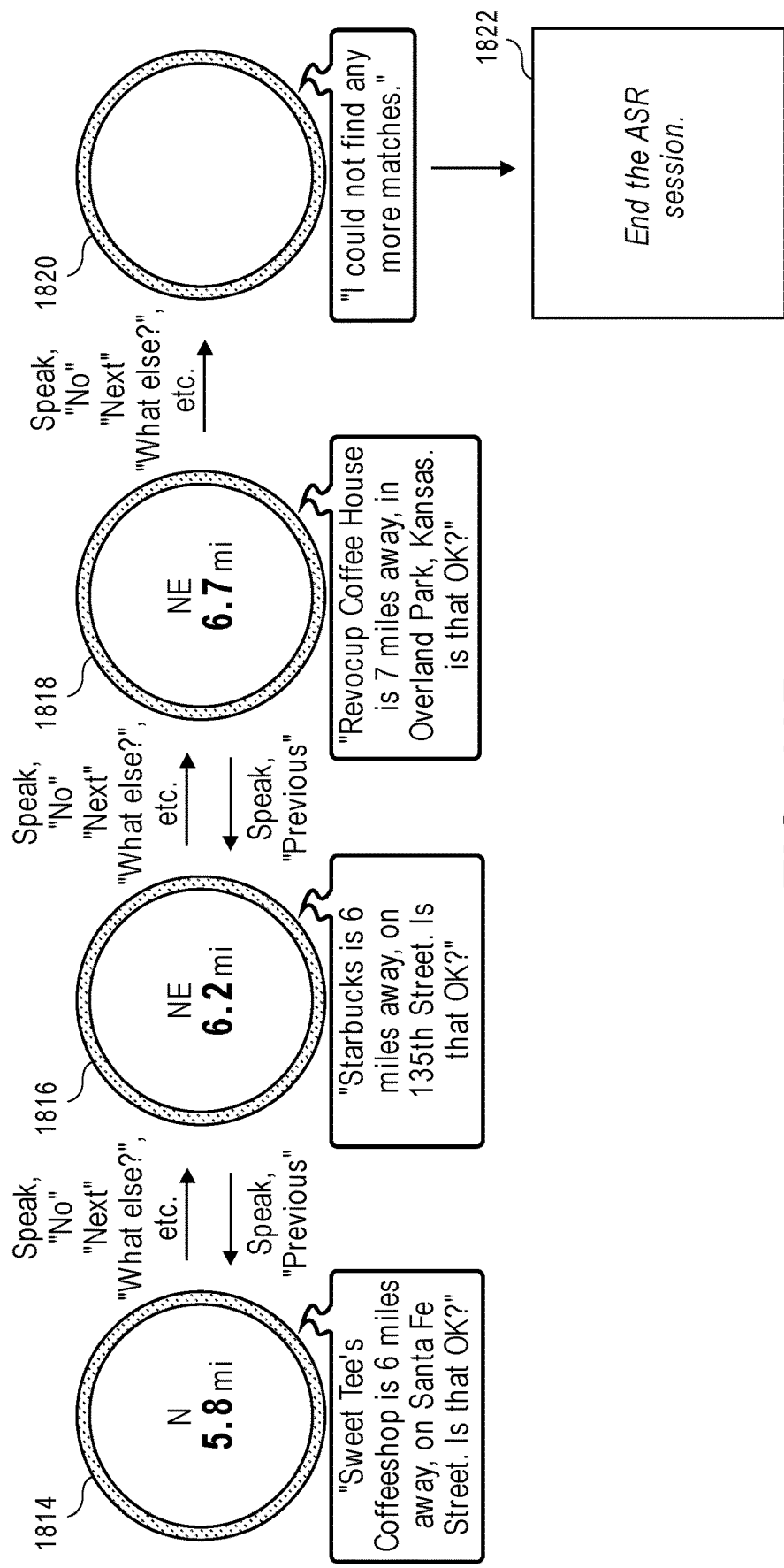
FIG. 18B is a flow diagram showing an example process that employs a mobile application interface device, such as the mobile application interface device of FIGS. 1A through 1C.

FIGS. 18A and 18B show an example process 1800 for interacting with the device 100 to search for a location and navigate through a plurality of search results. After the wakeup word is spoken or the action button is pressed, the device 100 can listen for a spoken instruction or query from the user (block 1802). For example, the user can ask the device 100 to search for a nearby coffee shop. The device 100 can then send the spoken instruction or query to server 206 for voice processing, and in some implementations, server 206 is configured to return results and/or communicate with a navigation/mapping server 208 to complete the search. The device 100 may be configured to send its current location to server 206 and/or server 208 so that the search results are at least partially based on the current location of the device 100 (e.g., the server 206/208 returns search results for coffee shops based on nearness to the device 100 location). The device 100 may output results one by one, or several at a time (block 1804). The device 100 can be configured to move to the next result if the user rejects the search result presented by the device 100 as an audio and/or display output (block 1806). The device 100 can continue to present results each time the user rejects a result or asks for more results (blocks 1808, 1814, 1816, and 1818). The device 100 may provide an audio and/or display output notifying the user that there are no more results after the device 100 has provided all of the results received from the server 206 and/or after presenting more than a threshold number of results (e.g., after presenting twenty (20) results) (block 1820). The device 100 can then end the ASR session (block 1822). If the user wants to hear or view previously presented results, the device 100 can present the results again when the user asks the device 100 to produce a previous result. The user may be able to cycle through the results by saying "next" and "previous." For example, after presenting results at block 1806, the user may view a previously presented result by requesting the previous result from the device 100 (block 1812). If the user says previous too many times, the device 100 may be configured to provide an audio and/or display output notifying the user that there are no more previously presented results (block 1810).

Figure 19:
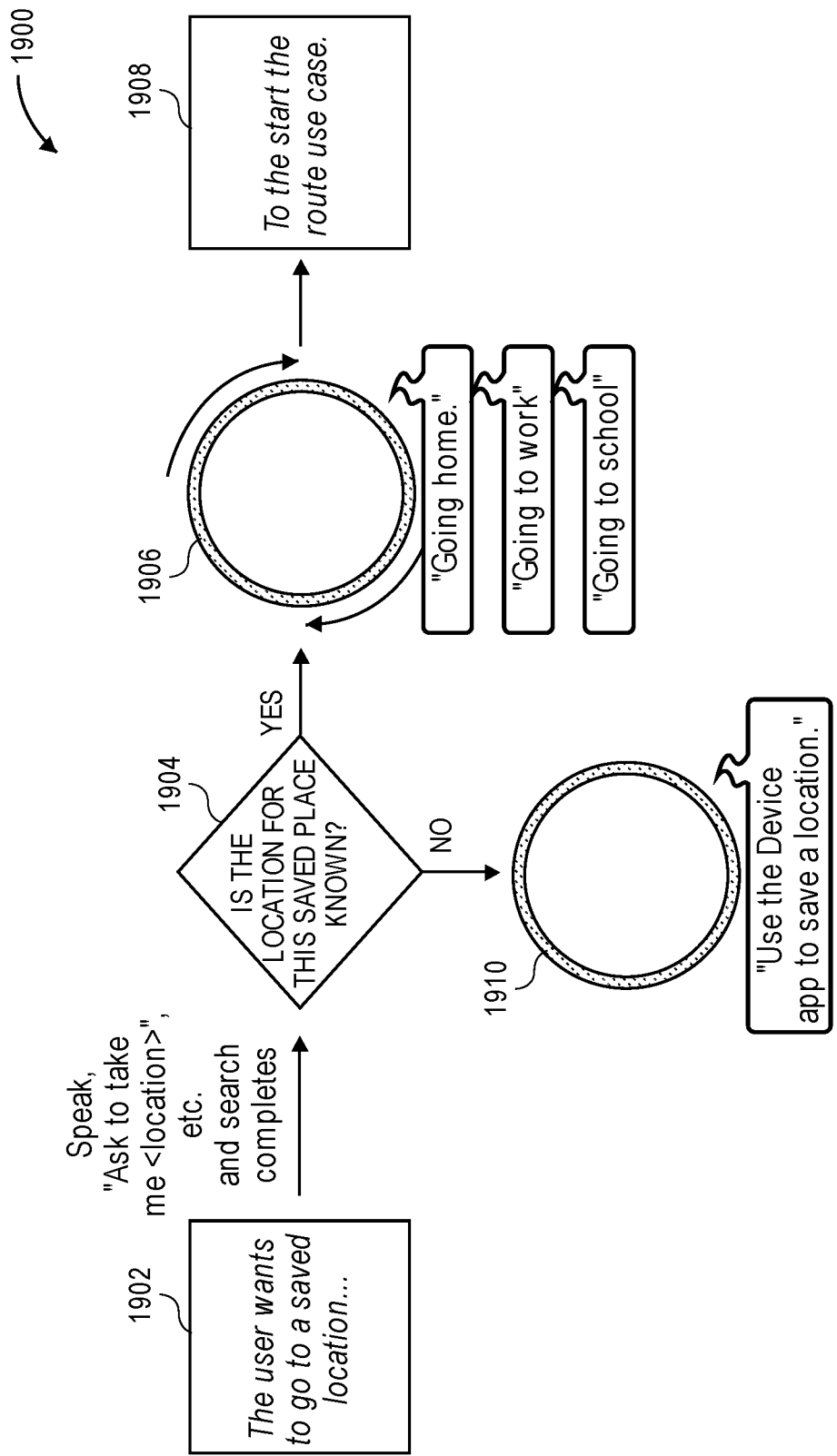
FIG. 19 is a flow diagram showing an example process that employs a mobile application interface device, such as the mobile application interface device of FIGS. 1A through 1C.

FIG. 19 shows an example process 1900 for interacting with the device 100 to search for a previously saved location. After the wakeup word is spoken or the action button is pressed, the device 100 can listen for a spoken instruction or query from the user (block 1902). For example, the user can ask the device 100 to navigate to "home." The device 100 may check with the mobile application 218, server 206, and/or server 208 to determine if the location has been previously saved (block 1904). For example, the user may have previously saved a home address via the device 100 and/or mobile application 218. If the location has not been saved, the user can optionally use the mobile application 218 to save the location (block 1910). Examples of locations that can be saved include, but are not limited to, the user's "home," "work," "school," addresses of contacts, favorites, and so forth. If the location requested by the user corresponds to a previously saved location, the device 100 may provide an audio and/or display output to notify the user that the device 100 will begin route guidance to the requested location (block 1906). The device 100 can then begin route guidance (block 1908).

Figure 20B:
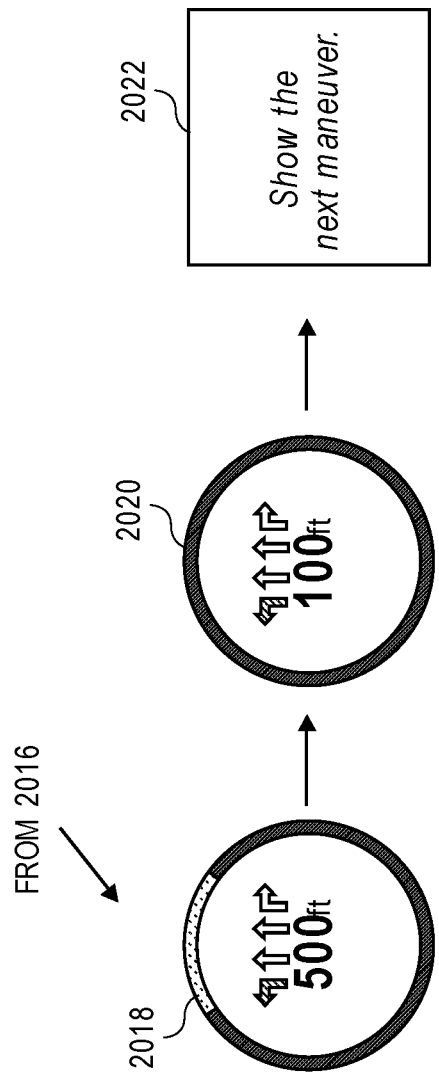
FIG. 20B is a flow diagram showing an example process that employs a mobile application interface device, such as the mobile application interface device of FIGS. 1A through 1C.

FIGS. 20A and 20B show an example process 2000 for presenting route guidance information via the device 100 (e.g., via the display 104, speaker 120/audio output interface 144, and/or indicator lights 106). Route guidance on the device 100 can be active (block 2002). The device 100 may present symbolic and/or text outputs (e.g., a maneuver icon and distance to the maneuver (e.g., a turn)) via the display 104 (block 2004). The device 100 can also provide one or more audio outputs to notify the driver of the upcoming maneuver (block 2006). In some implementations, the device 100 provides an audio output (e.g., pre-turn preparation output) when it first displays the upcoming maneuver to the user and again when the user is less than a threshold distance from the maneuver (block 2008). If the distance to the maneuver is short, the device 100 may skip the pre-turn preparation audio output. The device 100 may present a dynamic illumination pattern via the indicator lights 106 (e.g., gradually filling in portions of the light ring) when the user is within the threshold distance from the maneuver (block 2010). For example, the device 100 can begin to illuminate a bottom portion of the light ring defined by indicator lights 106 when the user is within the threshold distance from the maneuver (block 2012). The device 100 may also provide an audio output letting the user know the distance from the maneuver. The device 100 can continue to fill in portions of the light ring as the user nears the maneuver (block 2014), and can provide additional audio outputs when the user is within viewing range (e.g., less than X feet) from the maneuver (block 2016). The device 100 may continue to fill in the light ring until it is completely filled in (e.g., when the user reaches the maneuver) (blocks 2018 and 2020). The device 100 may then proceed to present a display, audio, and/or illumination pattern output for the next maneuver (block 2022).

Figure 21A:
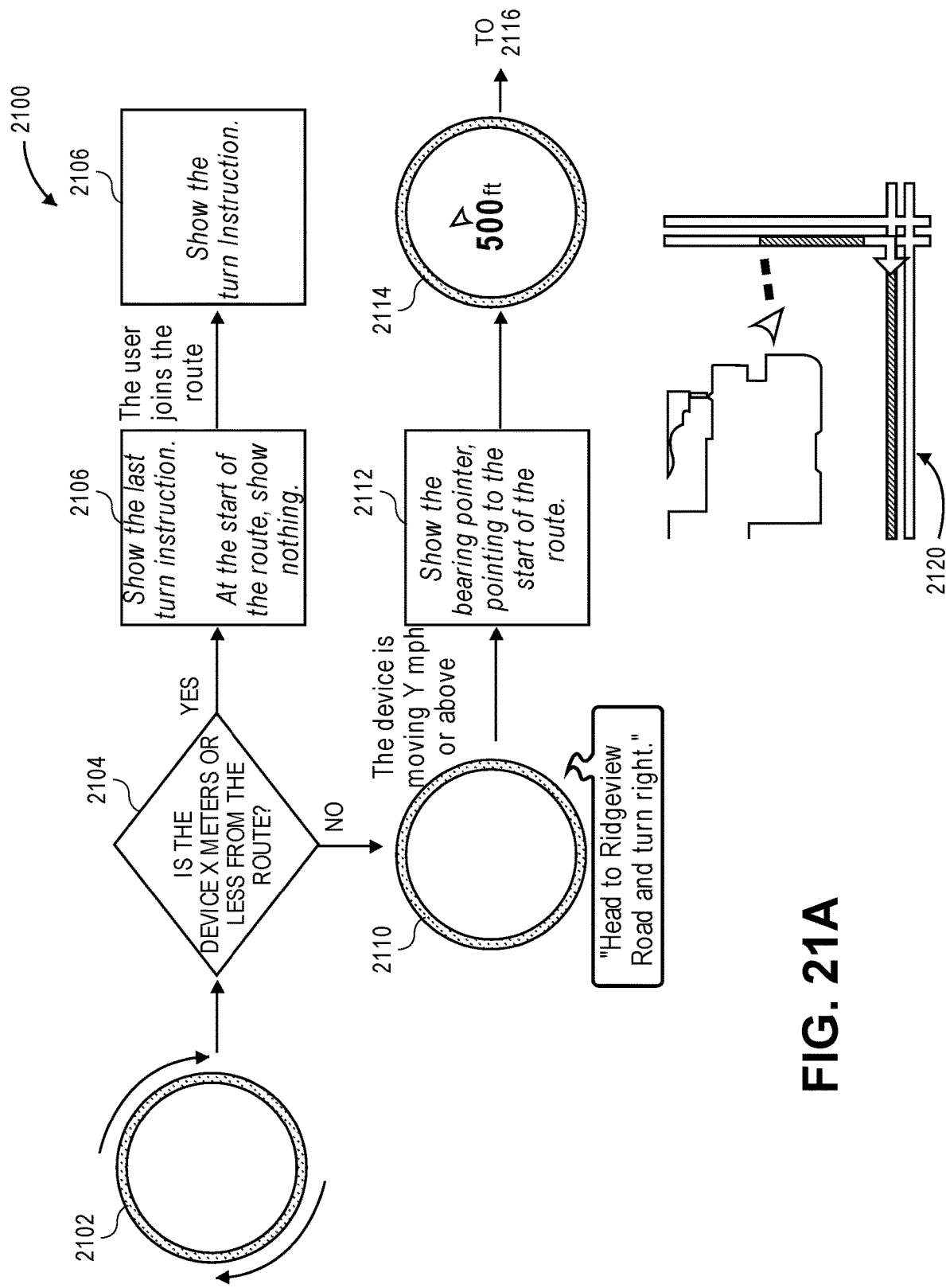
FIG. 21A is a flow diagram showing an example process that employs a mobile application interface device, such as the mobile application interface device of FIGS. 1A through 1C.

FIGS. 21A and 21B show an example process 2100 for presenting route guidance information via the device 100 (e.g., via the display 104, speaker 120/audio output interface 144, and/or indicator lights 106) when the device 100 is off-route (e.g., in a parking lot, off-road location, or at an unmarked/unmapped position). The device 100 can calculate and/or receive navigation data/instructions (e.g., from server 208) for route guidance (block 2102). The device 100 may determine if the device 100 is less than a predefined maximum distance (e.g., less than X meters) from the route (block 2104). If the device 100 is less than the predefined maximum distance from the route, the device 100 can begin/continue route navigation (block 2106). The device 100 can display additional maneuvers (e.g., next turn, etc.) when the device 100 begins to travel along the route (block 2106). If the device 100 is more than the predefined maximum distance from the route, the device 100 can navigate the user to the route. For example, the device 100 can provide an audio and/or display output to navigate the user to the route (block 2110). The device 100 may provide a bearing pointer via the display 104 to assist the user (block 2112). For example, the device 100 can provide an arrow pointing towards the route and may also display the distance to the route (block 2114). Map view 2120 shows an example of the device 100 location relative to the route. If the user drives to a new position that is farther from the route starting point indicated by the device 100 (e.g., as shown in map view 2122), the device 100 may provide a bearing pointer via the display 104 to navigate the user to a different (closer) starting point along the route based on the new position of the device 100 (block 2116). For example, the device 100 can provide an arrow pointing towards the new starting point along the route and may also display the distance to the new starting point (block 2118).

Figure 22:
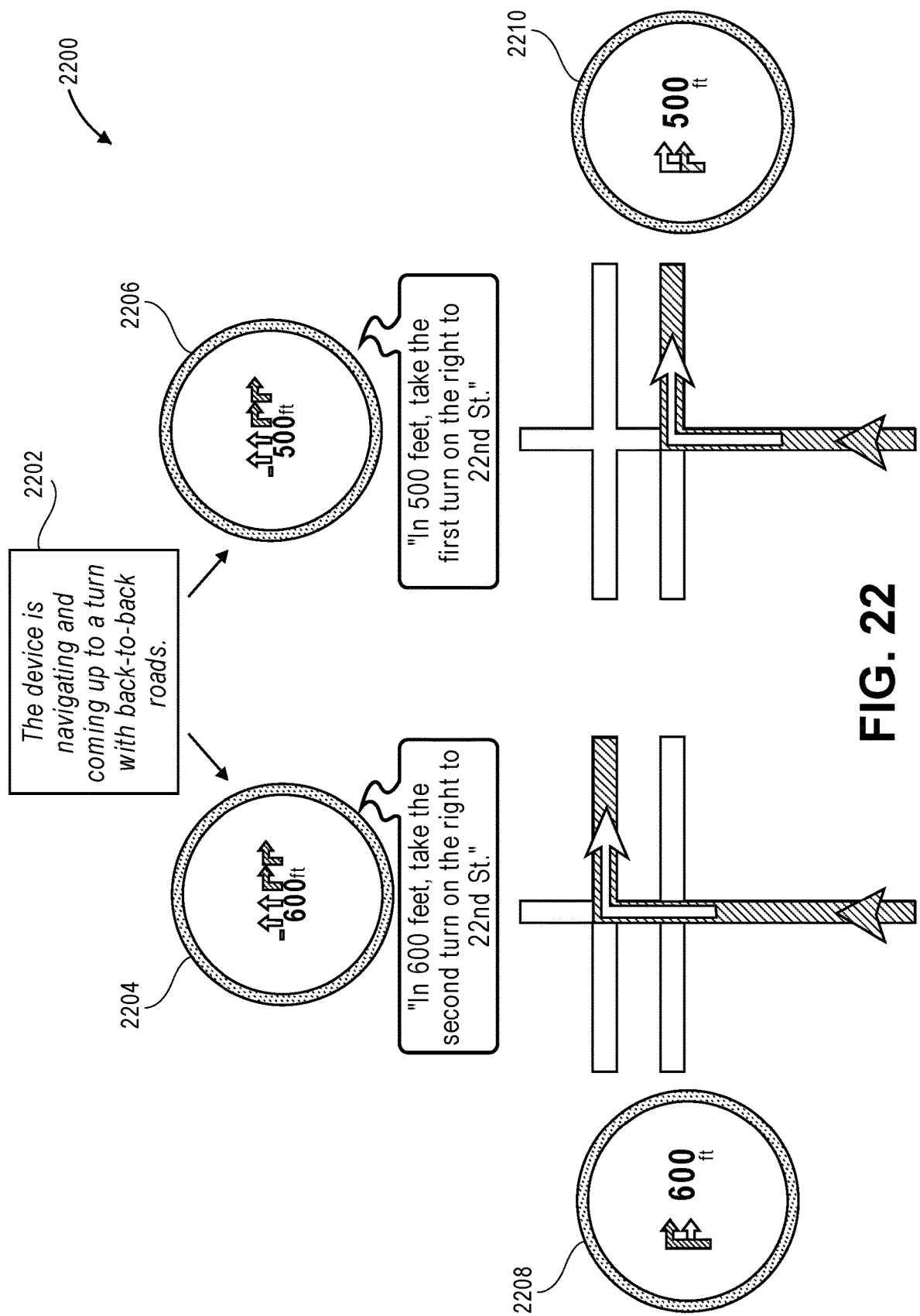
FIG. 22 is a flow diagram showing an example process that employs a mobile application interface device, such as the mobile application interface device of FIGS. 1A through 1C.

FIG. 22 shows an example process 2200 for presenting route guidance information via the device 100 when the device 100 is in an environment with clustered (e.g., back-to-back) turns, for example, in densely-populated cities (having many roads in a geographic area). The user may employ the device 100 for route guidance in situations where an upcoming turn requires the user to turn on to one of many back-to-back roads (block 2202). The device 100 can provide an audio and/or display output to guide the user to turn onto the correct road with detailed instructions. For example, the device 100 can provide an audio output to notify the user of the correct turn (e.g., block 2204—"the second turn on the right" or block 2206—"the first turn on the right"). As the user nears the turn, the device 100 can also provide a display output that provides a detailed and/or zoomed in view of which turn the user should be making For example, the device 100 can provided a highlighted view of the second turn on the right (block 2208) or a highlighted view of the first turn on the right (block 2210). Additionally, the device 100 may be configured to present a dynamic illumination pattern via the indicator lights 106 (e.g., by filling in the ring with light or a particular color) to indicate proximity of the vehicle to the turn. This can help ensure that the user does not make a turn too early or too late (e.g., onto a wrong street).

Figure 23:
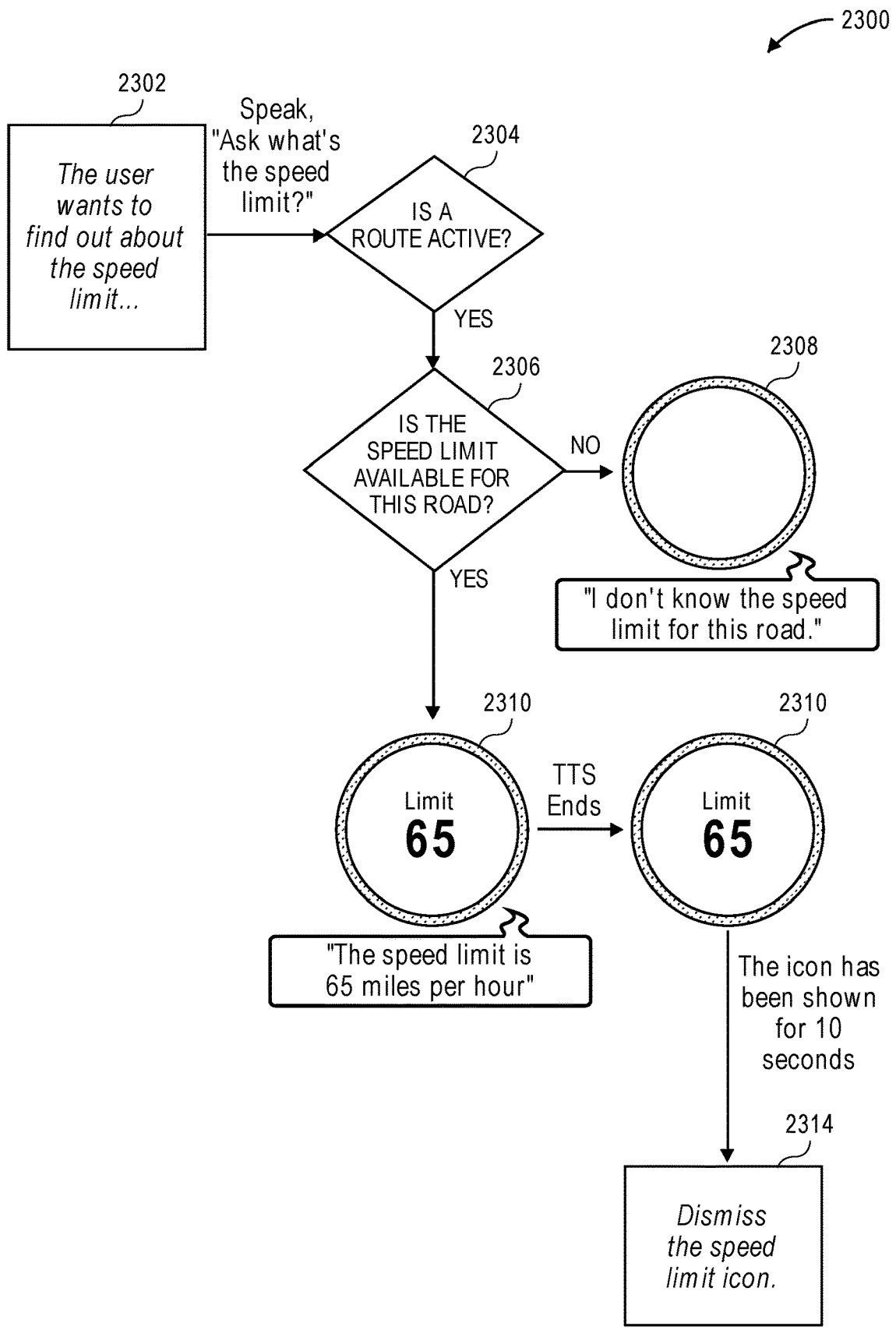
FIG. 23 is a flow diagram showing an example process that employs a mobile application interface device, such as the mobile application interface device of FIGS. 1A through 1C.

The user can query the device 100 for information regarding the current route and/or location of the device 100. For example, FIG. 23 shows an example process 2300 for interacting with the device 100 to inquire about the speed limit at a current location along a route. After the wakeup word is spoken or the action button is pressed, the device 100 can listen for a spoken instruction or query from the user regarding the speed limit at the current position of the device 100 (block 1802). The controller 124 or mobile application 218 may first determine whether a route is active (e.g., is the device 100 moving?) (block 2304). If the device 100 is on an active route, the controller 124 or mobile application 218 may query server 208 for the speed limit at the current position of the device 100 (block 2306). If the server 208 is unable to return a response or indicates that the speed limit at the current position is not known, the device 100 can provide an audio and/or display output to inform the user that the speed limit at the current position of the device 100 cannot be determined (block 2308). If the server 208 responds to the device 100 with a speed limit, the device 100 can be configured to provide an audio and/or display output to inform the user of the speed limit at the current position of the device 100 (block 2310). The device 100 may display the speed limit for a period of time (e.g., X seconds) (block 2310) and can return to its previous display or turn off the display after the period of time has passed (block 2314).

Figure 24:
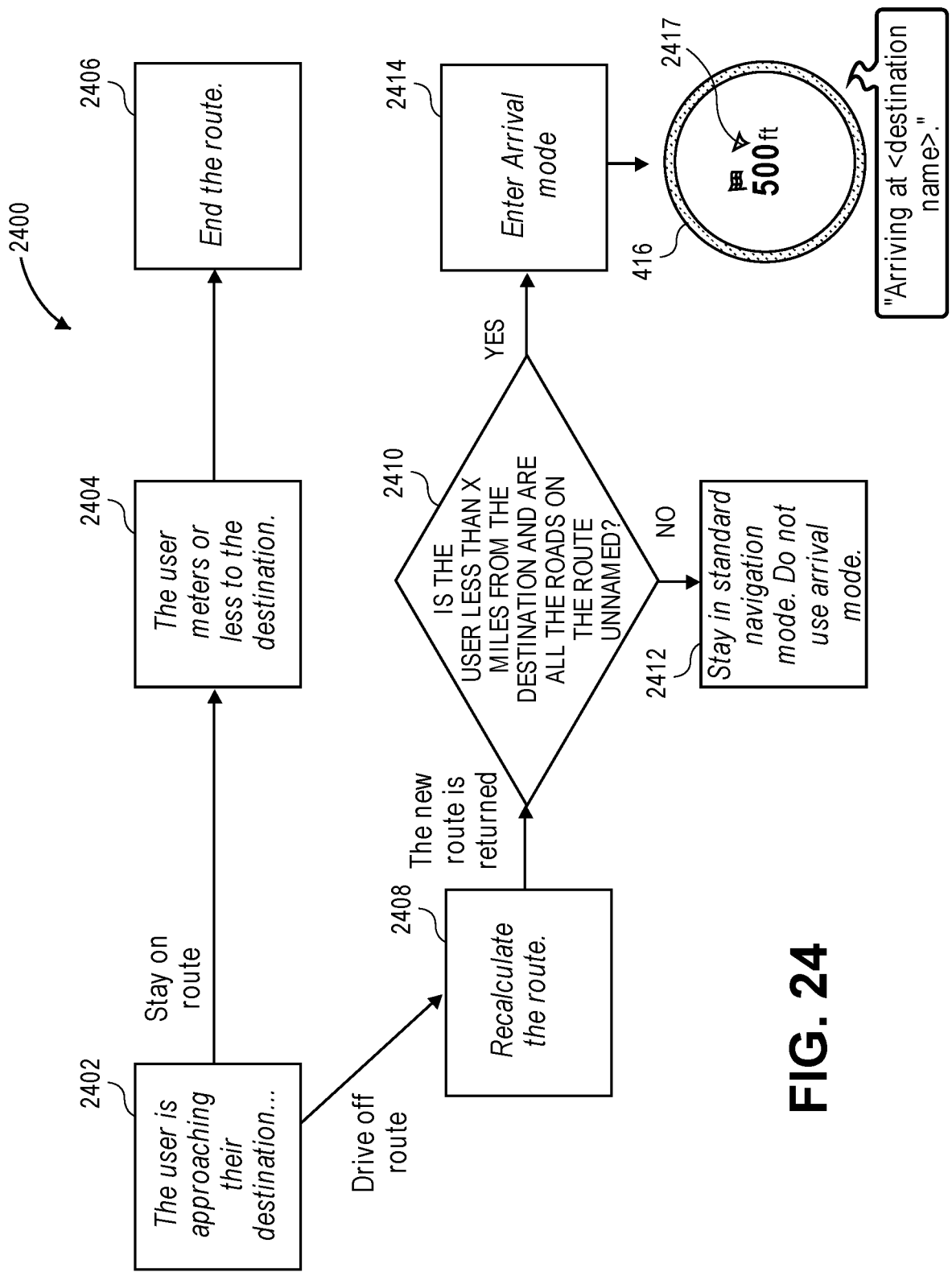
FIG. 24 is a flow diagram showing an example process that employs a mobile application interface device, such as the mobile application interface device of FIGS. 1A through 1C.

FIG. 24 shows an example process 2400 for presenting route guidance information via the device 100 (e.g., via the display 104, speaker 120/audio output interface 144, and/or indicator lights 106) when the device 100 is off-route (e.g., in a parking lot, off-road location, or at an unmarked/unmapped position) and close to (e.g., less than X miles from) a destination. The device 100 may present active route guidance as the user approaches the destination (block 2402). The device 100 may provide an audio and/or display output to inform the user of a detailed position of the destination (e.g., "destination is up ahead on the right"). As the user approaches the destination, the controller 124 or mobile application 218 can track the user's distance from the destination to determine when the user is within threshold proximity to the destination (e.g., less than M meters from the destination) (block 2404). The controller 124 or mobile application 218 may then determine that the user has effectively arrived at the destination and can end route guidance (block 2406). If the user drives off the route while approaching the destination, the controller 124 or mobile application 218 may recalculate the route (block 2408). After recalculating the route, the controller 124 or mobile application 218 may determine whether the user is close to (e.g., less than X miles from) the destination and whether the user is at a marked/unmarked location (e.g., whether or not the user is on an identifiable street or an unnamed location, such as a parking lot, off-road location, etc.) (block 2410). If the user is at a marked location (e.g., identifiable street) and/or more than the threshold distance from the destination, the device 100 can continue route guidance (block 2412). In some implementations, the device 100 can provide the user with an audio and/or display output that helps guide the user to the route (e.g., as described with reference to FIGS. 21A and 21B). If the user is at an unmarked location, the controller 124 or mobile application 218 can initiate an arrival mode 2414. In arrival mode, the device 100 may display a distance to the destination and/or an arrow 2417 that points the user to the destination (block 2416). The device 100 may also provide an audio output and/or present an illumination pattern via the indicator lights 106 that acts as a bearing pointer (e.g., instead of or in addition to the arrow 2417) to help point the user to the destination.

FIG. 25A shows another example process 2500 for presenting route guidance information via the device 100 (e.g., via the display 104, speaker 120/audio output interface 144, and/or indicator lights 106) when the device 100 is approaching a destination. The device 100 may present active route guidance as the user approaches the destination, where the final navigation instruction causes the device 100 to go off-route (e.g., into a parking lot) and enter arrival mode (block 2502). For example, device 100 may provide an audio and/or display output to inform the user of the maneuver that causes the device 100 to go off-route (block 2504). After following the maneuver, the controller 124 or mobile application 218 may detect that it the current position of the device is at an unmarked location (e.g., a parking lot) and that the device 100 is near (e.g., less than X meters from) the destination, and the controller 124 or mobile application 218 can then initiate arrival mode (block 2506). In arrival mode, the device 100 may display a distance to the destination and/or an arrow 2505 that points the user to the destination (block 2508). The device 100 may also provide an audio output and/or present an illumination pattern via the indicator lights 106 that acts as a bearing pointer (e.g., instead of or in addition to the arrow 2505) to help point the user to the destination. For example, FIGS. 25B and 25C show map views of the vehicle location 2510 prior to the maneuver (at block 2504) and after the maneuver (at blocks 2506 and 2508) when the device 100 is in arrival mode.

Figure 26A:
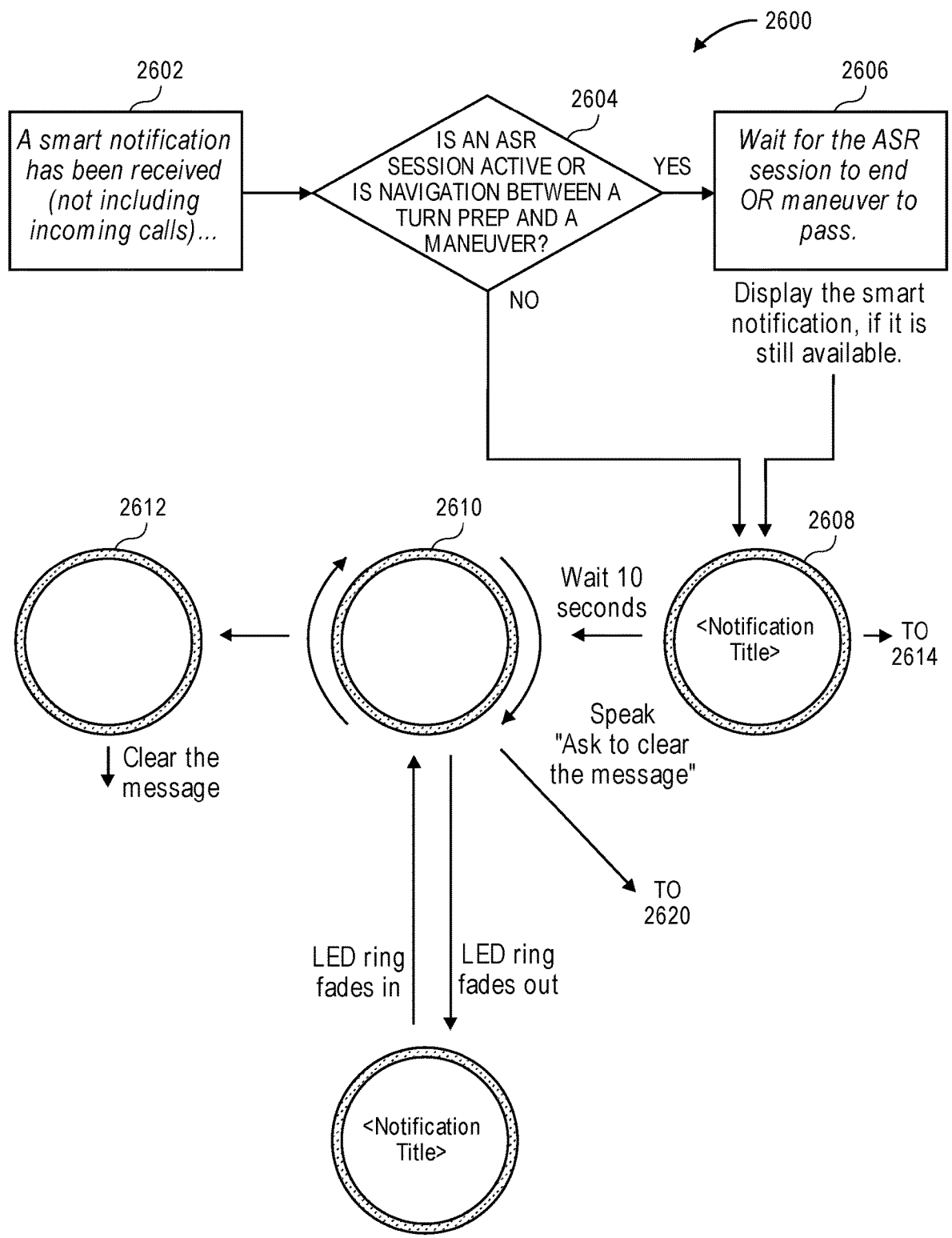
FIG. 26A is a flow diagram showing an example process that employs a mobile application interface device, such as the mobile application interface device of FIGS. 1A through 1C.
Figure 26B:
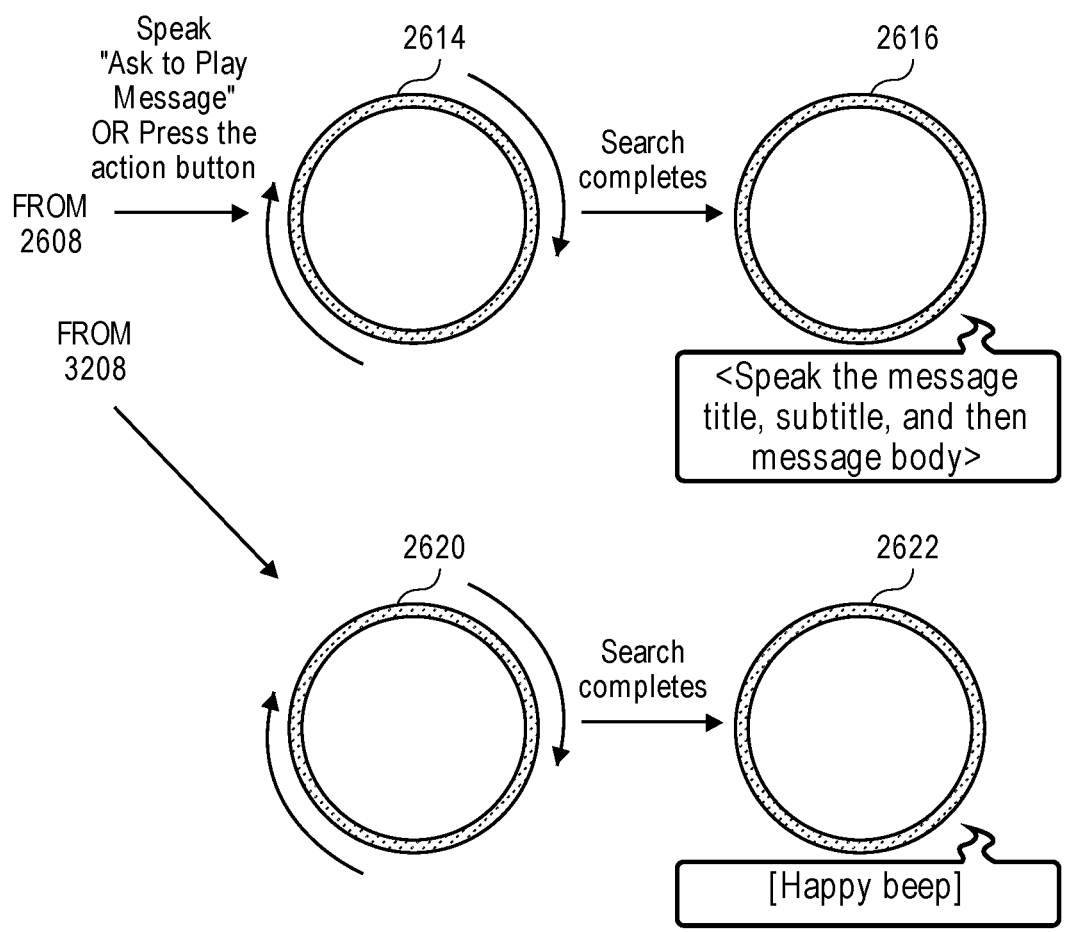
FIG. 26B is a flow diagram showing an example process that employs a mobile application interface device, such as the mobile application interface device of FIGS. 1A through 1C.

FIGS. 26A and 26B show an example process 2600 for presenting smart notifications (e.g., message notifications, emails, alerts/warnings, calendar alerts/updates, and so forth) via the device 100 (e.g., via the display 104, speaker 120/audio output interface 144, and/or indicator lights 106). A smart notification may be received at the mobile device 202 and communicated to the device 100 via the mobile application 218 (block 2602). For example, the mobile device 202 may receive a text message, emails, alert/warning, calendar alert, calendar update, alarm notification, or the like. The device 100 can determine whether an ASR session is active and/or device 100 is at or near a route guidance maneuver (block 2604). The device 100 can wait for the ASR session to end or for the device 100 to clear the route guidance maneuver to avoid interrupting active ASR or disrupting route guidance near a maneuver (block 2606). When the device 100 determines that there are no active ASR sessions and that the device 100 is not at or near a route guidance maneuver, the device 100 may provide an audio and/or display output to present a notification title to the user (block 2608). If the user does not provide any instructions or queries for the device 100, the device 100 may display the message for some time (block 2610) and then clear the message from the display 104 (block 2612). If the user instructs the device 100 to play the message from server 206/208 (or presses the action button to cause the device 100 to play the message), the device 100 may communicate the instructions to server 206/208 while displaying an illumination pattern (e.g., spinning blue light) to let the user know that the device 100 is processing the user's request (block 2614). When the message has been received by the device 100 from server 206/208, the device 100 can provide an audio and/or display output including the message for the user to view or hear (block 2616). If the user instructs the device 100 to clear the message from server 206/208, the device 100 may communicate the instructions to server 206/208 while displaying an illumination pattern (e.g., spinning blue light) to let the user know that the device 100 is processing the user's request (block 2620). When the message has been cleared (e.g., deleted/archived), the device 100 may provide an audio (e.g., success tone) and/or display output to notify the user that the request to clear the message has been successfully processed (block 2622).

Figure 27A:
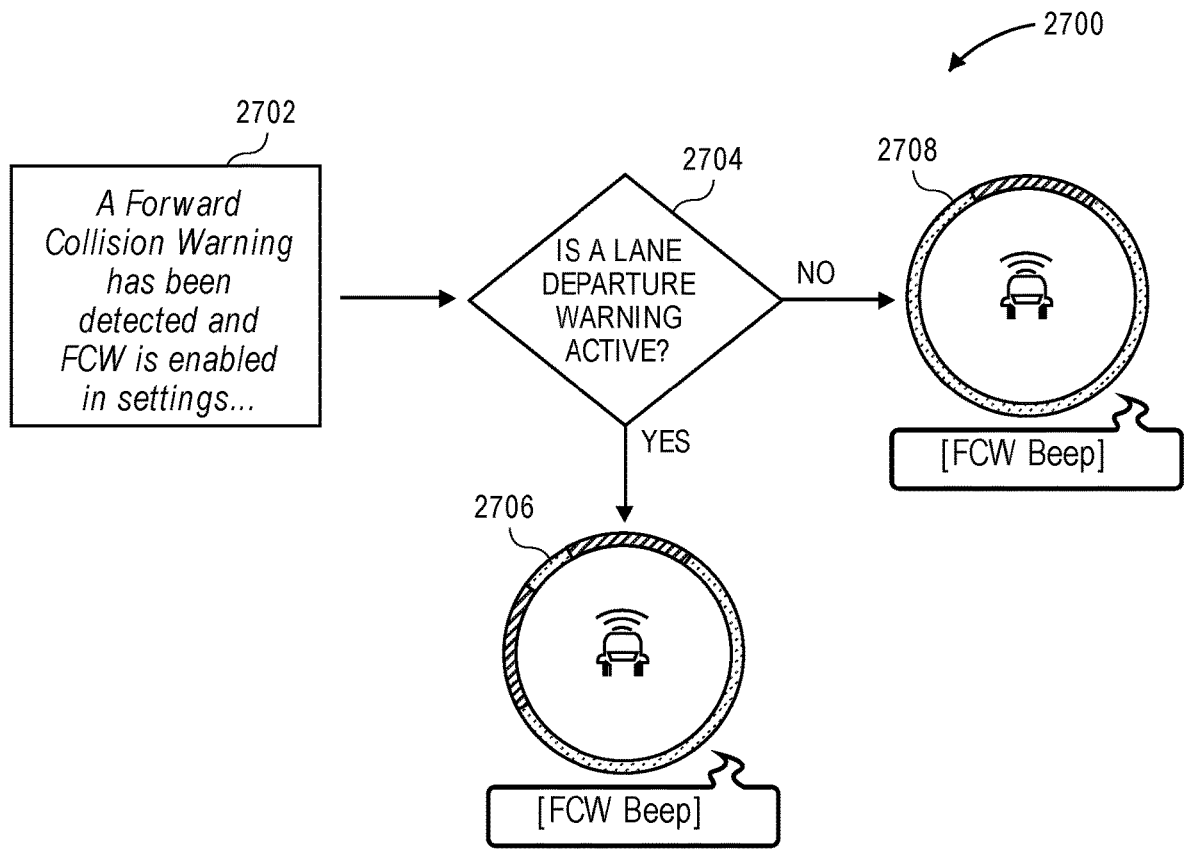
FIG. 27A is a flow diagram showing an example process that employs a mobile application interface device, such as the mobile application interface device of FIGS. 1A through 1C.
Figure 27B:
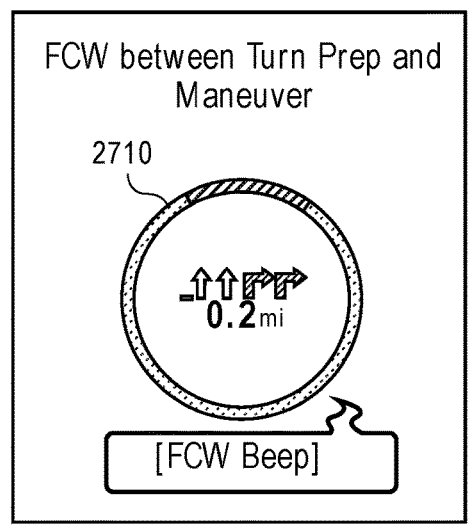
FIG. 27B shows an example output from a mobile application interface device, such as the mobile application interface device of FIGS. 1A through 1C.

FIGS. 27A and 27B show an example process 2700 for presenting ADAS alerts/warnings (e.g., a forward collision warning) via the device 100 (e.g., via the display 104, speaker 120/audio output interface 144, and/or indicator lights 106). While the device 100 is in motion, a forward collision warning event can be detected (block 2702). For example, the device 100 can detect when there is less than a threshold proximity (e.g., less than a threshold distance) to an object in a field of view of the camera 122 based on the image(s) and/or video recorded by the camera 122 while the device 100 is in motion. The device 100 may determine if a lane departure warning is active (block 2704). If there is no lane departure warning, the device 100 can provide a display output, audio output, and/or illumination pattern (e.g., illuminating a front portion of the light ring) to present the forward collision warning to the user (block 2708). If there is a lane departure warning, the device 100 can provide a display output, audio output, and/or illumination pattern (e.g., illuminating a front portion of the light ring) to present the forward collision warning to the user in addition to providing a display output, audio output, and/or illumination pattern (e.g., illuminating a side portion of the light ring) to present the lane departure warning to the user (block 2706). As shown in FIG. 27B, if the forward collision warning is detected when route guidance is active and the device 100 is at or near a maneuver, the device 100 can provide a display output that presents the maneuver to the user and can provide an audio output and/or illumination pattern (e.g., illuminating a front portion of the light ring) to present the forward collision warning to the user (block 2710).

Figure 28A:
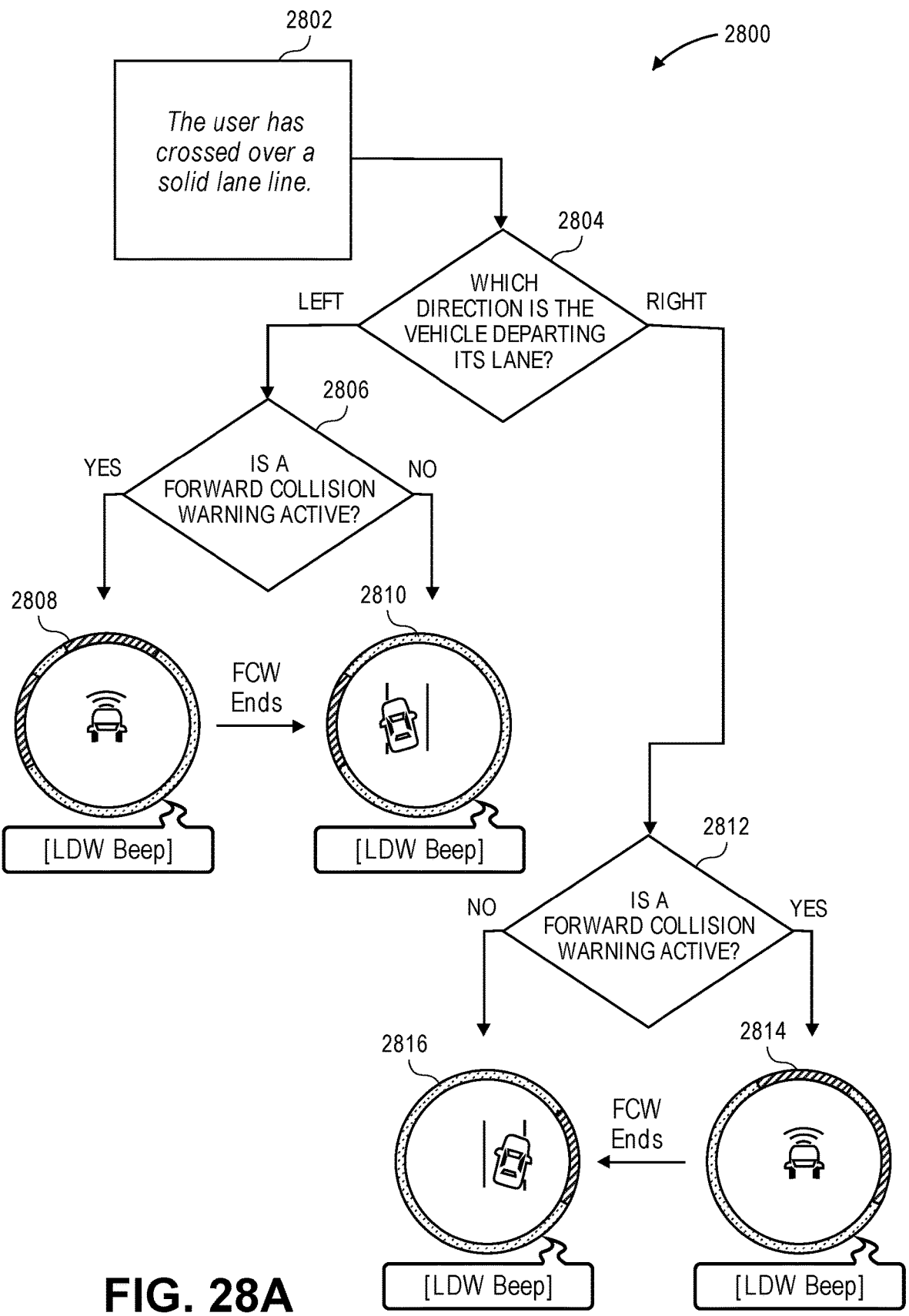
FIG. 28A is a flow diagram showing an example process that employs a mobile application interface device, such as the mobile application interface device of FIGS. 1A through 1C.
Figure 28B:
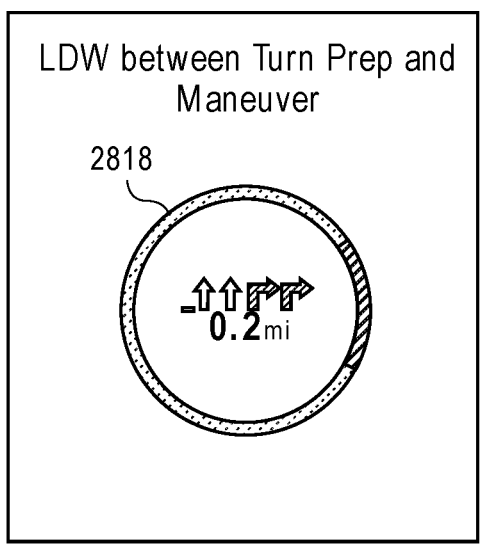
FIG. 28B shows an example output from a mobile application interface device, such as the mobile application interface device of FIGS. 1A through 1C.

FIGS. 28A and 28B show an example process 2800 for presenting ADAS alerts/warnings (e.g., a lane departure warning) via the device 100 (e.g., via the display 104, speaker 120/audio output interface 144, and/or indicator lights 106). While the device 100 is in motion, a lane departure warning event can be detected (block 2802). For example, the device 100 can detect when there at least a threshold deviation from a reference alignment between lanes in a field of view of the camera 122 based on the image(s) and/or video recorded by the camera 122 while the device 100 is in motion (e.g., the device 100 detects that the vehicle has crossed over a solid line). The device 100 may determine the direction of the lane departure (e.g., did the vehicle cross over a solid line on the right or left?) (block 2804). The device 100 may determine if a forward collision warning is active (block 2806/2812). If there is no forward collision warning, the device 100 can provide a display output, audio output, and/or illumination pattern (e.g., illuminating a left or right-side portion of the light ring) to present the lane departure warning to the user (block 2808/2816). If there is an active forward collision warning, the device 100 can provide a display output, audio output, and/or illumination pattern (e.g., illuminating a front portion of the light ring) to present the forward collision warning to the user in addition to providing an audio output and/or illumination pattern (e.g., illuminating a left or right-side portion of the light ring) to present the lane departure warning to the user (block 2810/2814). The forward collision warning may be prioritized over the lane departure warning; accordingly, the device 100 may be configured to display the forward collision warning and/or provide audio to notify the user of the forward collision warning even though a lane departure warning may be simultaneously active on the device 100. As shown in FIG. 28B, if the lane departure warning is detected when route guidance is active and the device 100 is at or near a maneuver, the device 100 can provide a display output that presents the maneuver to the user and can provide an audio output and/or illumination pattern (e.g., illuminating a side portion of the light ring) to present the lane departure warning to the user (block 2818).

Figure 29:
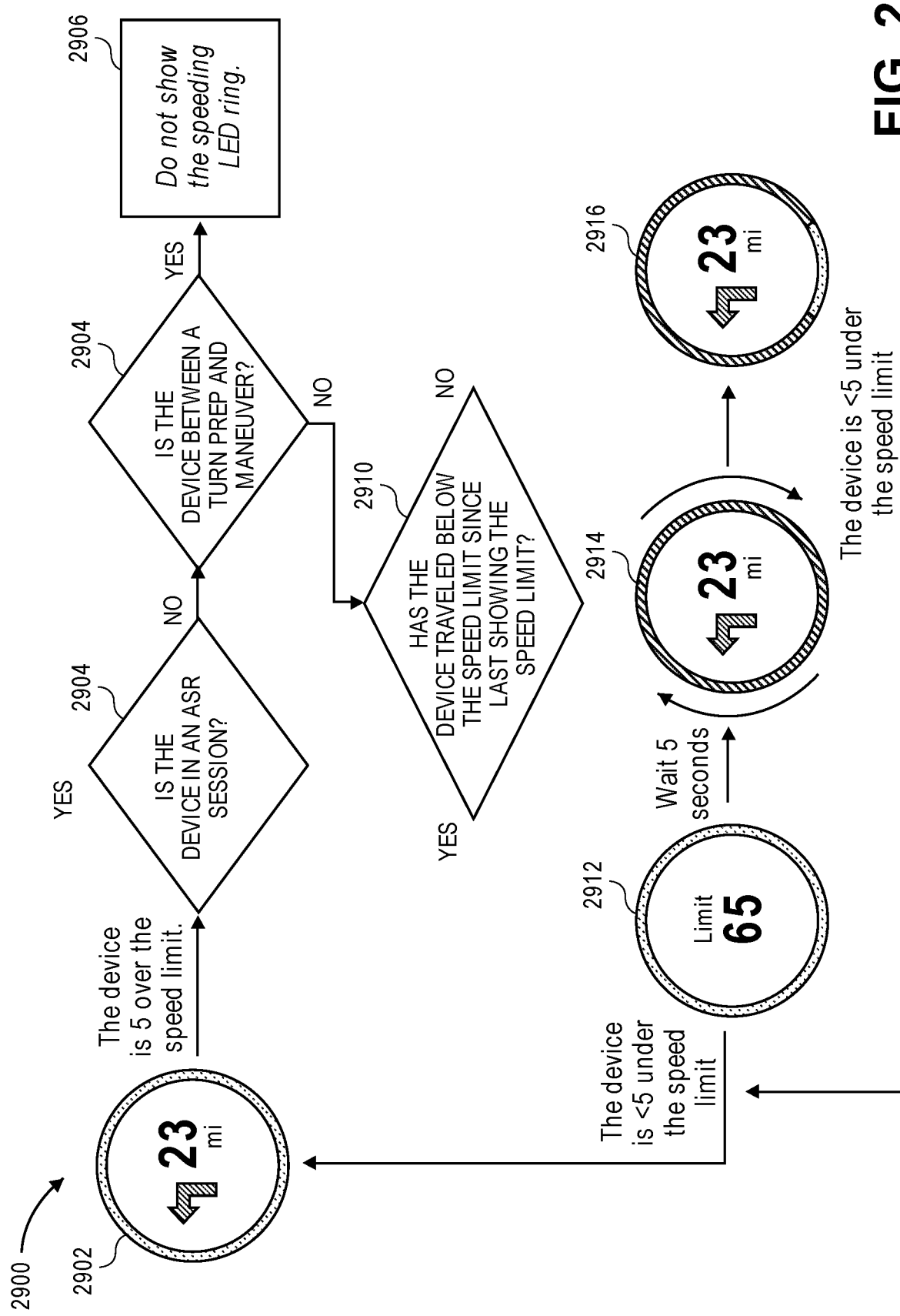
FIG. 29 is a flow diagram showing an example process that employs a mobile application interface device, such as the mobile application interface device of FIGS. 1A through 1C.

FIG. 29 shows an example process 2900 for presenting ADAS alerts/warnings (e.g., a speed limit warning) via the device 100 (e.g., via the display 104, speaker 120/audio output interface 144, and/or indicator lights 106). The device 100 may acquire speed limit information from server 208 and detect when the device 100 is over the speed limit (block 2902). For example, the device 100 can detect when the device 100 is moving at a speed at least a threshold speed above the speed limit (e.g., at least X mph over the speed limit) based on location tracking data (e.g., GPS tracking data) and/or speed sensor data. The device 100 can determine whether an ASR session is active and/or whether device 100 is at or near a route guidance maneuver (block 2904). The device 100 can wait for the ASR session to end or for the device 100 to clear the route guidance maneuver to avoid interrupting active ASR or disrupting route guidance near a maneuver (block 2906). When the device 100 determines that there are no active ASR sessions and that the device 100 is not at or near a route guidance maneuver, the device 100 may determine whether the user has traveled below the speed limit since the last speed limit warning was provided to the user (block 2910). If the device 100 determines that the user traveled below the speed limit after the last speed limit warning was provided to the user, the device 100 may provide a new speed limit warning by providing an audio output, display output (e.g., presenting the speed limit) and/or illumination pattern (e.g., presenting a red light ring via the indicator lights 106) to alert the user that he or she is speeding (block 2912). The device 100 can discontinue the display output (and return to a previous display, e.g., route guidance) and may also discontinue and/or reduce the intensity of the illumination pattern (e.g., by turning off segments of the light ring or reducing brightness) after a period (e.g., after t seconds) of time (block 2914). The device 100 may completely discontinue the speed limit warning when the device 100 is traveling below the speed limit or is no longer traveling more than the threshold speed above the speed limit (block 2916).

Figure 30A:
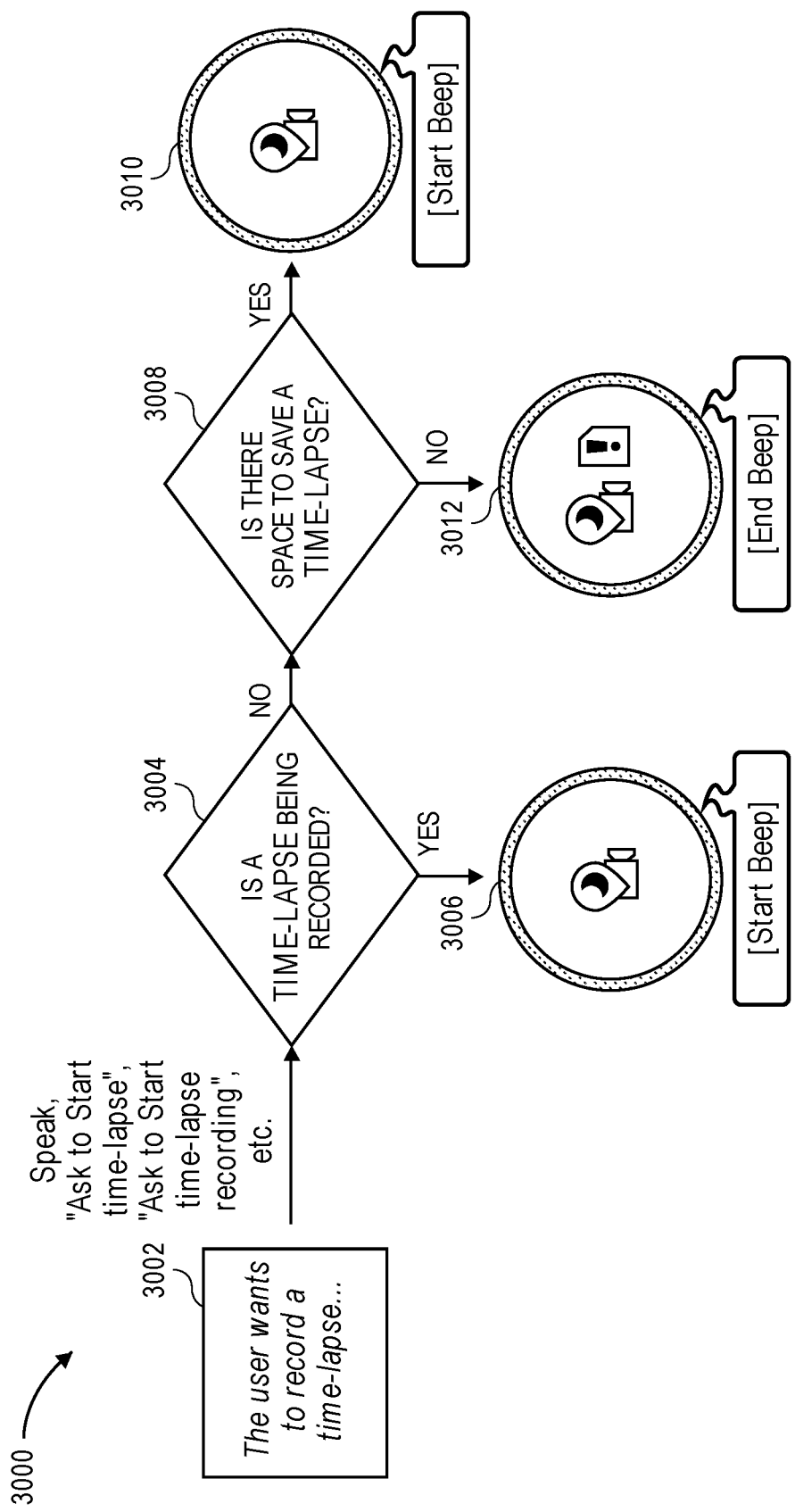
FIG. 30A is a flow diagram showing an example process that employs a mobile application interface device, such as the mobile application interface device of FIGS. 1A through 1C.
Figure 30B:
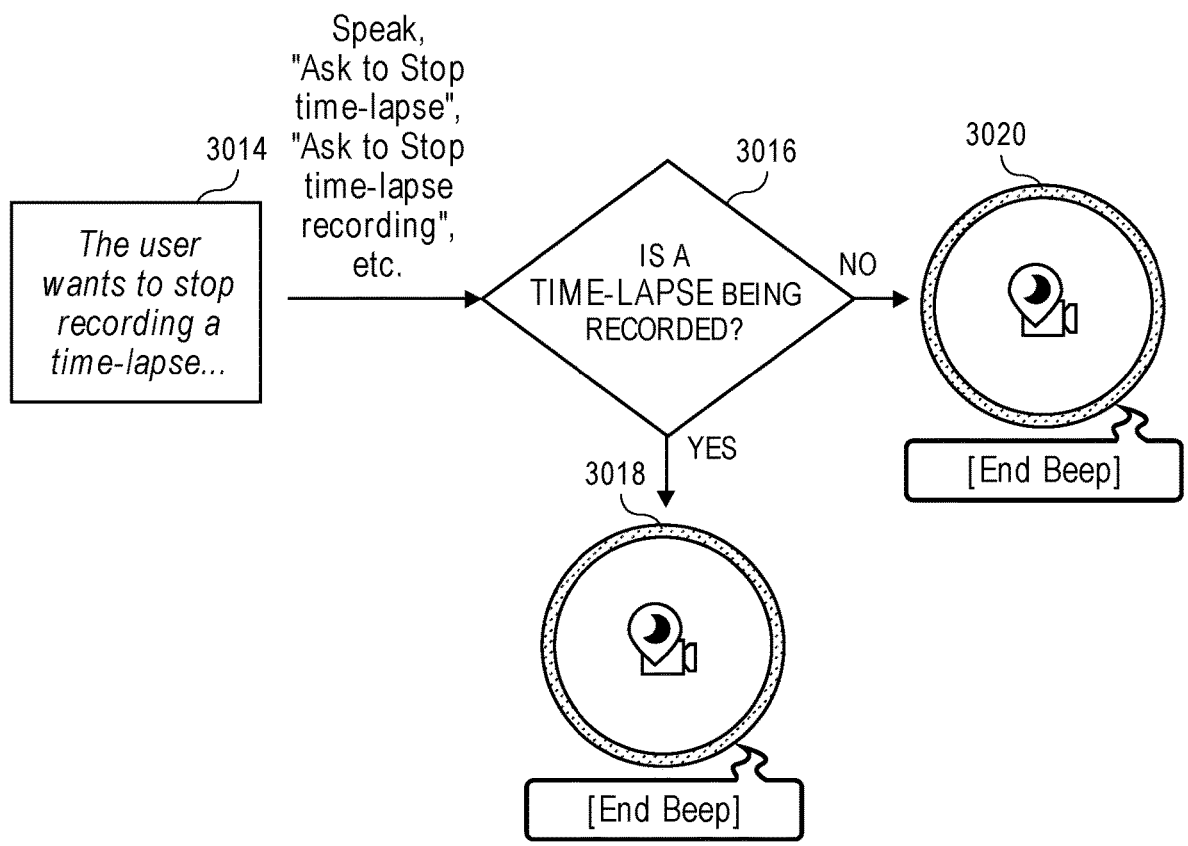
FIG. 30B is a flow diagram showing an example process that employs a mobile application interface device, such as the mobile application interface device of FIGS. 1A through 1C.
Figure 31A:
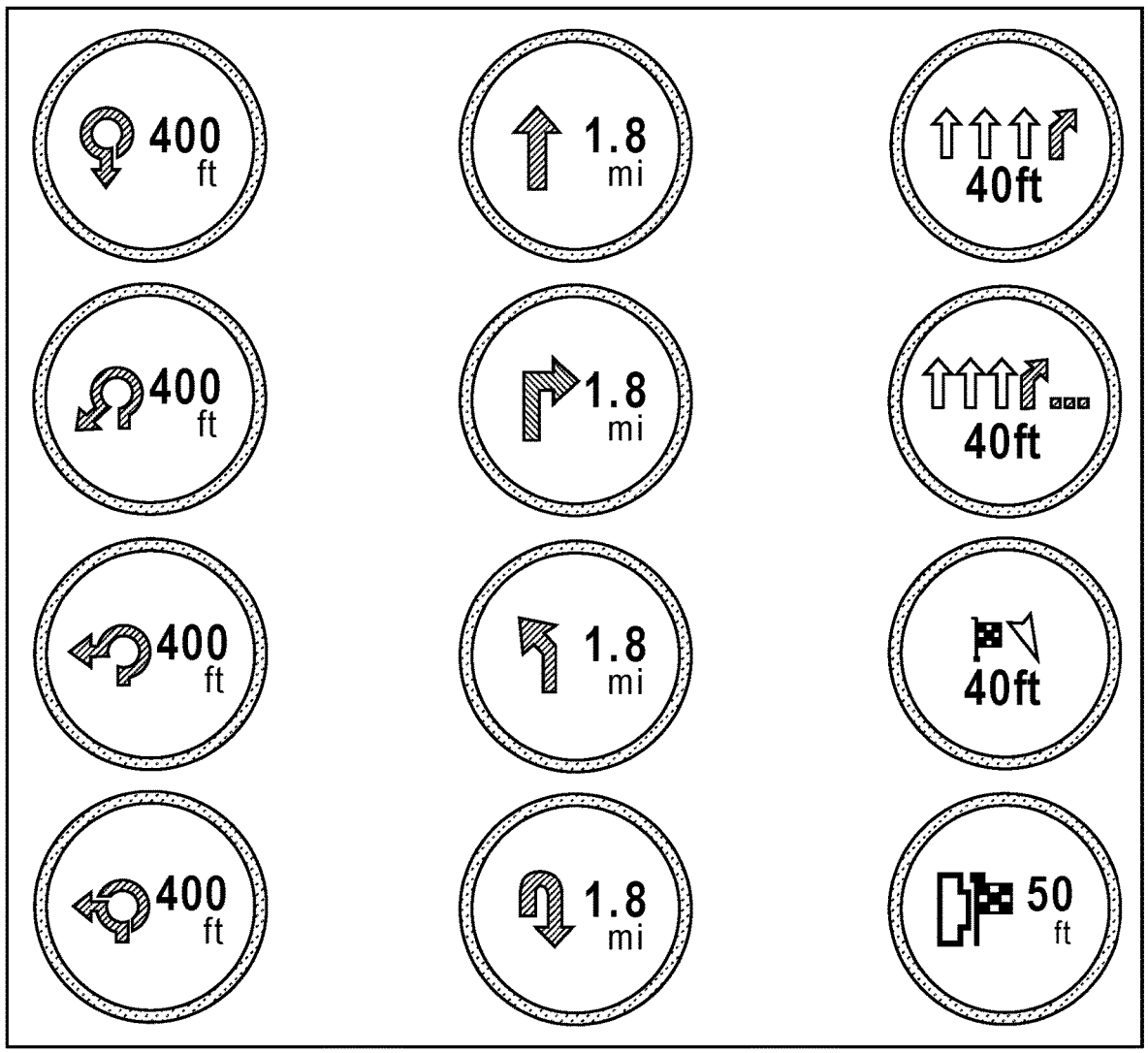
FIG. 31A shows example display output symbols for a mobile application interface device, such as the mobile application interface device of FIGS. 1A through 1C.
Figure 31B:
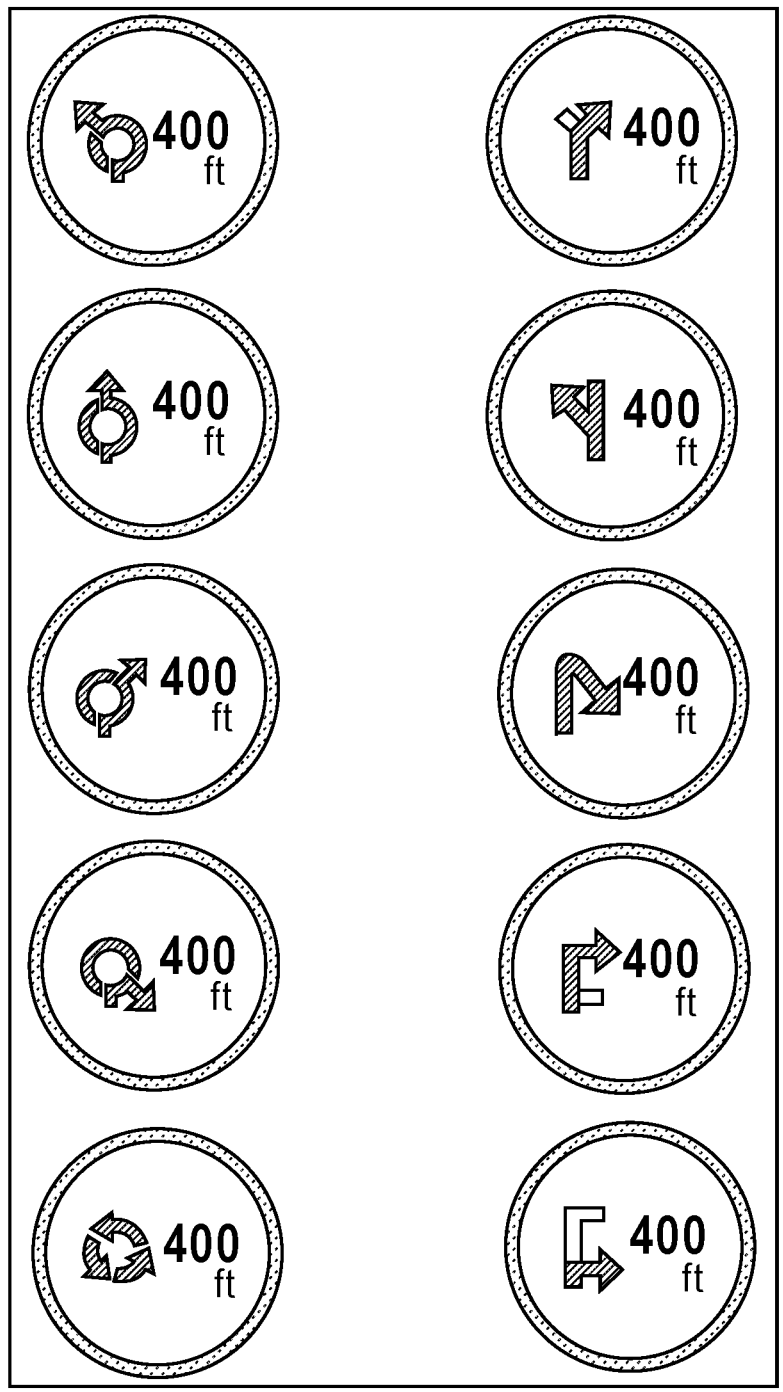
FIG. 31B shows example display output symbols for a mobile application interface device, such as the mobile application interface device of FIGS. 1A through 1C.
Figure 31C:
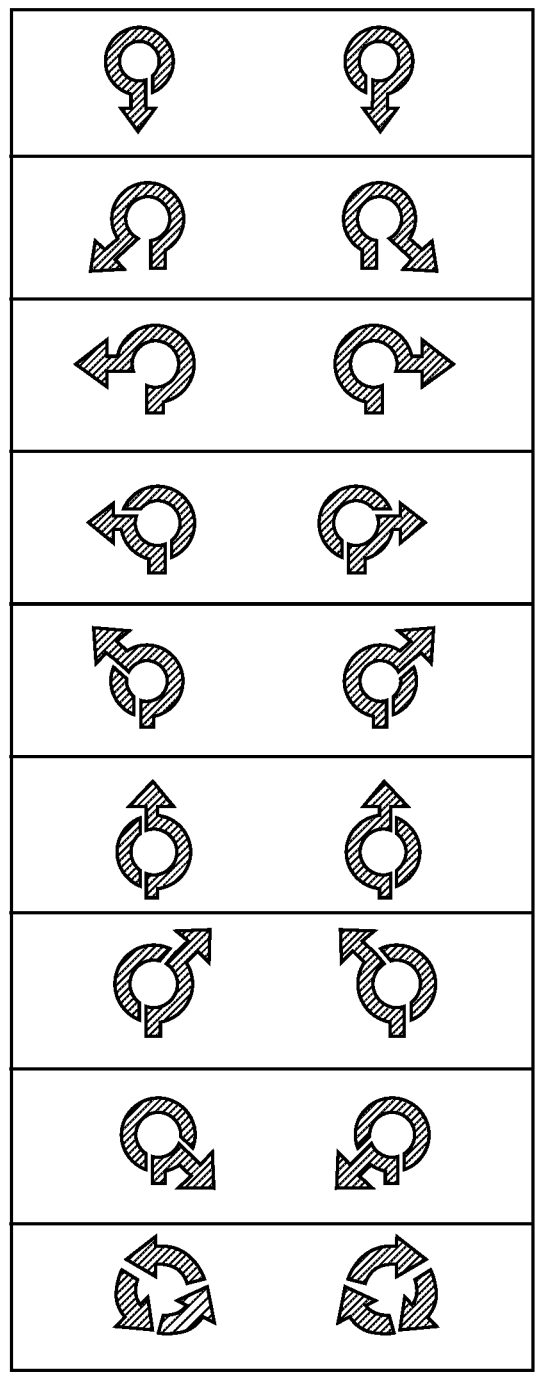
FIG. 31C shows example display output symbols for a mobile application interface device, such as the mobile application interface device of FIGS. 1A through 1C.
Figure 31D:
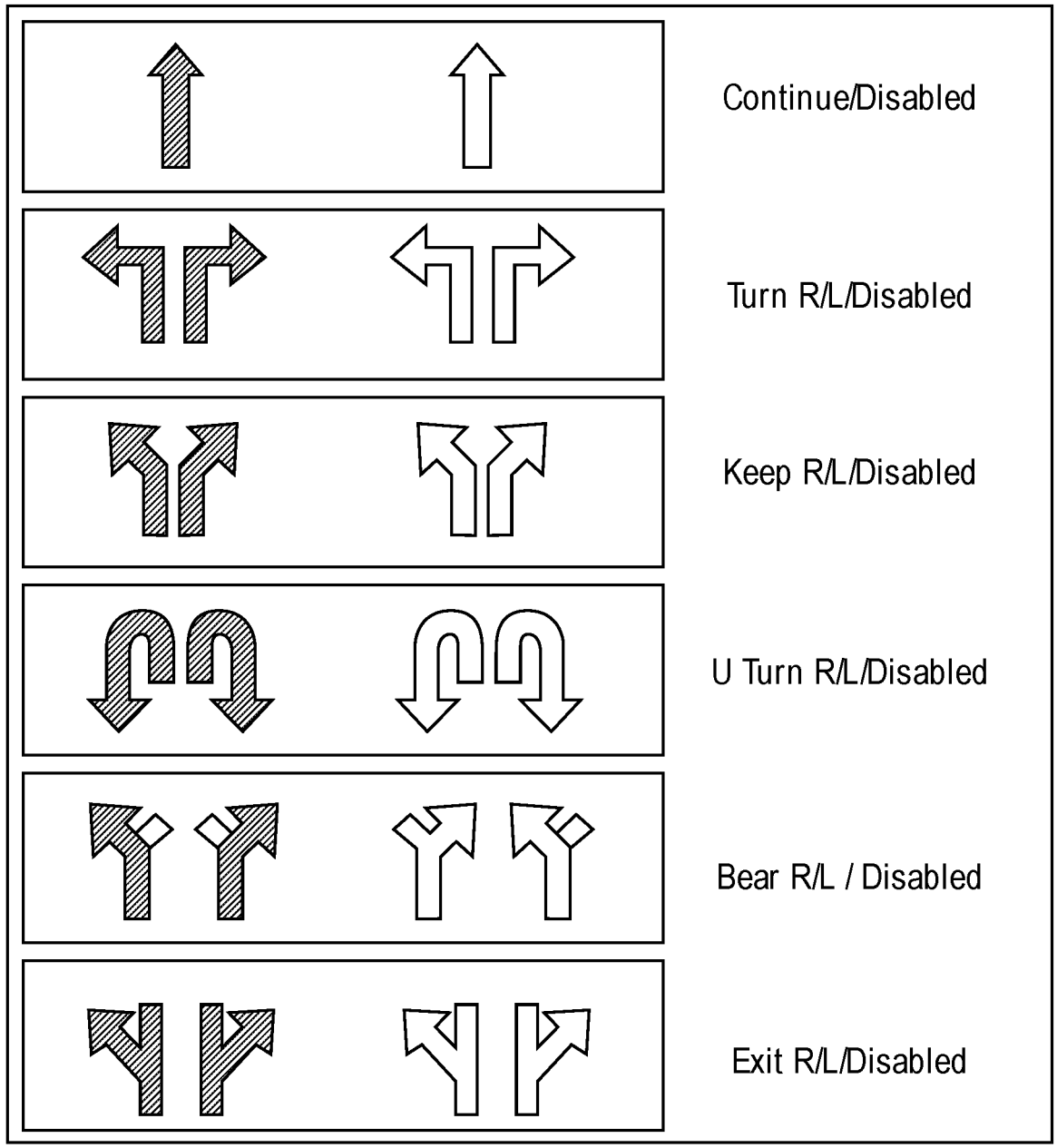
FIG. 31D shows example display output symbols for a mobile application interface device, such as the mobile application interface device of FIGS. 1A through 1C.
Figure 31E:
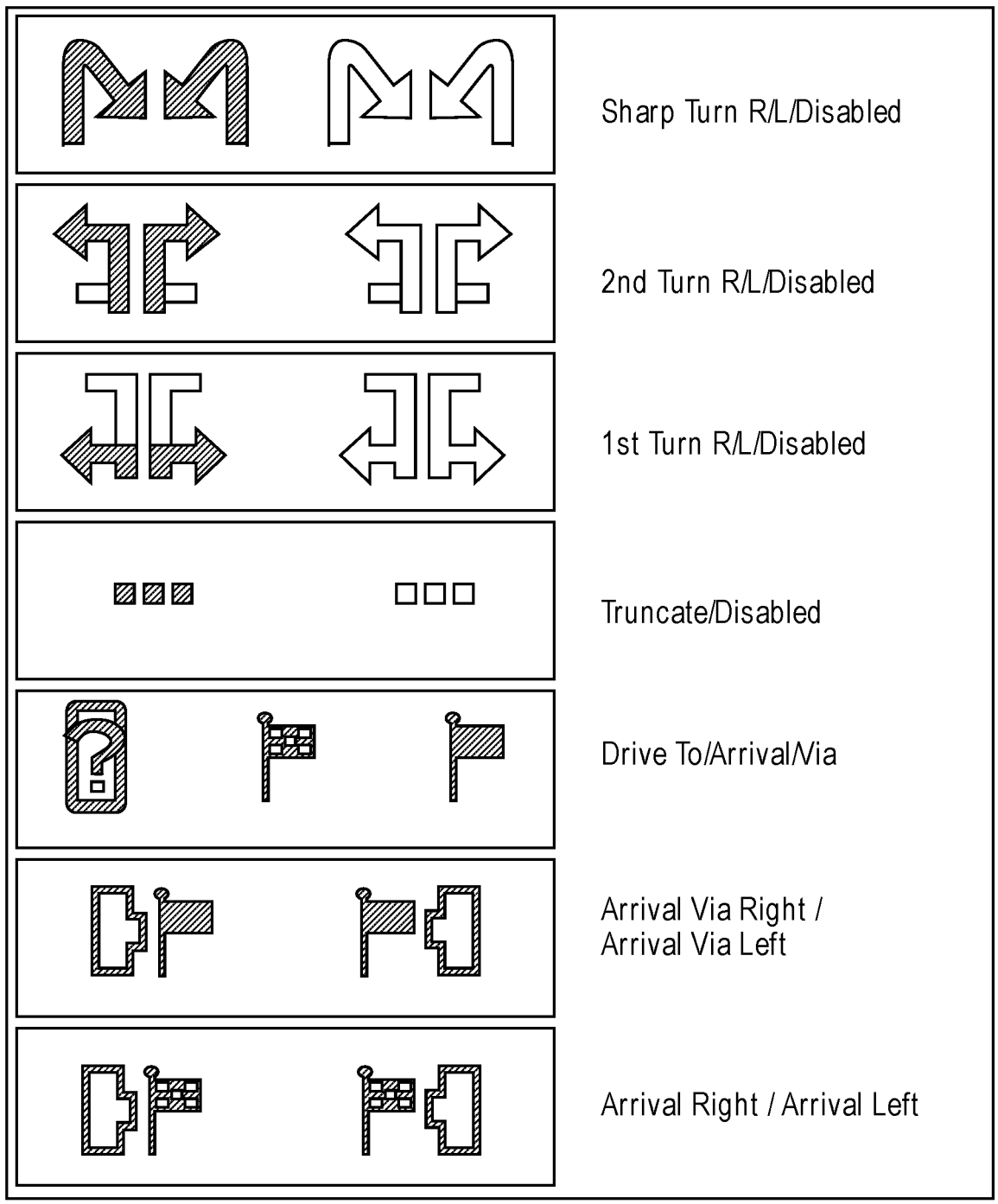
FIG. 31E shows example display output symbols for a mobile application interface device, such as the mobile application interface device of FIGS. 1A through 1C.
Figure 32:
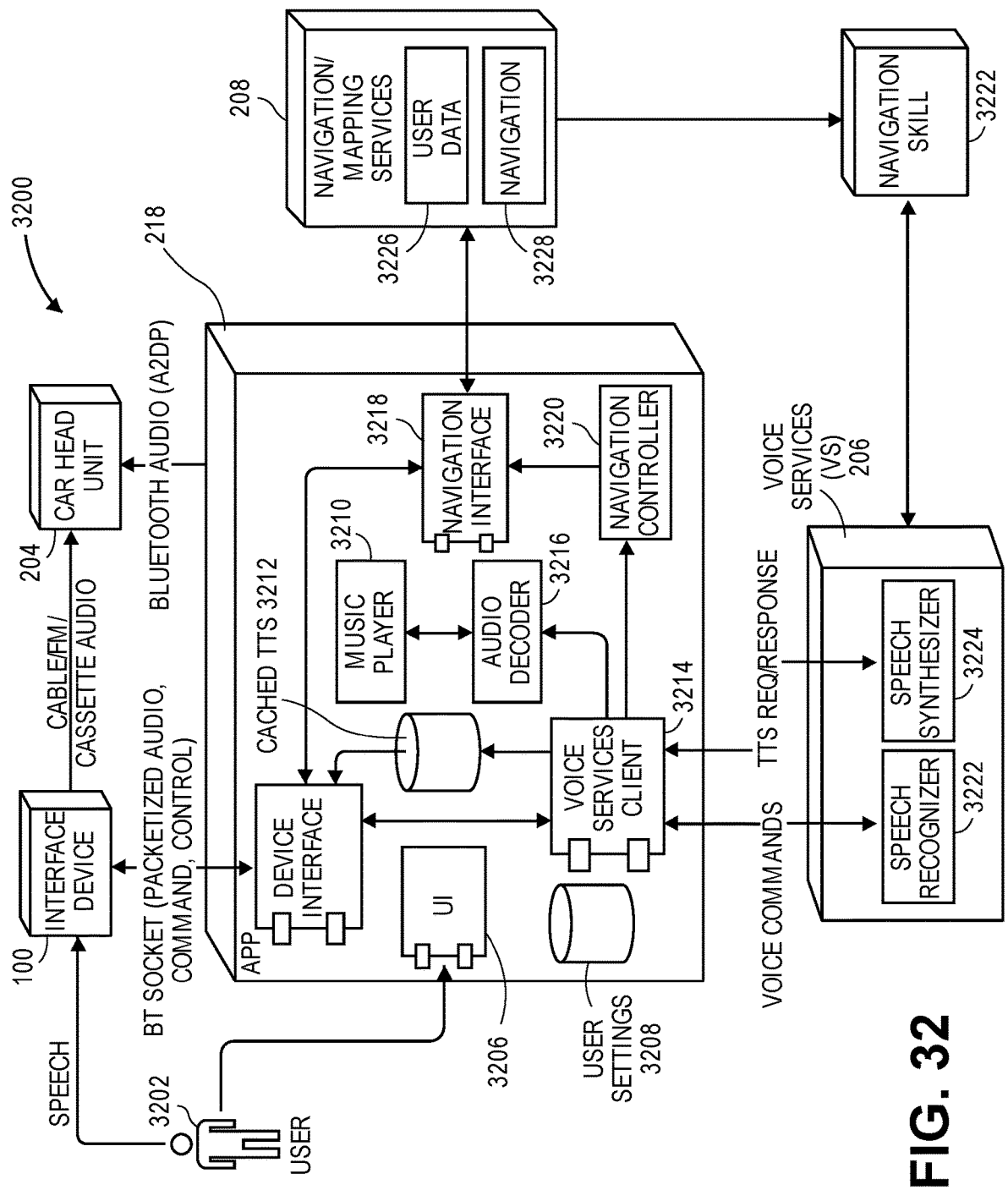
FIG. 32 is a block diagram illustrating a system that employs a mobile application interface device, such as the mobile application interface device of FIGS. 1A through 1C, in accordance with an example embodiment of the present disclosure.

FIGS. 30A and 30B show an example process 3000 for interacting with the device 100 to record content (e.g., images and/or video footage) via the camera 122. For example, the device 100 can record images and/or video footage in a "time-lapse" format that can be shared with contacts and/or on social media applications/websites. After the wakeup word is spoken or the action button is pressed, the device 100 can listen for a spoken instruction or query from the user. The user may provide a voice input (e.g., a spoken instruction/query) for the device 100 to record a time-lapse (block 3002). In some implementations, the user queries server 206 and/or server 208 to provide instructions to the device 100 for recording a time-lapse. The device 100 can determine if the camera 122 is already being used to record a time-lapse or content in any other form (block 3004). If the camera 122 is already recording time-lapse content, the device 100 may provide an audio output (e.g., notification "beep") to the user to let the user know that the camera 122 is already recording content (block 3006). If the camera 122 is not already recording time-lapse content, the device 100 may assess the memory (e.g., built-in or installed memory) to determine if the memory is operable and if there is enough free space in memory to store time-lapse content (block 3008). If the memory is inoperable or if there is not enough free space in memory to store time-lapse content (e.g., less than X GB of memory), the device 100 may provide an audio, display, and/or illumination pattern output to notify the user of a memory error (e.g., to notify the user of inoperable/insufficient memory) (block 3012). If the memory is operable and has enough free space to record time-lapse content (e.g., at least X GB of memory), the device 100 may begin recording images and/or video content via the camera 122 and may provide an audio output (e.g., success "beep") to notify the user that the camera 122 has begun recording content (block 3010).

As shown in FIG. 30B, the user can stop recording time-lapse content by providing a voice input/command for the device 100. After the wakeup word is spoken or the action button is pressed, the device 100 can listen for a spoken instruction or query from the user. The user may provide a voice input (e.g., a spoken instruction/query) for the device 100 to stop time-lapse recording (block 3014). The device 100 can determine if the camera 122 is already being used to record a time-lapse or content in any other form (block 3016). If the device 100 is recording content via the camera 122, the device 100 can stop recording the content and may also provide an audio and/or display output to notify the user that the device 100 has stopped recording content via the camera 122 (block 3018). If the device 100 is not recording content via the camera 122, the device 100 may still provide an audio and/or display output to notify the user that the device 100 has stopped recording content via the camera 122 (block 3020).

The device 100 may provide various symbolic and/or textual outputs via the display 104 to alert the user of maneuvers during route guidance. For example, FIGS. 31A through 31E illustrate examples of symbols that can be provided via the display 104 to indicate maneuvers (e.g., turns), traffic information, and other guidance notifications. In implementations, the device 100 may be configured to provide symbolic outputs via the display 104 to enable presentation of information from the device 100 to the user with a small viewing area (e.g., a display that may be less than one inch wide in some embodiments).

Various configurations of the system 200 including the device 100, the mobile application 218 running on the mobile device 202, and the vehicle audio system 204 are illustrated in FIGS. 32 through 42B. In an embodiment shown in FIGS. 32 and 33, a configuration 3200 is shown to include two interfaces for a user 3202. The user 3202 can interface with the mobile application 218 using the device 100 and a user interface 3206 (e.g., a graphical user interface (GUI)) of the mobile application 218 that is provided via the display 248 of the mobile device 202. The mobile application 218 can also include a device interface 3204 that facilitates connectivity between the mobile application 218 and the device 100 (e.g., via communications between short-range transceivers 132 and 220). The mobile application 218 may also be configured to communicate directly with the vehicle audio system 204 via the short-range communications transceiver 220 of the mobile device 202 or indirectly by connecting to the vehicle audio system 204 through the device 100. For example, the device 100 may send audio signals to the vehicle audio system 204 after receiving the audio from the mobile application 218. In embodiments, the mobile application 218 also includes cached text-to-speech (TTS) data 3212 (e.g., cached navigation instructions) and user settings 3208. The mobile application 218 includes a voice services client 3214 for connecting to the voice services (VS) server 206 that can provide speech recognizer 3222 and speech synthesizer 3224 services. The mobile application 218 can also include an audio decoder 3216 and a music/media player 3210 for outputting information (e.g., TTS) received via the VS client 3214. In embodiments, the device 100 can be configured to receive a spoken instruction or query form a user via the microphone 110 and configured to send data associated with the spoken instruction or query to the mobile application 218 running on the mobile device 202 via the short-range communications transceiver 132. The mobile application 218 can be configured to cause the mobile device 202 to transmit an audio output based on the spoken instruction or query via the short-range communications transceiver 220 to the vehicle audio system 204 or to the device 100 so that the device 100 can output the audio via the speaker 120 or the audio output interface 144. In embodiments, the mobile application 218 is configured to cause the mobile device 202 to transmit the data associated with the spoken instruction or query to server 206 via the cellular transceiver 222 for voice service processing and is further configured to cause the mobile device 202 to receive information for the audio output from the server 206 in response to the data associated with the spoken instruction or query.

The mobile application 218 further includes a navigation controller 3220 and navigation interface 3218 for connecting to the navigation/mapping services (NAV) server 208 that can provide navigation services 3228 and store user data 3226 (e.g., user profiles for route guidance and other location based services). In implementations, the VS server 206 and the NAV server 208 can be connected by a navigation skill 3822 service that can be enabled (e.g., via the mobile application 218) to provide access to the NAV server 208 through the VS server 206. For example, when the navigation skill 3822 is enabled, the mobile application 218 can be configured to cause the mobile device 202 to transmit the data associated with the spoken instruction or query to server 206 for voice service processing; receive navigation command data from server 206 based on the spoken instruction or query; transmit the navigation command data and data associated with the current position of the device 100 to server 208 via the cellular transceiver for navigation service processing; and receive information for an audio/display output (e.g., navigation data/instructions) from server 208 in response to the navigation command data and the data associated with the current position of the device 100. In another implementation, the mobile application 218 can be configured to cause the mobile device 202 to transmit data associated with the current position of the device 100 and data associated with the spoken instruction or query to server 206 for voice service processing; receive navigation command data from server 206 based on the data associated with the position of the device 100 and the spoken instruction or query; transmit the navigation command data to server 208 via the cellular transceiver for navigation service processing; and receive information for an audio/display output (e.g., navigation data/instructions) from server 208 in response to the navigation command data.

Figure 33:
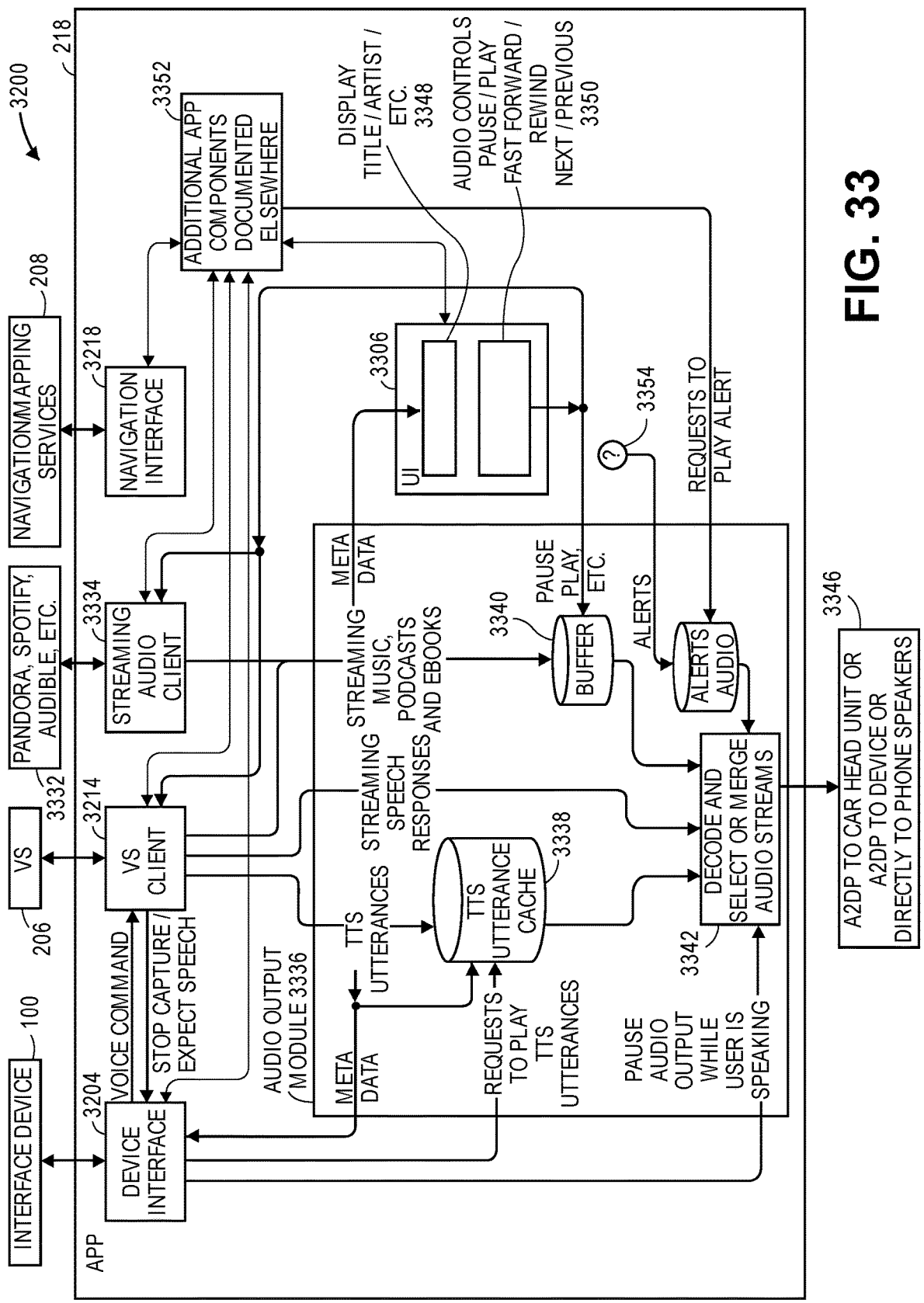
FIG. 33 is a block diagram illustrating a system that employs a mobile application interface device, such as the mobile application interface device of FIGS. 1A through 1C, in accordance with an example embodiment of the present disclosure.

As shown in FIG. 33, the mobile application 218 can further include a streaming audio client 3334 that facilitates connectivity between the mobile application 218 and media services 3332 (e.g., PANDORA, SPOTIFY, AUDIBLE, and the like). The user interface 3306 may include display components 3348 that show information associated with media content (e.g., music) received from the media services 3332 and/or media controls 3350. The device 100 can also be configured to control media playback through the mobile application 218 based on voice inputs (e.g., spoke instructions/queries) received from the user. The mobile application 218 may also include additional components 3352 that may provide interconnectivity among the various clients/interfaces of the mobile application 218 and/or additional clients 3354 that provide various alerts (e.g., broadcast alerts, mobile device 202 alerts, etc.). In embodiments, the mobile application 218 can include an audio processing module 3342 configured to decode and, in some cases, merge a plurality of audio streams (e.g., audio streaming, route guidance, ASR responses, etc.) that may be output via A2DP 3346 (Bluetooth streaming) and/or another audio output interface to the vehicle audio system 204, or to the device speakers 120 or mobile device speakers 246.

In embodiments, the device 100 can be configured to allow for system 200 configurations based on capabilities of the mobile device 202 and the vehicle audio system 204, and/or optional configurations that are based on user selection. FIG. 34 shows an optional configuration 3400 where audio outputs (e.g., route guidance, media streaming, ASR responses, hands-free calls, etc.) are transmitted through the vehicle audio system 204 by the mobile device 202. For example, the mobile device 202 may be configured to send and receive data to and from the vehicle audio system 204 based on a communication channel (e.g., A2DP channel) established between short-range communications (e.g., Bluetooth) transceivers 220 and 262. FIG. 35 illustrates another optional configuration 3500 where audio outputs (e.g., route guidance, media streaming, ASR responses, hands-free calls, etc.) are transmitted through the vehicle audio system 204 by the device 100. For example, the mobile device 202 may be configured to send and receive data to and from the device 100 based on a communication channel (e.g., A2DP channel) established between short-range communications (e.g., Bluetooth) transceivers 132 and 220. The device 100 can then transmit audio outputs associated with the data through an audio output interface 144 (e.g., audio line out connection) to the vehicle audio system 204 (e.g., through an auxiliary input/line in connection).

Figure 36:
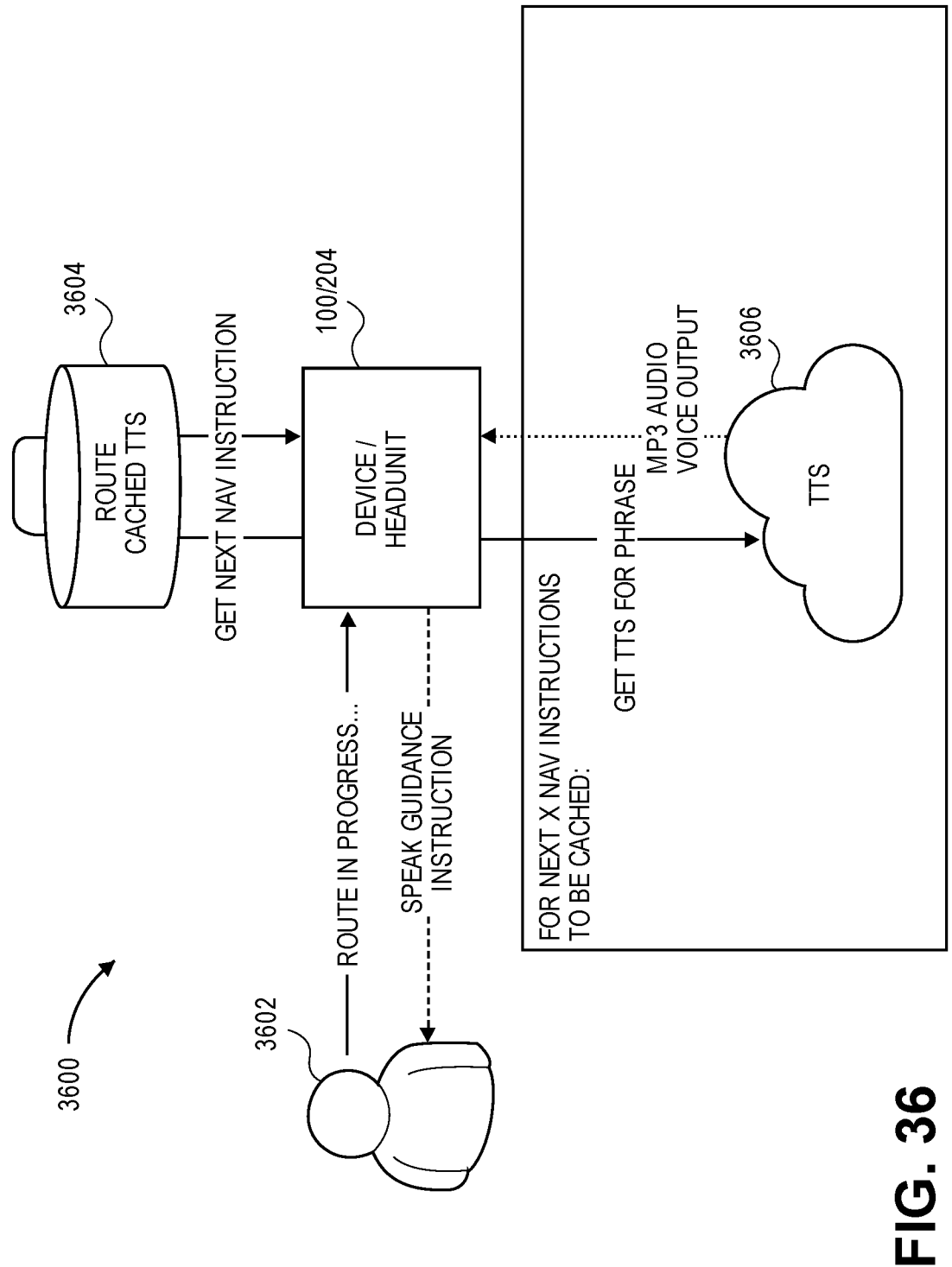
FIG. 36 is a block diagram illustrating a text-to-speech (TTS) guidance system configuration for a mobile application interface device, such as the mobile application interface device of FIGS. 1A through 1C, in accordance with an example embodiment of the present disclosure.

FIG. 36 illustrates an example configuration 3600 of the device 100 employing TTS for route guidance. For example, the device 100 can be configured to provide route guidance (e.g., display and/or audio) outputs for a user 3602 based on cached data 3604 (e.g., cached TTS data). The device 100 can be configured to connect to a TTS engine 3606 to download additional TTS data for upcoming route guidance instructions which are then stored in the cached data 3604.

Figure 37:
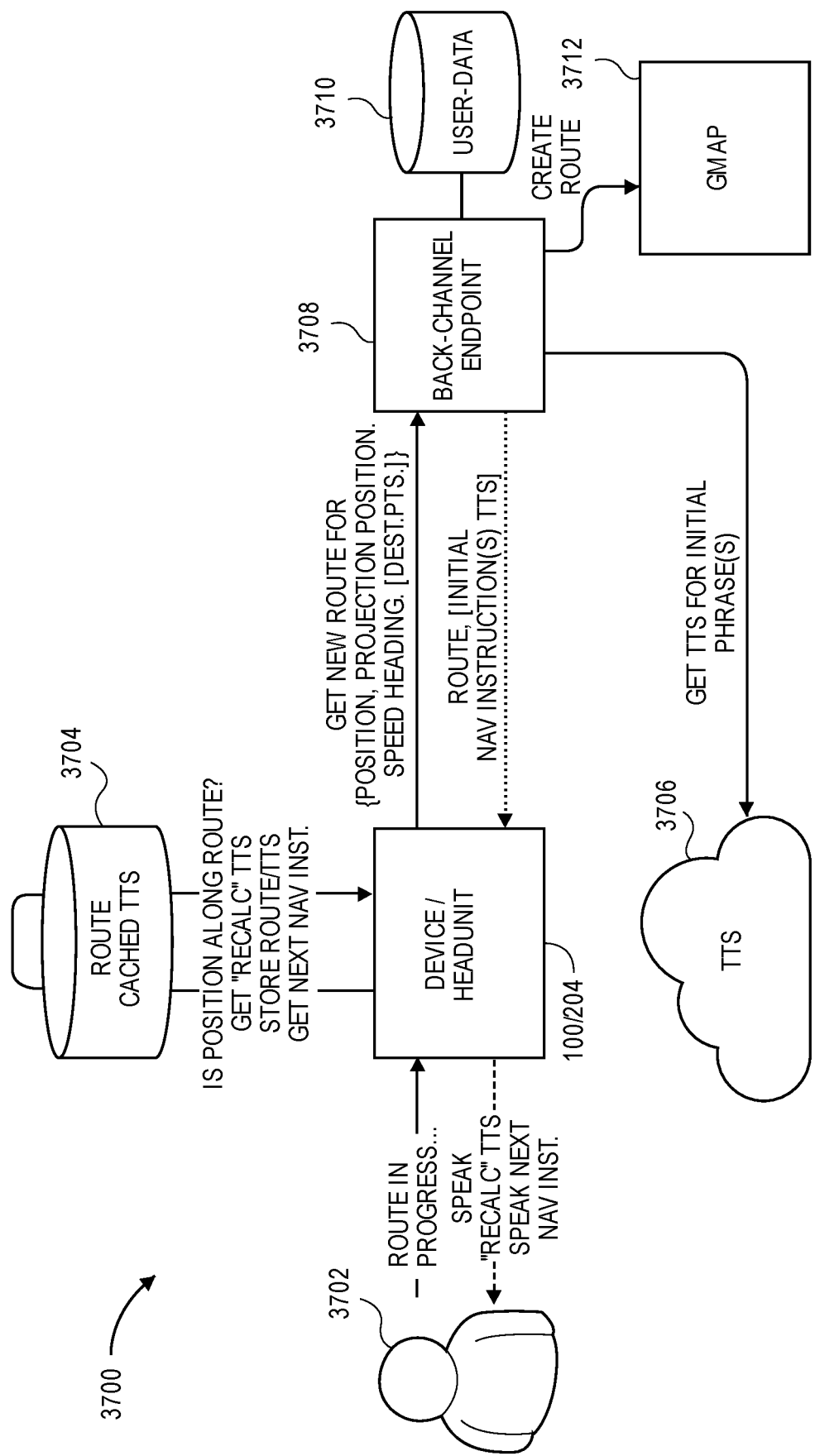
FIG. 37 is a block diagram illustrating a system configuration for a mobile application interface device, such as the mobile application interface device of FIGS. 1A through 1C, wherein the mobile application interface device facilitates communication with network provided navigation services, in accordance with an example embodiment of the present disclosure.

FIG. 37 illustrates an example configuration 3700 of the device 100 employing data from NAV server 208 and TTS for route guidance. For example, the device 100 can be configured to provide route guidance (e.g., display and/or audio) outputs for a user 3702 based on cached data 3704 (e.g., cached TTS data). The controller 124 or mobile application 218 can be configured to connect to a TTS engine 3706 to download additional TTS data for upcoming route guidance instructions which are then stored in the cached data 3704. The controller 124 or mobile application 218 can also be configured to connect to a navigation/mapping engine 3712 and a user database 3710, which may both be available through server 208, to receive additional navigation data (e.g., route guidance instructions) or other location based information. In some embodiments, the device 100 is configured to connect to the TTS engine 3706, navigation/mapping engine 3712, and/or user database 3710 through a back-channel endpoint 3708.

Figure 38:
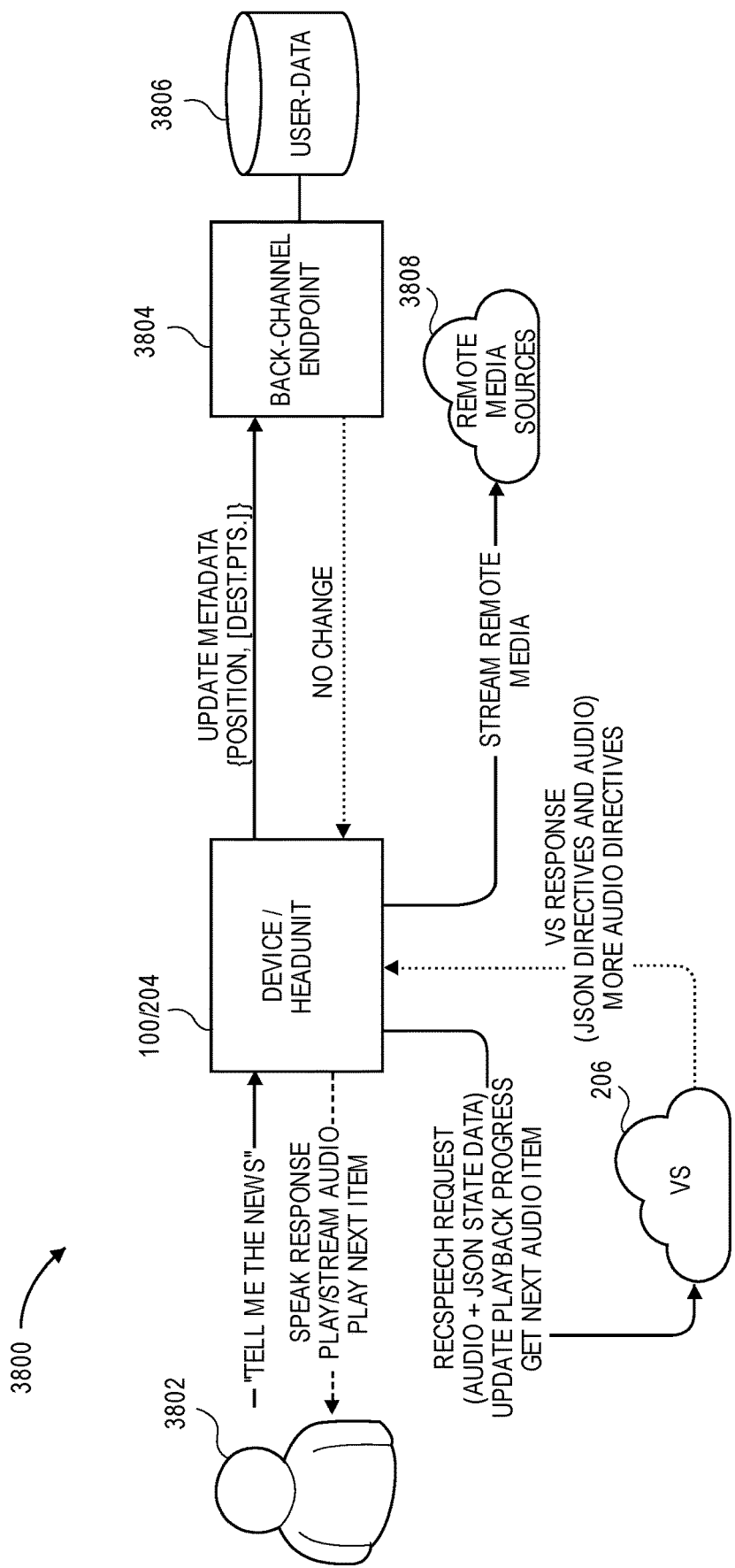
FIG. 38 is a block diagram illustrating a system configuration for a mobile application interface device, such as the mobile application interface device of FIGS. 1A through 1C, wherein the mobile application interface device facilitates communication with network provided voice services, in accordance with an example embodiment of the present disclosure.

FIG. 38 illustrates an example configuration 3800 of the device 100 employing data from VS server 206 for media applications. For example, the controller 124 or mobile application 218 can be configured to provide media (e.g., streaming audio, news, etc.) for a user 3802 based on voice inputs (e.g., spoken instructions/queries) received from the user 3802. The controller 124 or mobile application 218 can be configured to connect to VS server 206 to process the voice inputs and can connect to remote media sources 3808 (e.g., SPOTIFY, PANDORA, etc.) to receive information for the user 3802 based on the user's voice inputs. The controller 124 or mobile application 218 can also be configured to connect to a user database 3806, which may be available through server 206 or server 208. In some embodiments, the controller 124 or mobile application 218 is configured to connect to the user database 3806 through a back-channel endpoint 3804.

Figure 39:
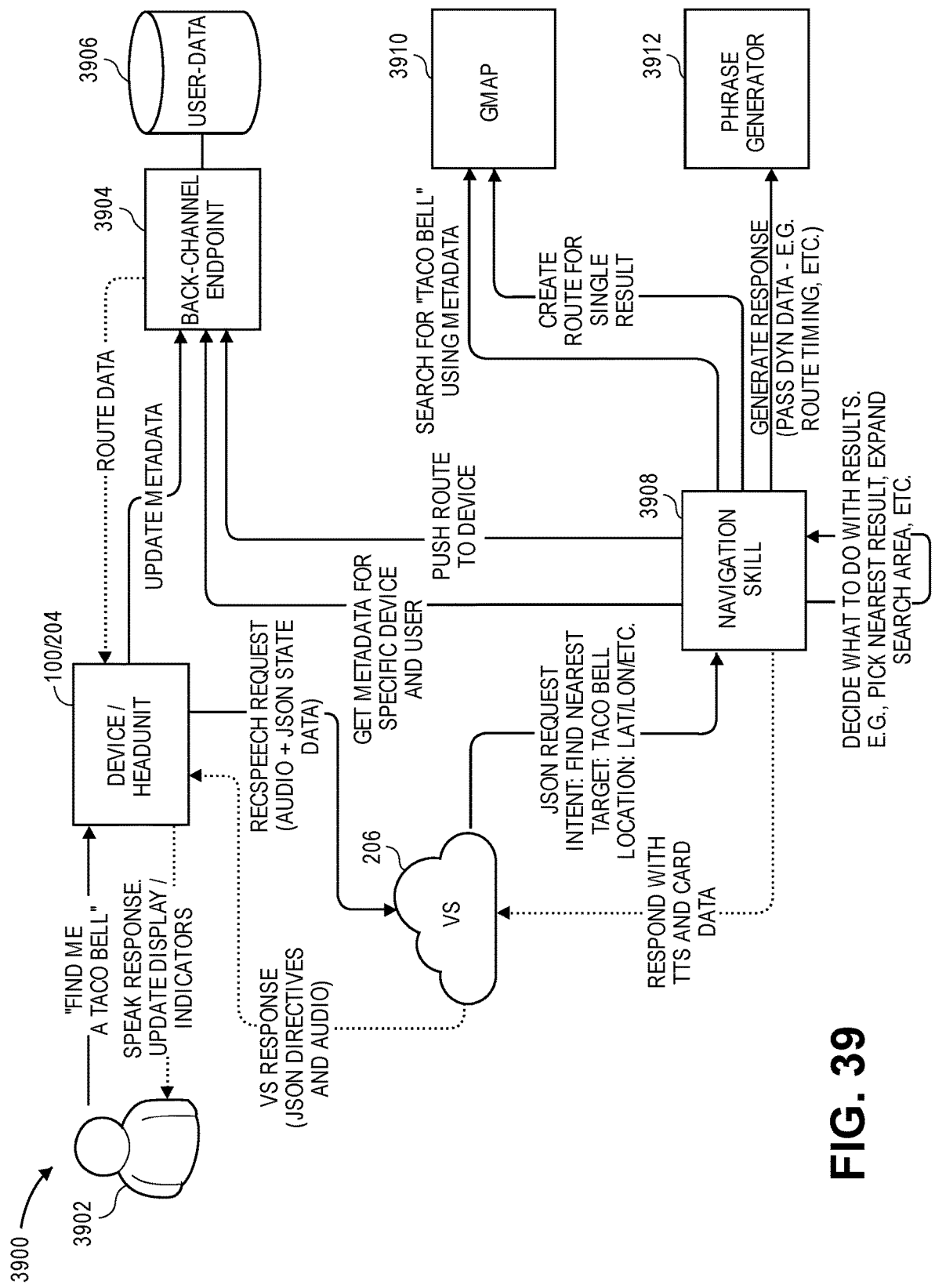
FIG. 39 is a block diagram illustrating a system configuration for a mobile application interface device, such as the mobile application interface device of FIGS. 1A through 1C, wherein the mobile application interface device facilitates communication with network provided navigation and voice services, in accordance with an example embodiment of the present disclosure.

FIG. 39 illustrates an example configuration 3900 of the controller 124 or mobile application 218 employing data from VS server 206 and NAV server 208 to search for a location and/or calculate navigation (e.g., route guidance) data. For example, the controller 124 or mobile application 218 can be configured to provide search locations and/or route guidance (e.g., display and/or audio) outputs for a user 3902 based on voice inputs (e.g., spoken instructions/queries) received from the user 3902. The controller 124 or mobile application 218 can be configured to connect to VS server 206 to process the voice inputs and can connect to a navigation/mapping engine 3910 and a phrase generator 3912, which may both be available through server 208, to receive search results, navigation data (e.g., route guidance instructions, timing, etc.) or other location based information. A navigation skill 3908 can be enabled through the mobile application 218 to facilitate connectivity between the VS server 206 and NAV server 208. The controller 124 or mobile application 218 can also be configured to connect to a user database 3906, which may be available through server 206 or server 208. In some embodiments, the device 100 is configured to connect to the user database 3906 through a back-channel endpoint 3904.

Figure 40:
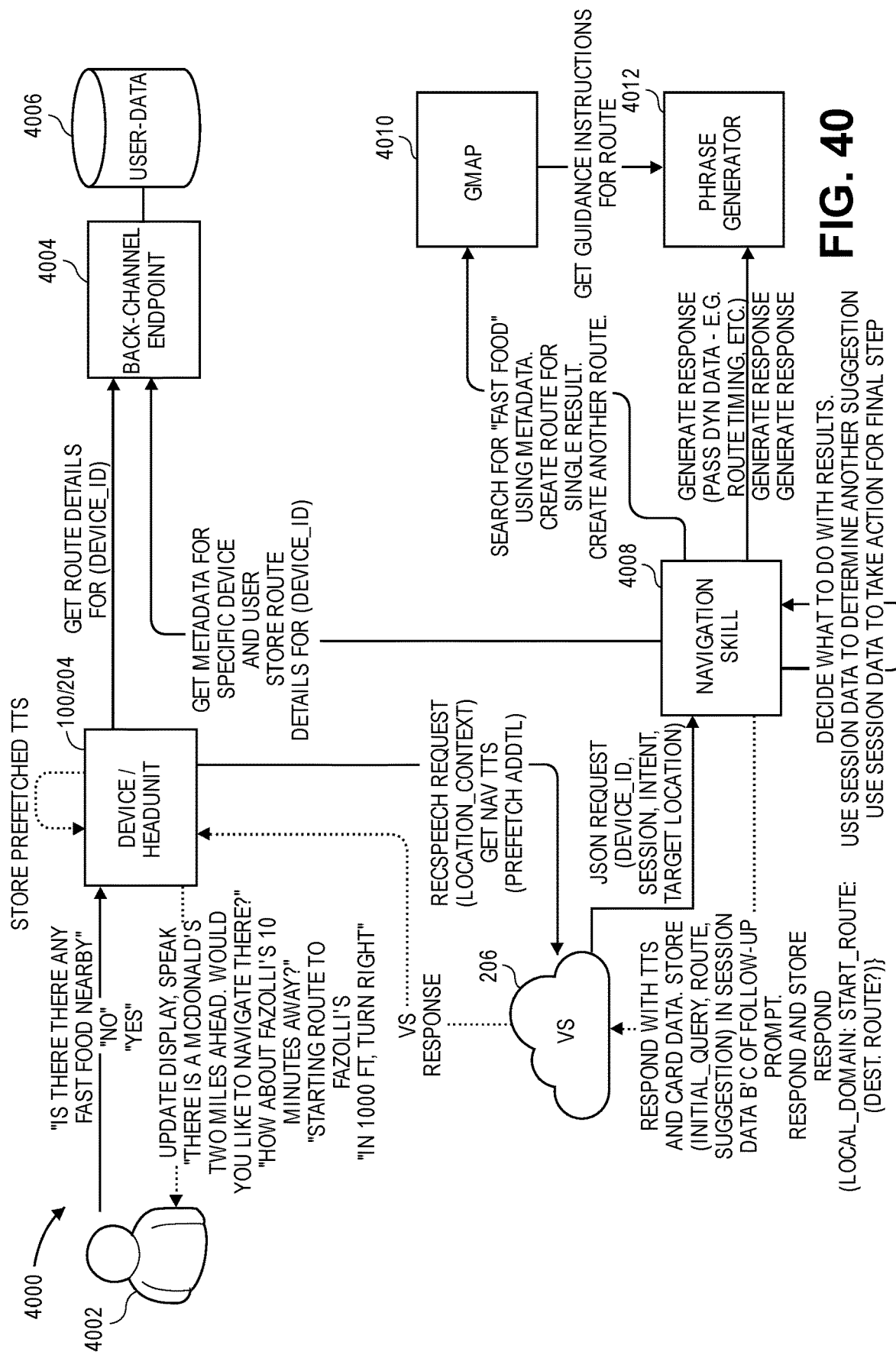
FIG. 40 is a block diagram illustrating a system configuration for a mobile application interface device, such as the mobile application interface device of FIGS. 1A through 1C, wherein the mobile application interface device facilitates communication with network provided navigation and voice services, in accordance with an example embodiment of the present disclosure.

FIG. 40 illustrates an example configuration 4000 of the controller 124 or mobile application 218 employing data from VS server 206 and NAV server 208 to search for one or more locations and/or calculate navigation (e.g., route guidance) data. For example, the device 100 can be configured to provide search locations and/or route guidance (e.g., display and/or audio) outputs for a user 4002 based on voice inputs (e.g., spoken instructions/queries) received from the user 4002. The controller 124 or mobile application 218 can be configured to connect to VS server 206 to process the voice inputs and can connect to a navigation/mapping engine 4010 and a phrase generator 4012, which may both be available through server 208, to receive search results, navigation data (e.g., route guidance instructions, timing, etc.) or other location based information. A navigation skill 4008 can be enabled through the mobile application 218 to facilitate connectivity between the VS server 206 and NAV server 208. The controller 124 or mobile application 218 can also be configured to connect to a user database 4006, which may be available through server 206 or server 208. In some embodiments, the controller 124 or mobile application 218 is configured to connect to the user database 4006 through a back-channel endpoint 4004. As shown in FIG. 40, the controller 124 or mobile application 218 can provide audio outputs indicating a plurality of suggestions (e.g., search results) based on the user's query, where the user 4002 can respond by accepting or rejecting suggestions provided by the device 100.

Figure 41A:
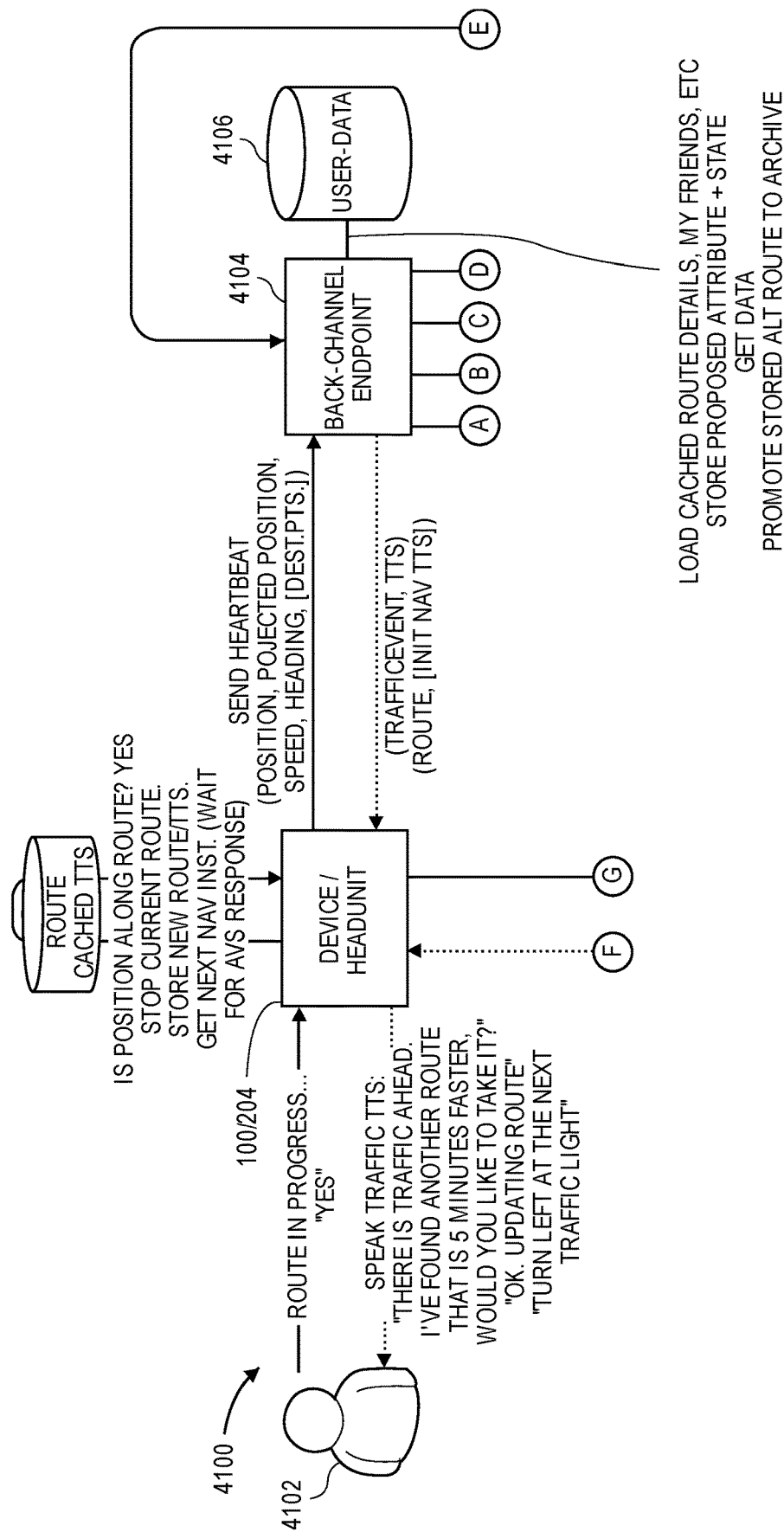
FIG. 41A is a block diagram illustrating a system configuration for a mobile application interface device, such as the mobile application interface device of FIGS. 1A through 1C, wherein the mobile application interface device facilitates communication with network provided navigation and voice services, in accordance with an example embodiment of the present disclosure.
Figure 41B:
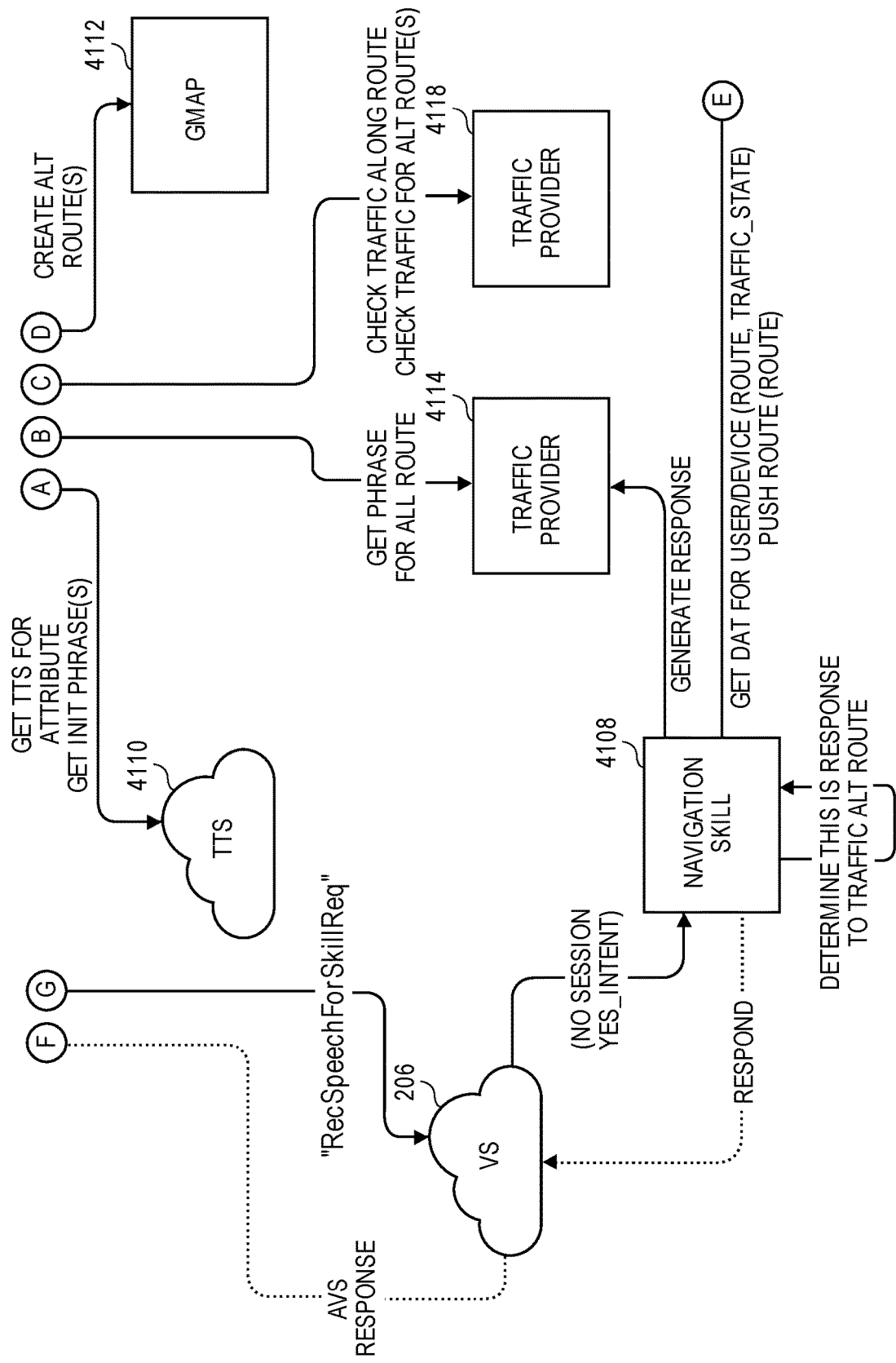
FIG. 41B is a block diagram illustrating a system configuration for a mobile application interface device, such as the mobile application interface device of FIGS. 1A through 1C, wherein the mobile application interface device facilitates communication with network provided navigation and voice services, in accordance with an example embodiment of the present disclosure.

FIGS. 41A and 41B illustrate an example configuration 4100 of the device 100 employing data from VS server 206 and NAV server 208 to provide location based information (e.g., traffic information/updates) during route guidance. For example, the device 100 can be configured to provide display and/or audio outputs associated with traffic information for a user 4102 based on voice inputs (e.g., spoken instructions/queries) received from the user 4102. The controller 124 and/or mobile application 218 can be configured to connect to a TTS engine 4110 to download additional TTS data for upcoming route guidance instructions and/or traffic information. The controller 124 and/or mobile application 218 can also be configured to connect to VS server 206 to process the voice inputs and can connect to a navigation/mapping engine 4112, traffic provider 4114, and a phrase generator 4118, which may both be available through server 208, to receive search results, navigation data (e.g., route guidance instructions, timing, etc.) or other location based information (e.g., traffic information/updates). A navigation skill 4108 can be enabled through the mobile application 218 to facilitate connectivity between the VS server 206 and NAV server 208. The controller 124 and/or mobile application 218 can also be configured to connect to a user database 4106, which may be available through server 206 or server 208. In some embodiments, the device 100 is configured to connect to the user database 4106, TTS engine 4110, navigation/mapping engine 4112, traffic provider 4114, and/or phrase generator 4118, through a back-channel endpoint 4104. As shown in FIG. 41A, the device 100 can provide audio outputs associated with traffic information while providing route guidance (e.g., navigation data) for the user 4102. The controller 124 and/or mobile application 218 can also be configured to provide alternative routes for the user 4102 and receive voice inputs from the user 4102 to change the route based on the traffic information.

Figure 42A:
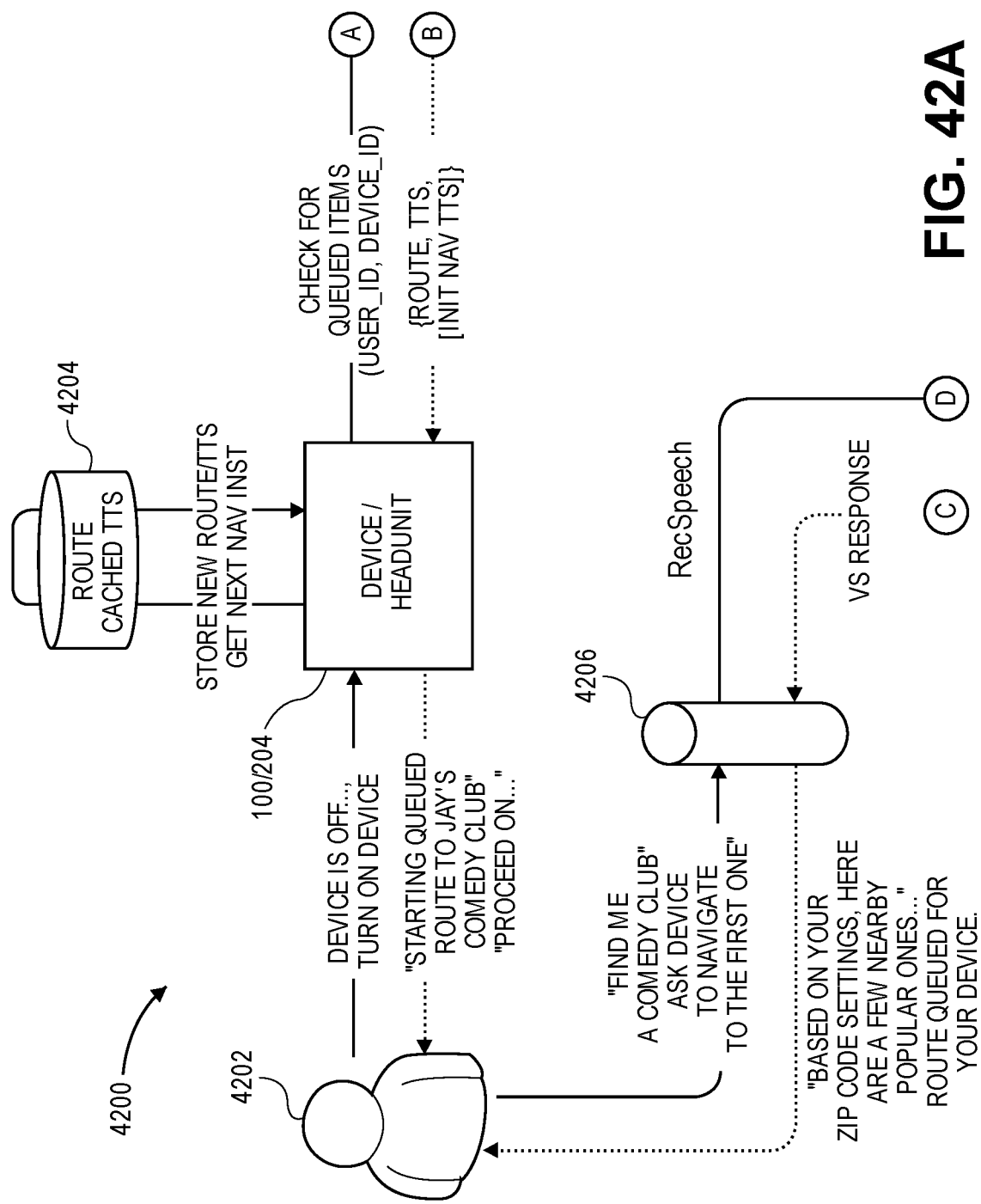
FIG. 42A is a block diagram illustrating a system configuration for a mobile application interface device, such as the mobile application interface device of FIGS. 1A through 1C, and a home application interface device, wherein the mobile application interface device and the home application interface device a both communicatively coupled via a network that facilitates communication with navigation and voice services, in accordance with an example embodiment of the present disclosure.
Figure 42B:
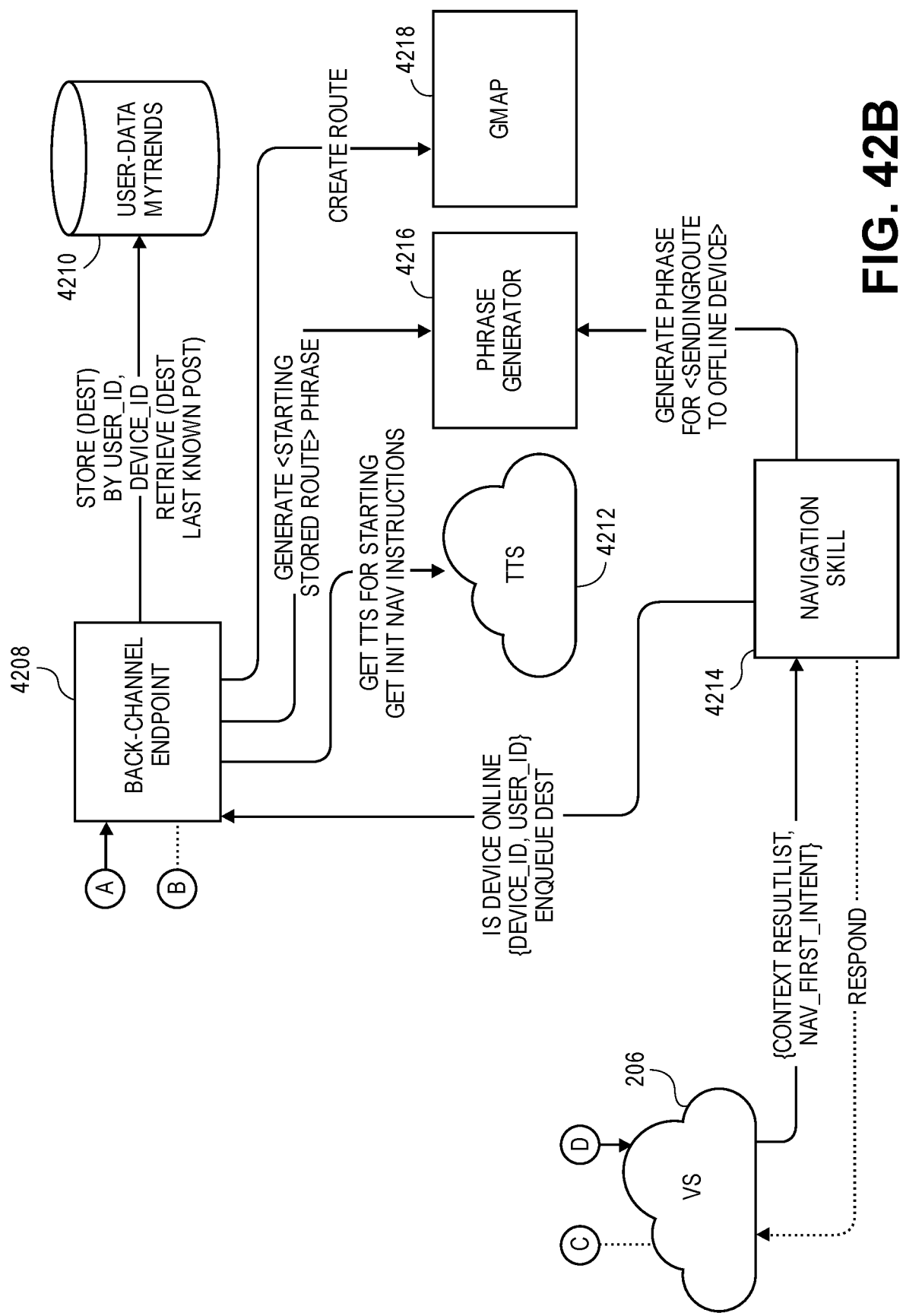
FIG. 42B is a block diagram illustrating a system configuration for a mobile application interface device, such as the mobile application interface device of FIGS. 1A through 1C, and a home application interface device, wherein the mobile application interface device and the home application interface device a both communicatively coupled via a network that facilitates communication with navigation and voice services, in accordance with an example embodiment of the present disclosure.

FIGS. 42A and 42B illustrate an example configuration 4200 of the device 100 employing data from VS server 206 and NAV server 208 to search for one or more locations and/or calculate navigation (e.g., route guidance) data, where a home mobile application interface device 4206 (e.g., an AMAZON ECHO device or the like) is used to receive voice inputs (e.g., spoken instructions/queries) from a user 4202. For example, the device 100 can be configured to provide search locations and/or route guidance (e.g., display and/or audio) outputs for a user 4202 based on voice inputs (e.g., spoken instructions/queries) received from the user 4202 via the home mobile application interface device 4206. The device 100 and the home mobile application interface device 4206 can be configured to connect to VS server 206 to process the voice inputs and can connect to a navigation/mapping engine 4218 and a phrase generator 4216, which may both be available through server 208, to receive search results, navigation data (e.g., route guidance instructions, timing, etc.), or other location based information. A navigation skill 4214 can be enabled through the mobile application 218 to facilitate connectivity between the VS server 206 and NAV server 208. The device 100 and the home mobile application interface device 4206 can also be configured to connect to a user database 4210, which may be available through server 206 or server 208. In some embodiments, the device 100 and the home mobile application interface device 4206 are configured to connect to the user database 4210, TTS engine 4212, navigation/mapping engine 4218, and/or phrase generator 4216, through a back-channel endpoint 4208. As shown in FIG. 42A, the device 100 may be turned off, and yet the user 4202 can interact with the home mobile application interface device 4206 that is configured to provide audio outputs indicating a plurality of suggestions (e.g., search results) based on the user's query, where the user 4202 can respond by accepting or rejecting suggestions and instructing the home mobile application interface device 4206 to save the results for route guidance to be provided by the device 100. When the device 100 is on, the device 100 can be configured to initiate route guidance and/or ask the user 4202 whether to initiate route guidance to a saved search result.

Although the technology has been described with reference to the embodiments illustrated in the attached drawing figures, equivalents may be employed and substitutions made herein without departing from the scope of the technology as recited in the claims. For example, the components described herein need not be physically connected to one another since wireless communication among the various depicted components is permissible and intended to fall within the scope of the present invention. Components illustrated and described herein are merely examples of a device and components that may be used to implement the embodiments of the present invention and may be replaced with other devices and components without departing from the scope of the invention.

What is claimed is:

1. A system for vehicle navigation assistance, the system comprising:
   a mobile device including:
      a cellular transceiver;
      a first short-range communications transceiver;
      a memory; and
      a processor configured to run a mobile application from the memory; and
   a device for interfacing with the mobile application running on the mobile device, the device including:
      a microphone;
      a location determining component;
      a display;
      a plurality of indicator lights;
      an audio output device;
      a second short-range communications transceiver;
      a mount to secure the device within a vehicle; and
      a controller communicatively coupled with the microphone, the location determining component, the display, the plurality of indicator lights, the audio output device, and the second short-range communications transceiver, the controller configured to:
         receive a spoken instruction or query from a user via the microphone,
         send data associated with the spoken instruction or query to the mobile application running on the mobile device via the second short-range communications transceiver;
      wherein the mobile application causes the mobile device to transmit an audio output based on the spoken instruction or query via the first short-range communications transceiver to one of a vehicle audio system and the device for output via the audio output device.

2. The system of claim 1, wherein the audio output device comprises a speaker.

3. The system of claim 1, wherein the audio output device comprises an audio output interface configured to connect the device to the vehicle audio system.

4. The system of claim 1, wherein the mobile application causes the mobile device to:
transmit the data associated with the spoken instruction or query to a first server via the cellular transceiver for voice service processing; and
receive information for the audio output from the first server via the cellular transceiver in response to the data associated with the spoken instruction or query.

5. The system of claim 1, wherein the controller is further configured to:
determine a current position of the device based on one or more signals received via the location determining component; and
transmit data associated with the current position of the device to the mobile application running on the mobile device via the second short-range communications transceiver.

6. The system of claim 5, wherein the audio output transmitted by the mobile device is also at least partially based on the current position of the device.

7. The system of claim 6, wherein the mobile application causes the mobile device to:
transmit the data associated with the spoken instruction or query to a first server via the cellular transceiver for voice service processing;
receive navigation command data from the first server based on the spoken instruction or query via the cellular transceiver;
transmit the navigation command data and the data associated with the current position of the device to a second server via the cellular transceiver for navigation service processing; and
receive information for the audio output from the second server via the cellular transceiver in response to the navigation command data and the data associated with the current position of the device.

8. The system of claim 7, wherein the mobile application further causes the mobile device to receive navigation data from the second server via the cellular transceiver in response to the navigation command data and to transmit the navigation data to the device via the first short-range transceiver, wherein the controller is configured to provide at least one of a symbolic output or a textual output via the display based on the navigation data and the current position.

9. The system of claim 6, wherein the mobile application causes the mobile device to:
transmit the data associated with the spoken instruction or query and the data associated with the current position of the device to a first server via the cellular transceiver for voice service processing;
receive navigation command data from the first server based on the spoken instruction or query and the data associated with the current position of the device via the cellular transceiver;
transmit the navigation command data to a second server via the cellular transceiver for navigation service processing; and
receive information for the audio output from the second server via the cellular transceiver in response to the navigation command data.

10. The system of claim 9, wherein the mobile application further causes the mobile device to receive navigation data from the second server via the cellular transceiver in response to the navigation command data and to transmit the navigation data to the device via the first short-range transceiver, wherein the controller is configured to provide at least one of a symbolic output or a textual output via the display based on the navigation data and the current position.

11. A device for interfacing with a mobile application running on a mobile device to provide vehicle navigation assistance, the device comprising:
a microphone;
a location determining component;
a display;
a plurality of indicator lights;
an audio output device;
a short-range communications transceiver configured to send and receive communications to and from the mobile device;
a mount to secure the device within a vehicle; and
a controller communicatively coupled with the microphone, the location determining component, the display, the plurality of indicator lights, the audio output device, and the short- range communications transceiver, the controller configured to:
receive a spoken instruction or query from a user via the microphone;
send data associated with the spoken instruction or query to the mobile application running on the mobile device via the short-range communications transceiver; and
receive an audio output based on the spoken instruction or query from the mobile application running on the mobile device via the short-range communications transceiver for output via the audio output device.

12. The device of claim 11, wherein the audio output device comprises a speaker.

13. The device of claim 11, wherein the audio output device comprises an audio output interface configured to connect the device to a vehicle audio system.

14. The device of claim 11, wherein the controller is further configured to:
determine a current position of the device based on one or more signals received via the location determining component; and
transmit data associated with the current position of the device to the mobile application running on the mobile device via the short-range communications transceiver.

15. The device of claim 11, wherein the audio output received from the mobile application running on the mobile device is also at least partially based on the current position of the device.

* * * * *